United States Patent
Yamaguchi et al.

(10) Patent No.: US 6,246,696 B1
(45) Date of Patent: *Jun. 12, 2001

(54) METHOD OF CONTROLLING A COMMUNICATION AND APPARATUS FOR THE SAME

(75) Inventors: Shogo Yamaguchi, Kobe; Shinzo Matsubara, Osaka; Yosuke Tajika, Kobe; Fumiko Tanaka, Kobe; Fumihiko Ikegami, Kobe, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/715,359

(22) Filed: Sep. 11, 1996

(30) Foreign Application Priority Data

| Sep. 11, 1995 | (JP) | 7-232459 |
| Sep. 18, 1995 | (JP) | 7-237990 |
| Sep. 18, 1995 | (JP) | 7-237991 |

(51) Int. Cl.[7] .............. H04J 3/24; H04Q 7/00; H04B 1/38
(52) U.S. Cl. .......... 370/475; 370/328; 455/550
(58) Field of Search ............... 370/475, 331, 370/328, 338, 392, 396, 400, 445, 432, 409, 447, 461; 455/517, 550, 551, 561, 422, 435, 432, 445, 458, 461; 359/118, 121, 143, 908, 910; 395/200.01–200.03, 200.09, 200.05–200.06, 200.55, 200.56, 200.57, 200.12, 200.16; 709/226, 227, 228, 229, 204

(56) References Cited

U.S. PATENT DOCUMENTS

| 5,101,500 | 3/1992 | Marui . |
| 5,212,809 | 5/1993 | Oka . |
| 5,345,474 | 9/1994 | Hoshikawa . |
| 5,428,666 | * 6/1995 | Fyfe et al. ............. 455/432 |
| 5,437,053 | * 7/1995 | Sawa et al. ............ 455/551 |
| 5,463,672 | * 10/1995 | Kage ..................... 455/458 |
| 5,623,496 | * 4/1997 | Sagi ...................... 370/475 |
| 5,675,630 | * 10/1997 | Beatty ................... 455/551 |
| 5,680,440 | * 10/1997 | Ghisler et al. ......... 455/432 |
| 5,684,801 | * 11/1997 | Amitay et al. ......... 370/447 |
| 5,732,070 | * 3/1998 | Hiroki ................... 370/522 |
| 5,740,160 | * 4/1998 | Ikegami et al. ........ 370/475 |
| 5,758,282 | * 5/1998 | Yamashina et al. ... 455/445 |
| 5,771,352 | * 6/1998 | Nakamura et al. .... 395/200.57 |
| 5,781,552 | * 7/1998 | Hashimoto ............ 370/447 |

FOREIGN PATENT DOCUMENTS

495515 * 7/1992 (EP) ................. B66B/1/34

OTHER PUBLICATIONS

W.M. Loucks, et al. Computer Networks and ISDN Systems, vol. 11, No. 2, pp. 133–146, "Implementation Of A Dynamic Address Assignment Protocol In A Local Areas Network," Feb. 1986.

\* cited by examiner

*Primary Examiner*—Wellington Chin
*Assistant Examiner*—Steven Nguyen
(74) *Attorney, Agent, or Firm*—Oblon, Spivak, McClelland, Maier & Neustadt, P.C.

(57) ABSTRACT

A communication control apparatus according to the present invention has receive means and own terminal identifier setting means. The receive means receives terminal ID information having information of one or more terminal identifiers transmitted from one or more terminals with which communication is being held. The own terminal identifier setting means sets a terminal identifier among a plurality of terminal identifiers which are other than the terminals of the other terminals obtained from all terminal ID information items received from the receive means, which have been previously set and which can be used for the communication.

31 Claims, 45 Drawing Sheets

PROCESS FOR SETTING IDENTIFIER OF OWN TERMINAL

| TERMINAL IDENTIFIER | IDENTIFIER OF TERMINALS CAPABLE OF HOLDING COMMUNICATION WITH THE INDICATED TERMINAL |
|---|---|
| C1 | C2, C4, C8 |
| C2 | C1, C3, C8 |
| C3 | C2, C4 |
| C4 | C1, C3, C5 |
| C5 | C4 |
| C8 | C1, C2 |

FIG. 5

| IDENTIFIER OF DESTINATION TERMINAL | OWN TERMINAL IDENTIFIER | PERIPHERAL TERMINAL INFORMATION |
|---|---|---|

FIG. 6

| TERMINAL IDENTIFIER | PERIPHERAL TERMINAL INFORMATION | UPDATING TIME |
|---|---|---|
| C1 | C2, C4, C8 | 11:00 |
| C2 | C1, C3, C8 | 10:55 |
| C3 | C2, C4 | 11:01 |
| C4 | C1, C3, C5 | 10:58 |

FIG. 7

PROCESS FOR SETTING IDENTIFIER OF OWN TERMINAL

| DESTINATION TERMINAL ID | OWN TERMINAL IDENTIFIER | SPECIFIC TERMINAL IDENTIFIER | PERIPHERAL TERMINAL INFOMATION |

| TERMINAL IDENTIFIER | SPECIFIC TERMINAL IDENTIFIER | PERIPHERAL TERMINAL INFORMATION | UPDATING TIME |
|---|---|---|---|
| C1 | 1111-2222-3333 | C2, C4, C8 | 11:00 |
| C2 | 1111-2222-3334 | C1, C3, C8 | 10:55 |
| C3 | 0000-6666-8888 | C2, C4 | 11:01 |
| C4 | 1234-5678-9012 | C1, C3, C5 | 10:58 |

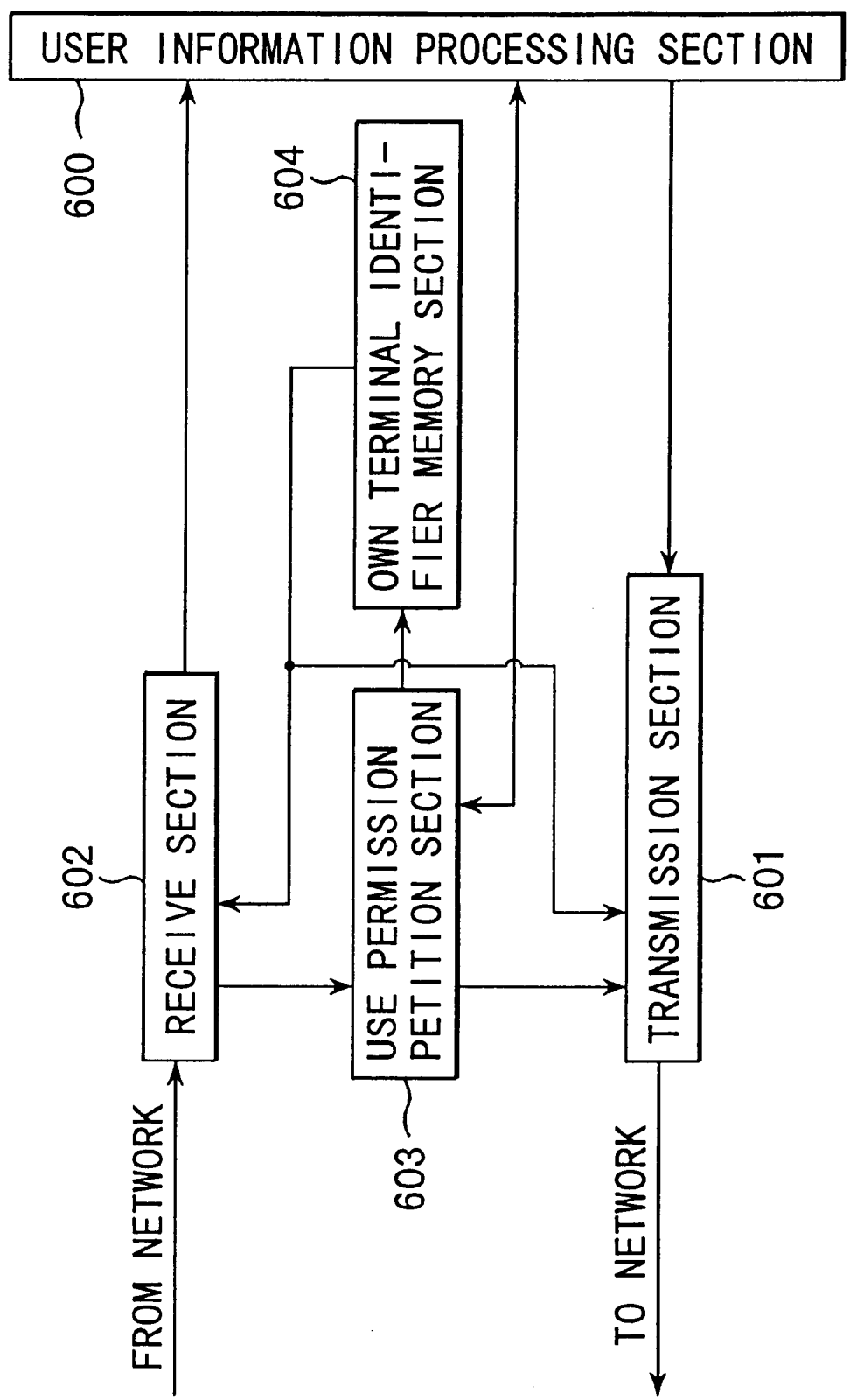
F I G. 14

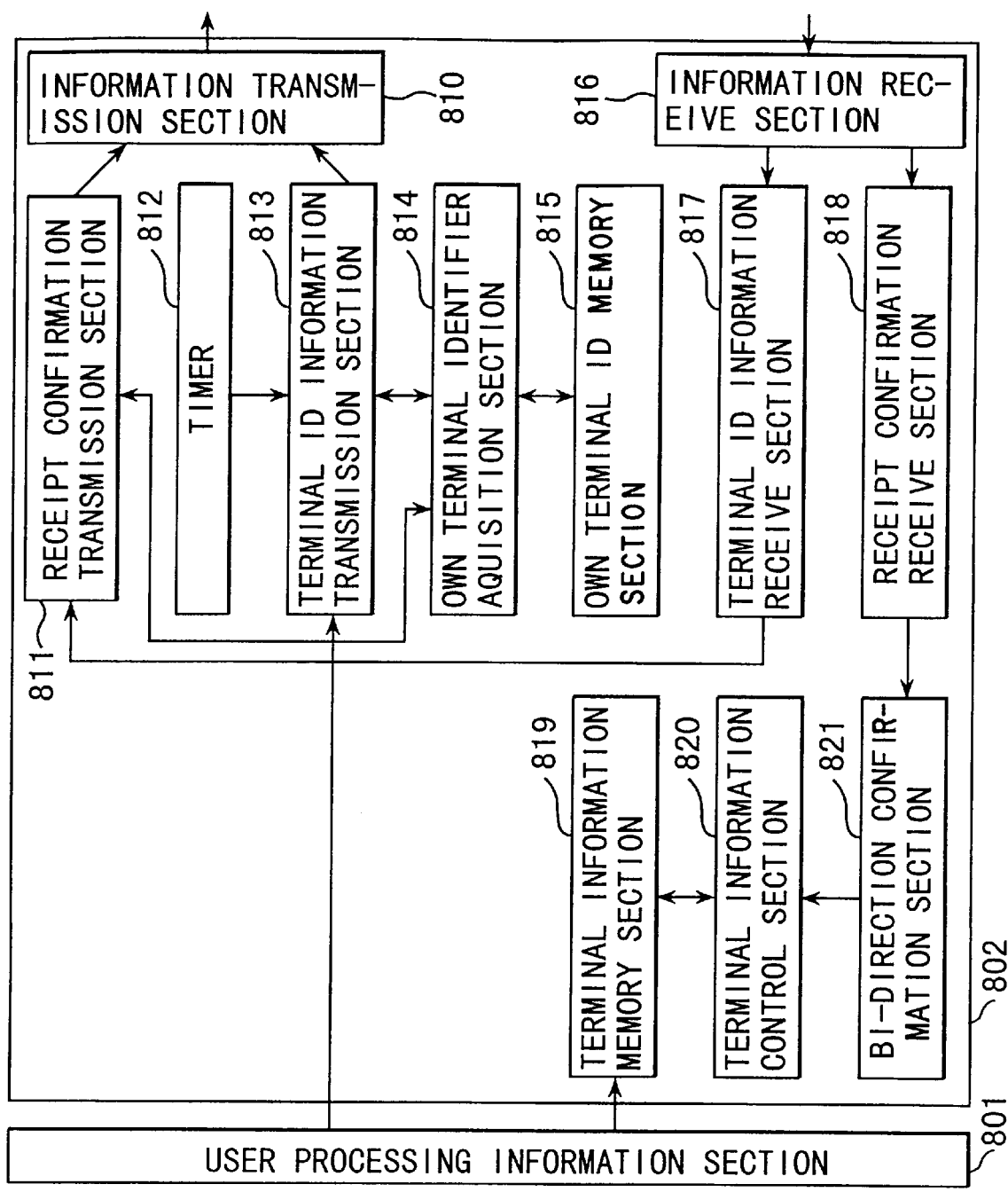
F I G. 16

| TERMINAL IDENTIFIER | UPDATING TIME |
|---|---|
| C1 | 11:00 |
| C2 | 10:55 |
| C3 | 11:01 |
| C4 | 10:58 |
F I G. 17
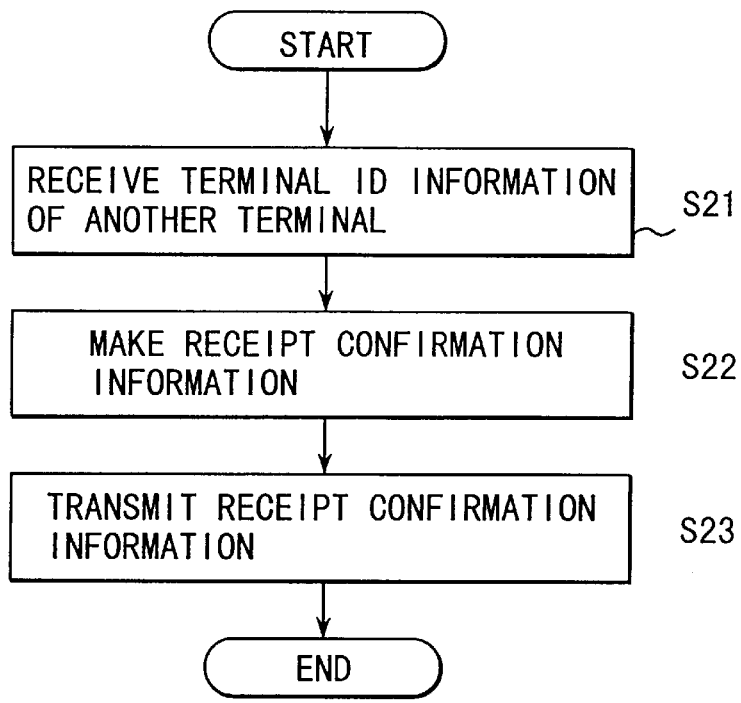
[PROCESS TO BE PERFORMED WHEN TERMINAL ID INFORMATIN OF ANOTHER TERMINAL IS RECEIVED]
F I G. 19

[PROCESS TO BE PERFORMED WHEN RECEIPT CONFIRMATION INFORMATION IS RECEIVED]

| OWN TERMINAL IDENTIFIER | LIST OF RECEIPT ENABLED TERMINAL | LIST OF BI-DIRECTIONAL COMMUNICATION ENABLED TERMINALS |
|---|---|---|

FIG. 21

| TERMINAL IDENTIFIER | STATE OF COMMUNICATION | PERIPHERAL TERMINAL INFORMATION | | | UPDATING TIME |
|---|---|---|---|---|---|
| C1 | BI-DIRECTION | C2 | C4 | C8 | 11:00 |
| C2 | BI-DIRECTION | C1 | C3 | C8 | 10:55 |
| C3 | BI-DIRECTION | C2 | C4 | | 11:01 |
| C4 | RECEIPT | C1 | C3 | C5 | 10:58 |

FIG. 22

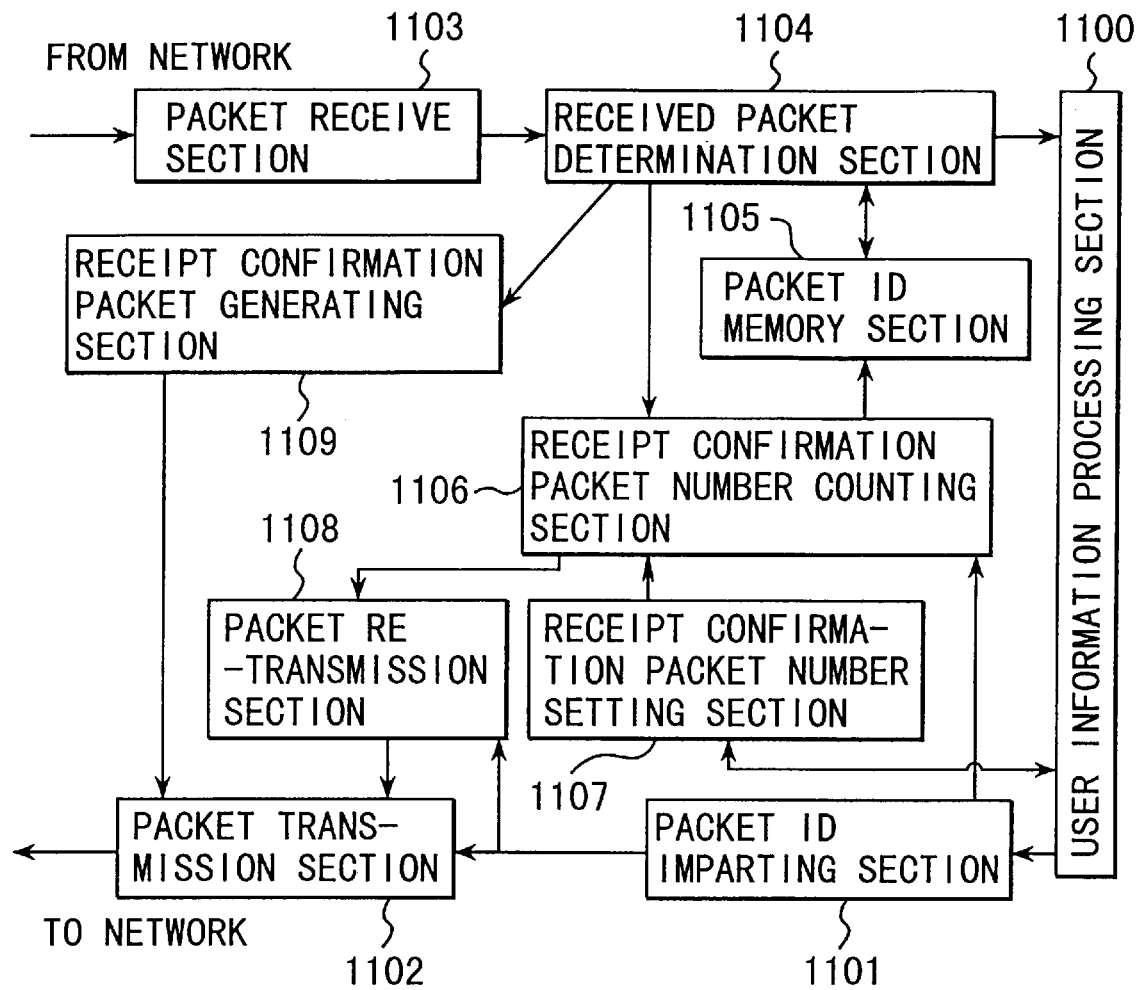
F I G. 24

ADDRESS INFORMATION
  ADDRESS:7234
  ADDRESS:BUSINESS TRIP REPORT MEETING
  ADDRESS SET TO:YAMADA, HORIGUCHI, YOKOTA
  TIME OF GENERATION OF ADDRESS:13:30, August 8, 1995
  LIMIT FOR USE OF ADDRESS:18:00, August 8, 1995

[PROCESS TO BE PERFORMED WHEN EXISTENCE CONFIRMATION INFORMATION IS RECEIVED]

[PROCESS TO BE PERFORMED WHEN EXISTENCE CONFIRMATION RESPONSE IS RECEIVED]

[PROCESS TO BE PERFORMED WHEN ANOTHER TERMINAL ID INFORMATION IS RECEIVED]

| SPECIFIC TERMINAL IDENTIFIER | TERMINAL IDENTIFIER |
|---|---|
| 1234-5678-9012 | 8 |
| 1111-2222-3333 | 11 |
| 2222-3333-4444 | 22 |
| 2222-3333-4445 | 1 |

| SPECIFIC TERMINAL IDENTIFIER | TERMINAL IDENTIFIER | PRIORITY |
|---|---|---|
| 1234-5678-9012 | 8 | 1 |
| 1111-2222-3333 | 11 | 0 |
| 2222-3333-4444 | 22 | 2 |
| 2222-3333-4445 | 1 | 1 |

FIG. 36

| SPECIFIC TERMINAL IDENTIFIER | TERMINAL IDENTIFIER | TIME OF STETTING |
|---|---|---|
| 1234-5678-9012 | 8 | 10:00 |
| 1111-2222-3333 | 11 | 9:40 |
| 2222-3333-4444 | 22 | 12:01 |
| 2222-3333-4445 | 1 | 7:23 |

FIG. 37

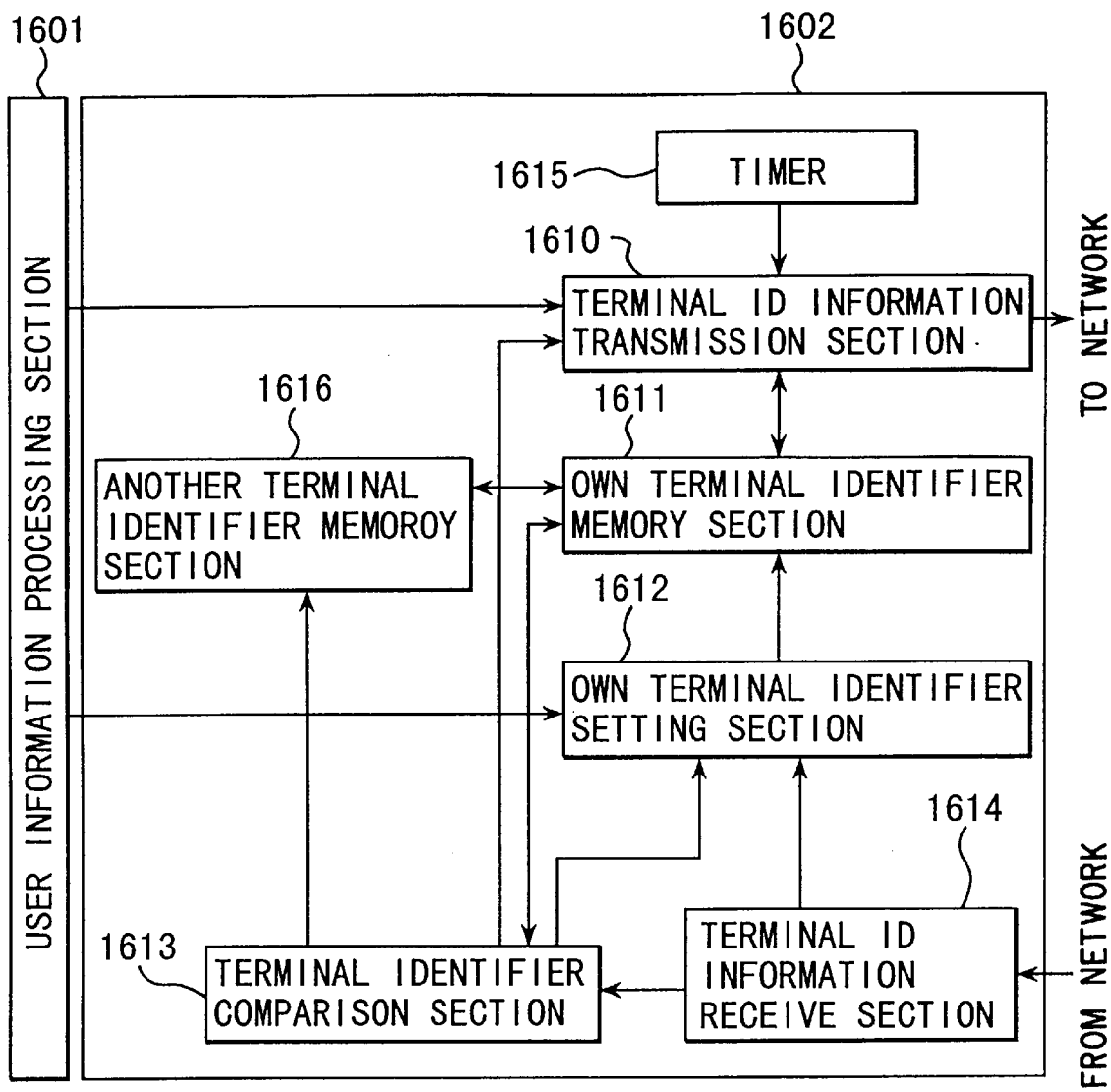
F I G. 38

[PROCESS TO BE PERFORMED WHEN NOTIFICATION OF OVERLAPPING IS RECEIVED]

| NAME OF DEVICE | LOGICAL EQUIPMENT ADDRESS |
|---|---|
| A | Madd(A) |
| B | Madd(B) |
| C | Madd(C) |
| ⋮ | ⋮ |

EQUIPMENT ADDRESS MANAGING TABLE

| NAME OF GROUP | NAME OF DEVICE | MULTICAST ADDRESS |
|---|---|---|
| G1 | A,B,D,X | Gadd(G1) |
| G2 | B,C,X | Gadd(G2) |
| ⋮ | ⋮ | ⋮ |

GROUP ADDRESS MANAGING TABLE

| NAME OF DEVICE | LOGICAL EQUIPMENT ADDRESS |
|---|---|
| A | 1 |
| B | 2 |
| C | 3 |
| D | 4 |
| ⋮ | ⋮ |

EQUIPMENT ADDRESS STORAGE TABLE

| NAME OF GROUP | NAME OF DEVICE | MULTICAST ADDRESS |
|---|---|---|
| G1 | A, B, C, X | 11010000__ |
| G2 | A, C, X | 10100000__ |
| G3 | B, C, D, X | 01110000__ |
| ⋮ | ⋮ | ⋮ |

GROUP ADDRESS STORAGE TABLE

DESTINATION ADDRESS G (X, A, B, C, D)
IMPARTED TO RECEIVED PACKET         11010000 ... 0

FILTERING MASK MMadd(A)           &) 10000000 ... 0
                                  ─────────────────
                                     1̄0101111 ... 1
                                     ↑
                                  g(A) MASKED WITH 1

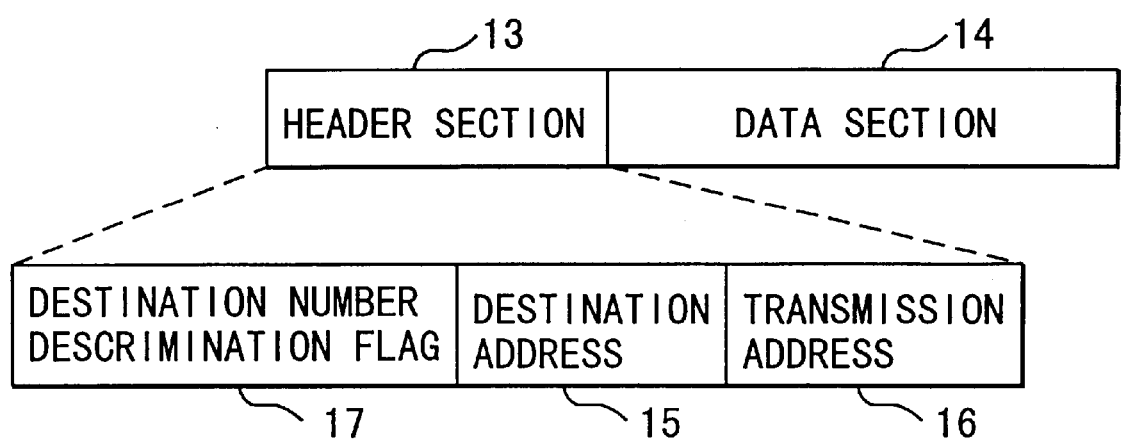
F I G. 57

| LOGICAL EQUIPMENT ADDRESS | LOWER LAYER ADDRESS |
|---|---|
| 1 | 532012 |
| 2 | 133434 |
| 3 | 200956 |
| 4 | 398067 |
| ┆ | ┆ |

METHOD OF CONTROLLING A COMMUNICATION AND APPARATUS FOR THE SAME

BACKGROUND OF THE INVENTION

1. Field of the Invention

The present invention relates to a communication control apparatus such that groups are formed by a plurality of portable information equipment and mutual communication is performed, and a method therefor.

2. Description of the Related Art

Hitherto, data transference between computers each having a communication function has mainly been performed by one-to-one communication. A most apparent typical example is data transference realized through a telephone line. To perform the communication through the telephone line, a user is needed to move to a place at which a telephone set is installed, and then instructs the telephone number intended to be communicated with. Therefore, only one-to-one communication with a person, the telephone number of which has been known, can be performed. Although use of a portable telephone results in a user being enabled to relatively freely hold communication in terms of the place for data transmission, the user is still needed to be capable of holding communication with a base station and to previously know the telephone number intended to be communicated while being limited to only the one-to-one communication.

Although broadcasting can be considered to realize one-to-multiple communication, broadcasting is able to basically realize only one directional communication.

Internet has been known to serve as a network exclusively used to realize communication among computers. Communication is realized in Internet by a technology called TCP/IP which uses IP address for specifying the terminal intended to be communicated, the IP address being address expressed by 32 bits and provided for each communication terminal. However, the communication using TCP/IP can be realized only when the communication terminals are connected by wire to one another. Thus, the foregoing communication cannot freely be used because of limitation of the places for use. Moreover, the IP address of the terminal intended to be communicated is needed to be known. In recent years, wireless LAN capable of realizing wireless computer communication has enabled the communication to be performed at arbitrary places. However, the necessity of previously knowing the IP address of the computer intended to be communicated cannot be eliminated.

As a technique capable of holding communication without the necessity of previously knowing the address of the terminal intended to be communication with, IrDA is available. IrDA is a communication technique using infrared rays and enabling data transmission to be performed simply by causing infrared-ray emitting and receiving portions of the own communication terminal to face the infrared-ray emitting and receiving portions of the communication terminal intended to be communicated. However, IrDA conveniently capable of eliminating the necessity of knowing the address of the other terminal is able to realize one-to-one communication. Thus, same information cannot be transmitted simultaneously to a plurality of persons.

As a means capable of solving the foregoing problem, a technique has been disclosed in Japanese Patent Laid-Open No. 7-336370 laid open on Dec. 22, 1995. According to the disclosure in Japanese Patent Laid-Open No. 7-336370, each communication terminal spontaneously transmits information for identifying the own communication terminal. Each communication terminal recognizes communication-enabled terminals existing adjacent to the own terminal in accordance with ID information transmitted from other communication terminals. Then, instructed communication terminals form a group in which communication terminals therein can be multicast-supplied with same information.

By employing the technique disclosed in Japanese Patent Laid-Open No. 7-336370 in a portable information device having a wireless communication function, fixed facilities are not required and multiplicity-to-multiplicity (N-to-N) communication can be performed at any place without the necessity of previously knowing the address of other communication terminals.

The technique disclosed in Japanese Patent Laid-Open No. 7-336370 eliminates the necessity of providing fixed facilities as have been required for the conventional technique and the necessity of previously knowing the address of the terminal intended to be communicated with. The technique is able to realize communication whenever a user intends regardless of the place at which the communication is held. The foregoing technique is considered to be advantageous when combined with portable information devices having the wireless communication function.

The structure disclosed in Japanese Patent Laid-Open No. 7-33637 has not particularly limited a method of setting the address of the own terminal, that is, the identifier of the own terminal. Although a conventional method may be employed in which a server for setting the identifier is provided, there arises a problem in that communication can be performed only when the server exists. As a setting method which does not use a server, a method in which a user manually sets the identifier or a method in which random numbers generated by each terminal are used may be employed. However, an excessively large identifier space is required to prevent overlap of the identifiers of adjacent terminals regardless of the time and the place. However, use of the large identifier space encounters a problem of complicated handling and deterioration in the communication efficiency.

If a plurality of communication terminal identifiers accidentally coincide with one another, the communication terminals cannot be distinguished from one another. Thus, there arises a problem in that existence of only one communication terminal is recognized though a plurality of communication terminals exist in actual.

Since the communication-enabled terminals are recognized by always transmitting ID information of the own communication terminal and receiving communication terminal ID information transmitted from other communication terminals, great electric power is required in addition to that required to transmit data. This causes a critical problem for a portable information device to arise because of limitation of electric power allowed to be provided. Since communication terminal ID information is continuously transmitted during transmission of data, data transmission band is limited.

Since communication-enabled terminal is recognized in accordance with communication terminal ID information spontaneously transmitted from each terminal, whether communication can be held with a specific terminal is required to be determined after a sufficiently long time has elapsed for the terminal to transmit the communication terminal ID information. That is, the recognition process is performed on the initiative of the terminal to be recognized as compared with the terminal which recognizes the terminal. Therefore, appropriate adaptation required by the terminal which recognizes the other terminal cannot be satisfied, thus resulting in a problem to arise in that a satisfactory efficiency cannot be realized.

On the other hand, a conventional network consisting of information communication devices A, B, C, . . . , X as shown in FIG. 1 which are enabled to mutually transmit and receive information is arranged to transmit and receive packets by the following method.

A case will now be considered in which X is a transmitter, a terminal, to which information is intended to be transmitted, is selected from all of the terminals and information is transmitted by means of a packet having the packet structure as shown in FIG. 2. The packet consists of a data section 4 and a header section 3. The header section 3 includes two addresses, one of which is destination address 5 and another of which is transmitter address 6. When a packet of this type is transmitted in a usual network, the packet is transmitted to the address provided for the header section 3. Then, the receiving device checks the header of the supplied packet and enabled to receive the packet if the address is the own address.

If information is intended to be transmitted to one device, for example, device A, equipment address of the device A is given as described above when the packet is transmitted.

Some conventional methods to be employed when information is intended to be transmitted to a plurality of devices will now be described.

A method may be employed in which equipment address is added as all of the destination addresses similarly to the case where information is intended to be transmitted to one device, that is, one-to-one communication is repeated. Since the foregoing method has not the simultaneous information transmission function, it encounters a problem in that the number of packets to be transmitted increases if the destined devices increases and repetition of the procedure required to realize transmission results in an excessively long time being taken to complete the transmission.

Another method may be employed in which negotiation is performed between the transmitter and the receiver to set multicast address. An assumption is performed that receiving devices are devices A, B and C. Device X requires the receiving devices to set the multicast address. The multicast address determined by the transmission device X is set by the receivers, and then the receiving devices respectively return ack. When the transmission device X has received, from all of the devices A, B and C, ack indicating completion of setting of the multicast address, simultaneous information transmission is enabled. For example, Class D of IP address corresponds to this. A 28-bit group number is provided as the multicast address. Since this method requires only one packet to perform transmission, it is an advantageous method when the same information is simultaneously transmitted to a fixed device group. However, above-mentioned method needs the transmission device to require setting by transmitting, to all destined devices, a packet for requiring the negotiation formed by adding each address or the broadcast address. Since the multicast address must be changed whenever the destined device is changed, negotiation is required to determine the multicast address with a new device intended to be communicated. Therefore, there arises a problem in that an excessively long loss time involves to actually transmit data.

As a transmission method requiring only one packet without negotiation, a method is available in which equipment addresses of all transmission devices are added to the header of one packet when the packet is transmitted. However, the foregoing method involves the packet header being elongated excessively if the number of devices intended to be communicated increases, causing the over-header to be enlarged. Thus, there arises a problem in that the execution throughput is reduced.

Another method capable of transmitting information with one packet without negotiation is a method using broadcast address. The above-mentioned method enables transmission to the overall device group, to which same information can be transmitted simultaneously, to be performed while requiring a fixed header length regardless of the number of the devices intended to be communicated. Therefore, the problem of the overhead can be solved. However, the foregoing method does not permit communication with a plurality of specific devices in the device group. Thus, the method encounters a problem in that the foregoing method is repeated unintentionally.

As described above, the conventional packet transmitting and receiving method requires the transmission device to perform negotiation with the destined device to transmit information after the multicast address has been set to the transmitting device and the receiving device. Moreover, the receiving device is required to set the multicast address. Thus, the procedure has been too complicated and a long time has been required. In the case where all addresses are arranged to form an address section, increase in the addresses causes the length of the packet header to be elongated excessively. Thus, there arises a problem in that the overhead is enlarged excessively.

SUMMARY OF THE INVENTION

A first object of the present invention is to provide a communication control apparatus and a method therefor enabling each terminal in a certain group of communication terminals to automatically set a terminal identifier with which each terminal can uniquely be identified.

A second object of the present invention is to detect coincidence of a communication terminal identifier of each of the own terminals and the identifiers of other communication terminals so as to prevent overlap of ID information.

A third object of the present invention is to perform reliable communication among a plurality of adjacent communication terminals with small electric power.

A fourth object of the present invention is to multicast a specific communication terminal among a plurality of adjacent communication terminals with small electric power.

A fifth object of the present invention is to, in accordance with a requirement, quickly and more accurately, recognize communication-enabled terminal.

A sixth object of the present invention is to realize more flexible and efficient multicast address communication.

To achieve the first object, a communication control apparatus according to the present invention comprises:

receive means for receiving terminal ID information having information of another terminal transmitted from one or a plurality of other terminals with which communication is being held; and own terminal identifier setting means for setting, to be an own terminal identifier, one of a plurality of terminal identifiers except the terminal identifiers of other terminals obtained from all of terminal ID information items received from the receive means and previously set and enabled to be used to perform the communication.

To achieve the second object, the present invention has a structure such that own terminal ID information setting means sets own terminal ID information for determining the own communication terminal. Own terminal ID information is obtained from means for memorizing own terminal ID information to transmit it as existence information of the own terminal. Existence information receive means receives existence information from another communication terminal. In a case where received existence information and own terminal ID information coincide with each other, own terminal ID information changing means determines whether own terminal ID information is changed and changes it, if necessary.

To achieve the third object, the present invention has a structure such that ID imparting means imparts ID information of a packet to a transmission packet. Packet transmission means broadcasts packet to which ID has been imparted. Packet receive means receives broadcasted packet. Confirmation packet receipt number setting means sets the number of receipt confirmation packets to be received with respect to transmitted packets. Confirmation packet received number counting means counts the number of receipt confirmation packets with respect to transmitted packets. In a case where re-transmission means cannot receive receipt confirmation packets by a number to be received in a predetermined time, the same packet is transmitted again. In a case where receipt confirmation packet generating means has received a packet except the receipt confirmation packet, it generates a packet having ID information of the received packet and information indicating that the packet is a receipt confirmation packet.

To achieve the fourth object, the present invention has a structure such that address information receive means receives address information indicating existence of certain address and attribute of the address. Address selection means selects one or a plurality of addresses from received address information. Information receive means receives information transmitted to the selected address. Information transmission means transmits information to the selected address. Address generating means generates new address. Address transmission means transmits address information.

To achieve the fifth object, the present invention has a structure such that own terminal ID information setting means sets own terminal ID information for discriminating the own communication terminal. Own terminal ID information memory means memorizes the own terminal discrimination information. Existence confirmation information transmission means transmits existence confirmation information for recognizing communication-enabled terminals existing around the own terminal. Existence confirmation information receive means receives existence confirmation information transmitted from another communication terminal. Existence confirmation response transmission means transmits existence confirmation response for indicating existence of a coincidence terminal in a case where received existence confirmation information and own terminal ID information coincide with each other. Communication-enabled terminal recognizing means recognizes communication-enabled terminals existing around the own terminal in accordance with existence confirmation information and existence confirmation response transmitted from the own terminal or another terminal. Group setting means sets one or a plurality of communication terminals among recognized communication-enabled terminals into one group. Information transmission means transmits same type information to communication terminals belonging to a set group.

To achieve the sixth object, the present invention has a structure such that multiple address calculated from addresses of device groups with which transmission can be performed and address of the destined terminal is imparted to a packet header to be transmitted. The receive side is required to memorize only the address of the own device so that information destined to the own terminal is determined and information is received. Therefore, labor and time of negotiation can be saved efficiently. Since only one packet is required to be transmitted, enlargement of traffic can be prevented. In a case where information is transmitted to one terminal, the destination address in the form of the equipment address is as it is transmitted. Therefore, address calculation can be decreased and the time required to set transmission can further be shortened. A lower device for receiving a packet transmitted from the foregoing packet transmitting and receiving apparatus to transmit it while imparting the address sets broadcast address when information is transmitted to a plurality of devices and sets unicast address when information is transmitted to one device. Thus, the unicast communication to be performed when transmission is performed to a plurality of devices is repeated. The necessity of arranging the equipment addresses of the destined devices in the header can be eliminated. Moreover, since a lower device for receiving information is able to delete packets which are not destined to the own terminal and which are not required, the load for the upper device required to receive information can be reduced.

Since the header of the destined terminal has a variable length, communication with a multiplicity of devices with which multiple communication can be performed can be realized without a limitation of the number of the device. If the number of devices, with which communication is being held is small, only a short header is required.

A packet transmitting and receiving apparatus for achieving the sixth object comprises an address memory section for memorizing logical equipment address and the like of an own device and a destined device having an address field having a fixed length; a destination address operating section using logical address information of the address memory section to determine destination address having the address field having the fixed length of the destination packet, a packet generating section for generating a packet formed by imparting destination address generated by the destination address operating section to a header; and a receive address discrimination section for discriminating whether the supplied packet is destined to the own terminal, wherein the destination address is set to multicast address calculated from the equipment addresses of all or a portion of devices, which are the subject of communication, and the own equipment address so as to be transmitted, and the receive side uses all or a portion of the multicast address imparted to the receive packet, the destination address and the own equipment address of the own device to determine whether information is addressed to the own device so that only information addressed to the own device is acquired.

There is provided a transmission and receipt method having an arrangement such that, in a case where the number of destination is one, a destination device number discrimination flag is provided for the header of a destination packet to set the flag to indicate one destination so that the destination address is enabled to be transmitted in the form of the logical equipment address as it is. When the receive side determines that the destination address is the logical equipment address in accordance with the destined device number discrimination ID flag, whether information is addressed to the own device is determined in accordance with all or a portion of the logical address, the own device logical address and the transmitter address so that only information addressed to the own device is acquired.

There is provided a packet transmission and receipt apparatus and a packet transmission and receipt method having an arrangement such that a low device for receiving the packet transmitted from the foregoing packet transmission and receipt apparatus to impart the destination when information is transmitted sets a multicast address in a case where the destination address has address indicating one device and multicast address when the destination address generated by the foregoing apparatus indicates a plurality of devices and sets unicast address when the destination address is one.

There is provided a packet transmission and receipt apparatus comprising another equipment address detection means for discriminating another equipment address with which wireless communication can be performed to detect the number of the devices; and simultaneous communication enabled device number determining section for determining the number of devices with which communication can be performed simultaneously with the detected devices to determine the maximum number. There is provided a method in which devices addresses of all or a portion of the destination devices and multicast address calculated from the address of the own device are set in an address field in which the maximum number of the devices determined by the simultaneously communication enabled device number determining section can be multicasted to transmit the same with the maximum number; and the receive side determines whether information is addressed to the own device in accordance with all or a portion of the maximum number, the multicast address, the destination address and the own equipment address of the own device imparted to the packet so that only information addressed to the own device is acquired.

The structure above is operated as follows:

The transmitter is assumed to be device X on a network as shown in FIG. 1. The device X intends to transmit data to devices A, B and C among a group of devices to which data can be transmitted. Note that each device knows the own address and addresses of the other devices. The device X calculates the multicast address from the addresses of the other devices and the own address, and then adds the multicast address and, if necessary, the transmitter address to a packet header having a fixed length when information is transmitted. In a case where a lower device receives the packet transmitted from the foregoing packet transmission and receipt apparatus and imparts the address when transmission is performed, the address is transmitted by setting the broadcast address.

In a case where information is transmitted to one device, the calculated multicast address is set to the equipment address of the destination device so that labor required to calculate the multicast address is omitted. In a case where address is imparted by the low device when information is transmitted, the address in the low device is set to be the broadcast address when transmission is performed.

The receiving side receives the transmitted packet to determine whether data is addressed to the own device in accordance with the multicast address imparted to the received packet header, the own address and the address of the transmitter, if necessary. As a result, the transmitter is able to perform multiple communication to a plurality of devices with one packet and without negotiation because the multicast address is imparted which can be obtained by only the calculations using the address of each device. When information is received, the packet destined to the own device is selectively received by only the calculation using the multicast address of the header of the received packet and the own address so that efficient multicast information transference is performed. If the address field for describing the multicast address is insufficient for the devices with which communication can be held, an address field for the maximum number of devices with which communication can be held simultaneously is secured. Then, the multicast address is calculated by a method similar to the foregoing. The receiving side is able to selectively receive the packet destined to the own device by the foregoing method in accordance with the address field length, the multicast address and the like described in the received packet.

Programs for executing the above methods and operating the above apparatuses may be stared in storage media.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 shows a state of communication among terminal according to the present invention;

FIG. 6 shows terminal ID information according to Embodiment 1 of the present invention;

FIG. 7 shows information memorized in another terminal identifier memory section according to Embodiment 1 of the present invention;

FIG. 14 is a block diagram showing the communication control apparatus according to Embodiment 7 of the present invention;

FIG. 16 is a block diagram showing the communication control apparatus according to Embodiment 9 of the present invention;

FIG. 17 shows information memorized in a terminal information memory section according to Embodiment 9 of the present invention;

FIG. 19 is a flow chart of a process according to Embodiment 9 of the present invention to be performed when terminal ID information of another terminal is received;

FIG. 21 shows communication terminal ID information according to Embodiment 12 of the present invention;

FIG. 22 shows information memorized in a communication terminal ID information memory section according to Embodiment 12 of the present invention;

FIG. 24 is a block diagram showing the communication control apparatus according to Embodiment 13-1 of the present invention;

FIG. 36 shows another table memorized in the another terminal ID information memory section according to Embodiment 16-2 of the present invention;

FIG. 37 shows another table memorized in the another terminal ID information memory section according to Embodiment 16-2 of the present invention;

FIG. 38 is a block diagram showing the communication control apparatus according to Embodiment 16-5 of the present invention;

FIG. 57 shows a packet header of a transmission packet according to Embodiment 19 of the present invention;

DETAILED DESCRIPTION OF THE PREFERRED EMBODIMENTS

Embodiment 1

Embodiment 1 will now be described with reference to FIGS. 3 to 7.

Figure 3:
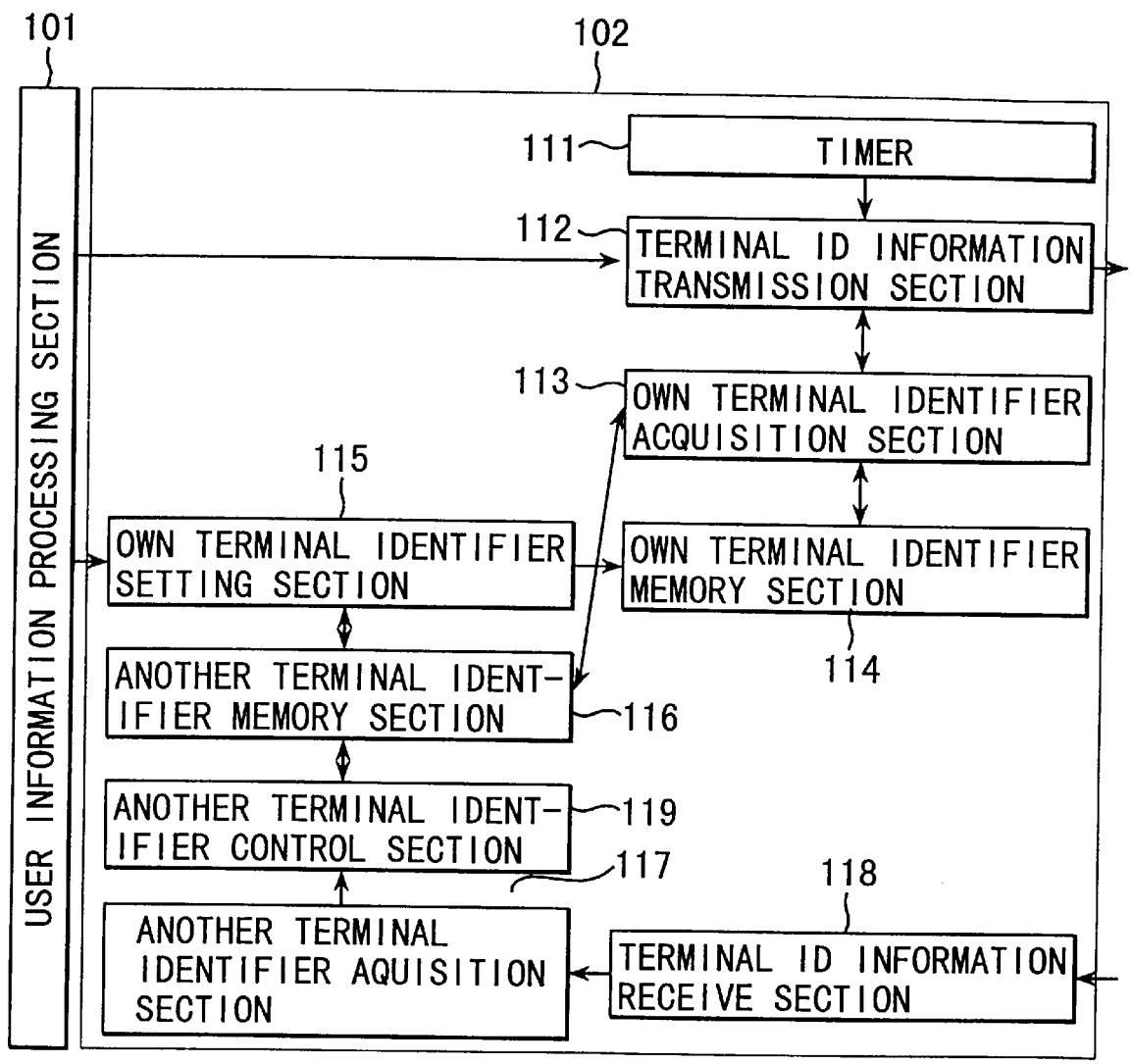
FIG. 3 is a block diagram showing a communication control apparatus according to Embodiment 1 of the present invention.

FIG. 3 is a structural view showing a communication apparatus according to this embodiment and comprising a user information processing section 101 for executing a so-called application and a communication control section 102 for controlling the communication. A terminal ID information transmission section 112 receives the information about the set interval by a timer 111 or a command issued from the user information processing section 101 to transmit an identifier registered in an another terminal identifier memory section 116 as peripheral terminal information together with the terminal identifier of the own terminal as terminal ID information. An own terminal identifier acquisition section 113 acquires the identifier of the own terminal from the own terminal identifier memory section 114. An own terminal identifier setting section 115 follows a demand from the user information processing section 101 to set the acquired identifier as the identifier of the own terminal. Then, the own terminal identifier setting section 115 registers the set identifier to the own terminal identifier memory section 114. A terminal ID information receive section 118 receives the terminal ID information and the received information is supplied to an another terminal identifier acquisition section 117. The another terminal identifier acquisition section 117 acquires the terminal identifier and the peripheral terminal information from the terminal ID information, and then supplies the acquired information to an another terminal identifier control section 119.

The another terminal identifier control section 119 updates the another terminal identifier memory section 116 in accordance with the information supplied from the another terminal identifier acquisition section 117.

A process to be performed by the own terminal identifier setting section 115 of the apparatus according to Embodiment 1 will now be described while taking the state shown in FIG. 4 for an example.

Figure 1:
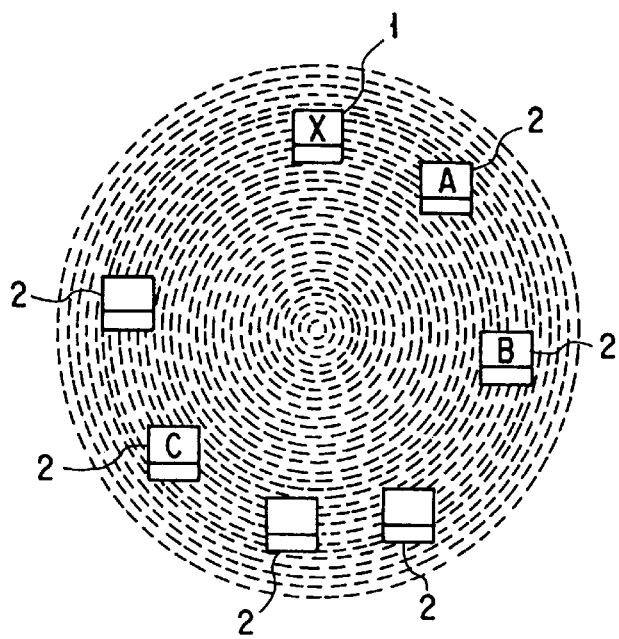
FIG. 1 is a conceptual view of a network.
Figure 2:
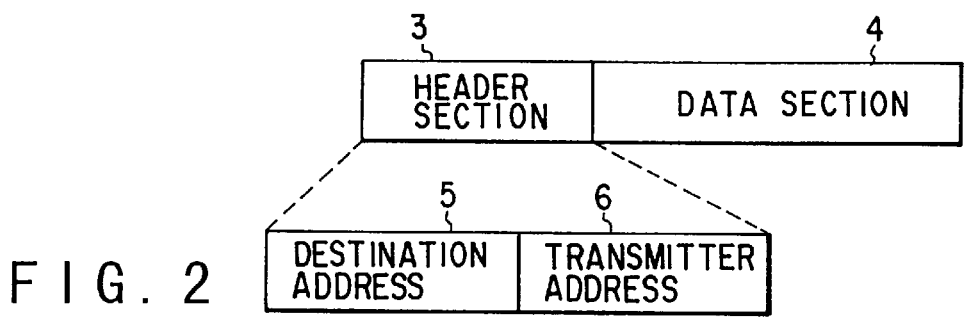
FIG. 2 is a conceptual view of a packet structure.
Figure 4:
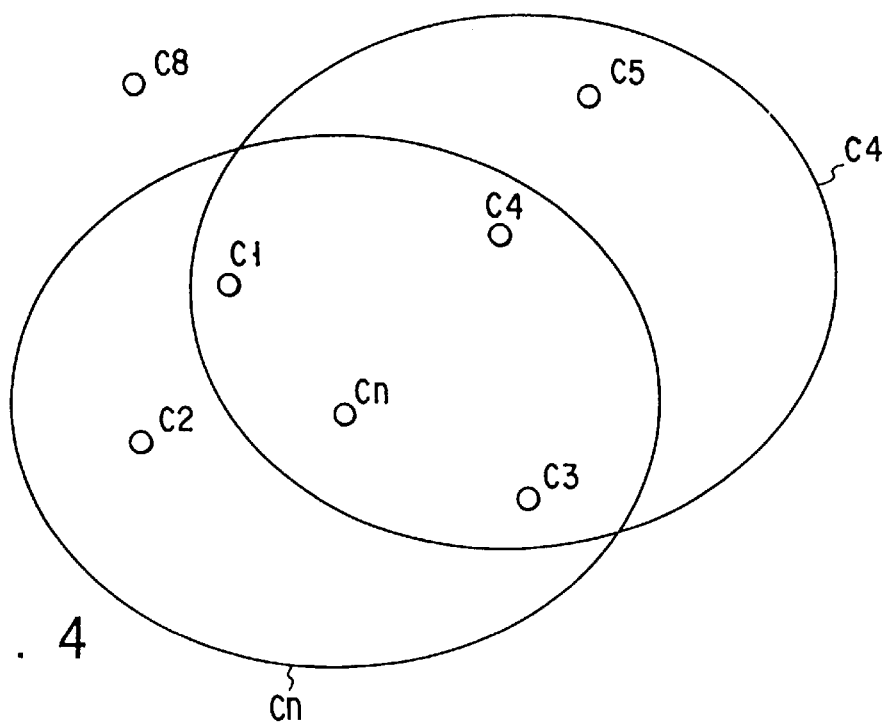
FIG. 4 is a diagram showing a network of the communication control apparatus according to the present invention.

Referring to FIG. 4, seven terminals exist which consist of communication terminals C1 to C5, C8 and Cn.

As shown in FIG. 4, the areas in which the terminal Cn and the terminal C4 are able to perform communication are surrounded by circles to indicate the area. That is, the terminal Cn is able to communicate with the terminals C1, C2, C3 and C4 and cannot communicate with the terminals C5 and C8. A table indicating terminals with which each terminal is able to have a communication is shown in FIG. 5. FIG. 6 shows terminal ID information to be transmitted from the terminal C1. The terminals C1 to C5 and C8 periodically broadcast terminal ID information as shown in FIG. 6. The terminal ID information receive section 118 of the terminal Cn is able to receive terminal ID information from the terminals C1 to C4 among the foregoing terminals. When the terminal Cn has received the terminal ID information, the received terminal identifier is compared with the terminal identifiers memorized in the another terminal identifier memory section 116. If the received terminal identifier has not been registered, the received terminal identifier and the peripheral terminal information is registered in the another terminal identifier memory section 116. If the received terminal identifier has been registered, the update time of the received terminal identifier is set to the present time. If the peripheral terminal information is different from the previous peripheral terminal information, the peripheral terminal information is changed. Thus, the received terminal ID information is used to make a table shown in FIG. 7 in the another terminal identifier memory section 116.

If the update time is not updated for a predetermined time, a determination is made that communication with a terminal having the terminal identifier, the update time of which is not updated, cannot be held. Thus, the terminal identifier is deleted from the another terminal identifier memory section 116.

If a demand of setting an own terminal identifier is made from the user information processing section 101 to the own terminal identifier setting section 115, the own terminal identifier setting section 115 sets the identifier as follows.

Initially, information in the another terminal identifier memory section 116 is acquired to calculate all identifiers which are being used by other terminals. The calculation is performed by retrieving all identifiers existing in the terminal identifier fields and peripheral terminal fields shown in FIG. 7. In accordance with a result of the retrieval, whether the identifiers C1 to C5 and C8 can be detected.

In accordance with the result above, an identifier setting method is employed in which the identifier is set to be a smallest identifier among identifiers that are not being used. In this case, the identifier is set to be C6.

Moreover, random numbers may be used to determine a number which is given to an empty identifier so as to be used as the identifier. If 37 is determined by using the random numbers, the identifier may be set to be C37.

As an alternative to this, a largest identifier may be previously determined among unused identifiers and the identifier may be set to the largest number.

Another method may be employed which comprises the steps of determining a largest identifier, using random numbers and determining the identifier to be an identifier which is approximate the determined random number.

As described above, a terminal identifier with which each terminal can be identified is determined by each terminal and the determined terminal identifier is broadcasted to peripheral terminals so that data transmission is performed among the terminals by using the terminal identifiers.

Embodiment 2

Information about identifiers of other terminals has been recorded in the another terminal identifier memory section 116 by a procedure similar to that employed in Embodiment 1. The own terminal identifier setting section 115 has a largest identifier number. The terminal identifier of the own terminal is determined from the largest identifier number. A method with which the another terminal identifier control section 119 changes the largest identifier number in accordance with information in the another terminal identifier memory section 116 will now be described.

When the own terminal identifier setting section 115 sets the identifier, it selects an unused identifier which is equal or smaller than the largest identifier number to set it as the identifier. The largest identifier number may be, as a default, previously supplied to the another terminal identifier control section 119 or the largest identifier number may be determined from random numbers. When a new identifier has been detected from the terminal ID information, the another terminal identifier control section 119 registers the new identifier to the another terminal identifier memory section 116. After identifiers in the another terminal identifier memory section 116 have been used up, the another terminal identifier control section 119 enlarges the largest identifier number to increase the number of unused identifiers. The changed largest identifier number is informed to the own terminal identifier setting section 115.

When the identifier larger than the largest identifier number managed by the another terminal identifier control section 119 of the own terminal has been acquired from the terminal ID information, the another terminal identifier control section 119 may changes the largest identifier number so as to accept the received identifier. As an alternative to this, if X % or more among the numbers which are equal or smaller than the largest identifier numbers is used, the largest identifier number may be enlarged.

A procedure for the another terminal identifier control section 119 to reduce the largest identifier number will now be described.

There sometimes arises a case where an unused identifier is created because of the shift of a terminal or interruption of the power source after the own terminal identifier setting section 115 has determined an identifier. If the largest identifier number can be reduced by changing the identifier into a smaller unused identifier, the largest identifier number is reduced.

If the identifier same as the largest identifier number is made to be an unused identifier, the largest identifier among identifiers which are being used may be changed to the largest identifier number.

Moreover, the another terminal identifier control section 119 calculates the number of unused identifiers, and then changes the largest identifier number to lower the ratio of the unused identifiers to be X % or lower if X % or more unused identifier numbers exist, and the terminal having the identifier larger than the new largest identifier number is changed to an identifier smaller than the largest identifier number.

Embodiment 3

A similar procedure to that according to Embodiment 1 is employed so that information about other terminals are memorized in the another terminal identifier memory section 116. The own terminal identifier setting section 115 has the largest identifier number. The terminal identifier of the own terminal is determined from the largest identifier number. The operation of the another terminal identifier control section 119 to be performed in accordance with information in the another terminal identifier memory section 116 will now be described.

When the own terminal identifier setting section 115 sets the identifier, it selects an unused identifier which is equal or smaller than the largest identifier number to set it as the identifier. The largest identifier number may be, as a default, previously supplied to the another terminal identifier control section 119 or the largest identifier number may be determined from random numbers. When a new identifier has been detected from the terminal ID information, the another terminal identifier control section 119 registers the new identifier to the another terminal identifier memory section 116. There sometimes occurs a case where usable identifiers are used up in the another terminal identifier memory section 116. If usable identifier is used up when the own terminal identifier setting section 115 intends to set an identifier, the own terminal identifier setting section 115 does not set the identifier until a usable identifier appears.

The detection of the usable identifier may be performed such that the own terminal identifier setting section 115 periodically detects a usable identifier in the another terminal identifier memory section 116.

Figure 8:
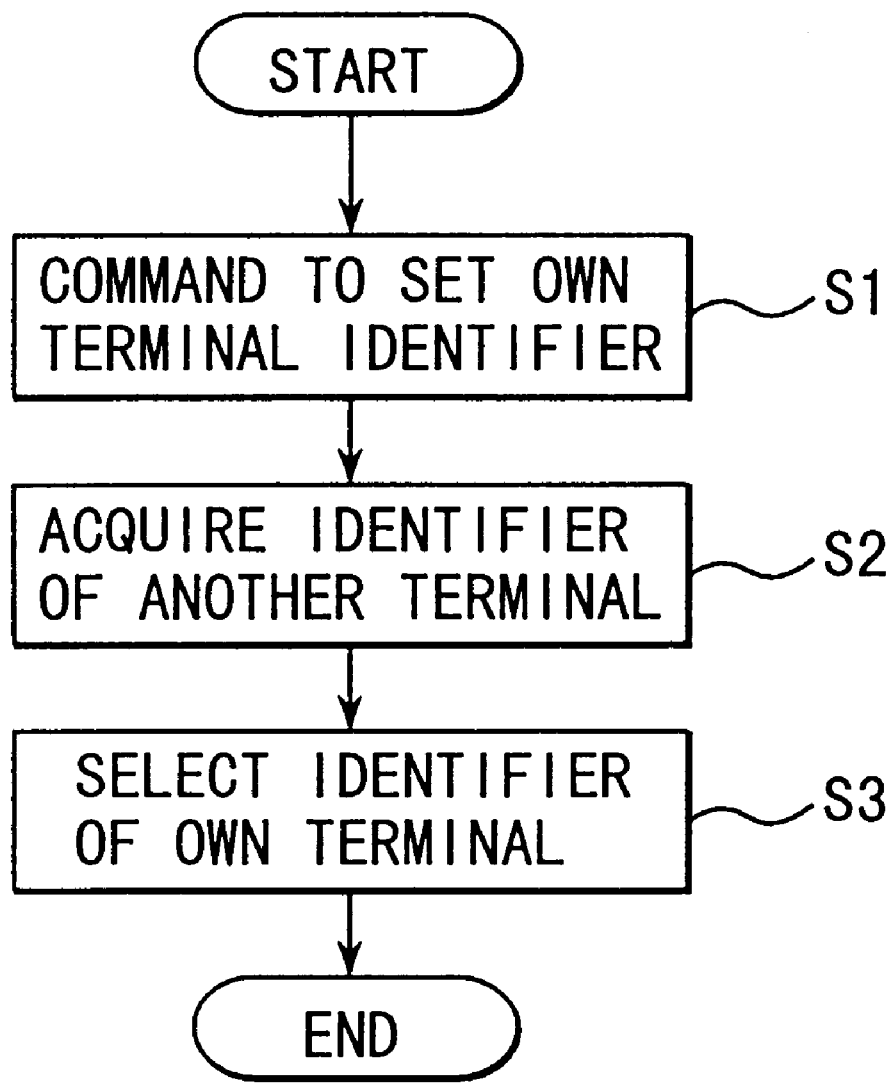
FIG. 8 is a flow chart showing a process for setting an own terminal identifier according to Embodiment 1 of the present invention.

Main steps of the method described in Embodiment 1 to Embodiment 3 are shown in a flow chart shown in FIG. 8. FIG. 8 is a flow chart of a process to be performed when a demand to set the own terminal has been made. When an instruction to set the own terminal identifier has been made (s1), the identifiers of other terminals, from which information has been received, is acquired (s2). Then, an identifier, which is not the identifier of another terminal, is selected from candidates of terminal identifiers so as to be set as the terminal identifier of the own terminal (s3).

Embodiment 4

Embodiment 4 will now be described with reference to FIGS. 9 to 11.

Figures 9, 10:
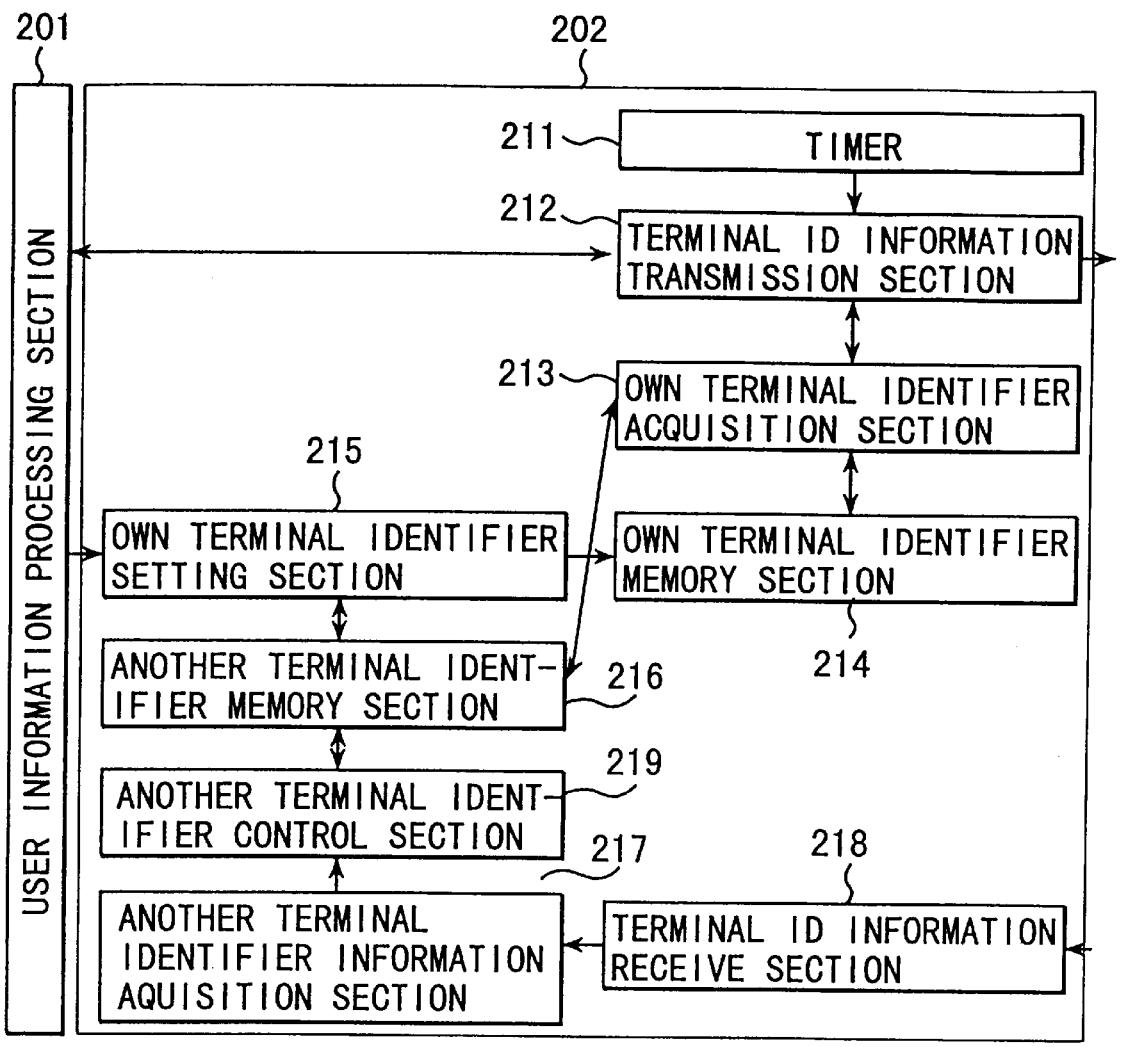
FIG. 9 is a block diagram showing a communication control apparatus according to Embodiment 4 of the present invention.
FIG. 10 shows terminal ID information according to embodiment 4 of the present invention.

FIG. 9 is a structural view showing a communication apparatus according to this embodiment and comprising a user information processing section 201 for executing a so-called application and a communication control section 202 for controlling the communication. A terminal ID information transmission section 212 receives the information about the set interval by a timer 211 or a command issued from the user information processing section 201 to transmit an identifier registered in an another terminal identifier memory section 216 as peripheral terminal information together with the terminal identifier of the own terminal and a specific terminal identifier with which the own terminal can be specified as the terminal ID information. An own terminal identifier acquisition section 213 acquires the identifier of the own terminal from the own terminal identifier memory section 214. An own terminal identifier setting section 215 follows a demand from the user information processing section 201 to set the identifier as the identifier of the own terminal. Then, the own terminal identifier setting section 215 registers the set identifier to the own terminal identifier memory section 214. A terminal ID information receive section 218 receives the terminal ID information and the received information is supplied to an another terminal identifier acquisition section 217. The another terminal identifier acquisition section 217 acquires the terminal identifier and the peripheral terminal information from the terminal ID information, and then supplies the acquired information to an another terminal identifier control section 219. The another terminal identifier control section 219 updates the another terminal identifier memory section 216 in accordance with the information supplied from the another terminal identifier acquisition section 218.

A process to be perform ed by the own terminal identifier setting section 215 of the apparatus according to Embodiment 4 will now be described while taking the state shown in FIG. 4 as an example.

Referring to FIG. 4, seven terminals exist which consist of communication terminals C1 to C5, C8 and Cn. As shown in FIG. 4, the areas in which the terminal Cn and the terminal C4 are able to perform communication are surrounded by circles to indicate the area. That is, the terminal Cn is able to communicate with the terminals C1, C2, C3 and C4 and cannot communicate with the terminals C5 and C8. A table indicating terminals with which each terminal is able to have a communication is shown in FIG. 5.

FIG. 10 shows terminal ID information to be transmitted from the terminal C1.

Figures 11, 12:
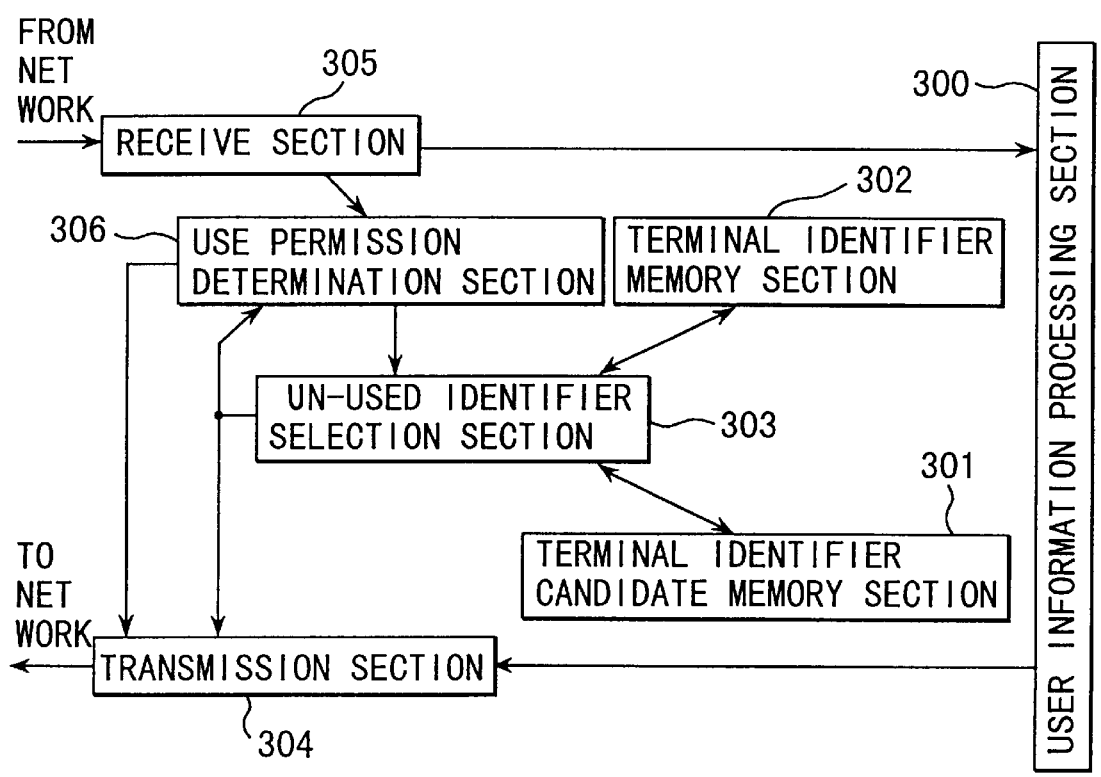
FIG. 11 shows information memorized in another terminal memory section according to Embodiment 4 of the present invention.
FIG. 12 is a block diagram showing the communication control apparatus according to Embodiment 5 of the present invention.

The terminals C1 to C4 periodically broadcast terminal ID information as shown in FIG. 11. The terminal ID information receive section 218 of the terminal Cn is able to receive terminal ID information from the terminals C1 to C4 among the foregoing terminals. When the terminal Cn has received the terminal ID information, the received terminal identifier is compared with the terminal identifiers memorized in the another terminal identifier memory section 216. If the received terminal identifier has not been registered, the received terminal identifier and the peripheral terminal information is registered in the another terminal identifier memory section 216. If the received terminal identifier has been registered, the update time of the received terminal identifier is set to the present time. If the peripheral terminal information is different from the previous peripheral terminal information, the peripheral terminal information is changed. Thus, the received terminal ID information is used to make a table shown in FIG. 11 in the another terminal identifier memory section 216.

If the update time is not updated for a predetermined time, a determination is made that communication with a terminal having the terminal identifier, the update time of which is not updated, cannot be held. Thus, the terminal identifier is deleted from the another terminal identifier memory section 216.

If a demand of setting an own terminal identifier is made from the user information processing section 201 to the own terminal identifier setting section 215, the own terminal identifier setting section 215 sets the identifier as follows.

Initially, information in the another terminal identifier memory section 216 is acquired to calculate all identifiers which are being used by other terminals. The calculation is performed by retrieving all identifiers existing in the terminal identifier fields and peripheral terminal fields shown in FIG. 11. In accordance with a result of the retrieval, whether the identifiers C1 to C5 and C8 can be detected.

In accordance with the result above, an identifier setting method is employed in which the identifier is set to be a smallest identifier among identifiers that are not being used. In this case, the identifier is set to be C6.

Moreover, random numbers may be used to determine a number which is given to an empty identifier so as to be used as the identifier. If 37 is determined by using the random numbers, the identifier may be set to be C37.

As an alternative to this, a largest identifier may be previously determined among unused identifiers and the identifier may be set to the largest number.

Another method may be employed which comprises the steps of determining a largest identifier, using random numbers and determining the identifier to be an identifier which approximates the determined random number.

As described above, a terminal identifier with which each terminal can be identified is determined by each terminal and the determined terminal identifier and the specific terminal identifier are broadcasted to peripheral terminals so that each terminal is discriminated among the terminals by using the terminal identifiers and the specific terminal identifiers. Thus, a terminal identifier expressed by a small address space can be used to transmit data while instructing a terminal with which communication is intended to be held.

Embodiment 5

Embodiment 5 of the present invention will now be described with reference to FIG. 12.

A user information processing section 300 is a section for executing a so-called application. A terminal identifier candidate memory section 301 is a section for memorizing candidates of terminal identifiers for use to identify adjacent terminals with which communication can be held. As the memorization method, a list of candidates may be memorized or a maximum or minimum value may be memorized if, for example, integers are used as the identifiers.

A terminal identifier memory section 302 is a section for memorizing identifiers which are being used in adjacent terminals with which communication can be held. An unused identifier selection section 303 is a section for selecting an identifier which has not been provided for adjacent terminals with which communication can be held. Among the identifiers memorized in the terminal identifier candidate memory section 301, identifiers which are not memorized in the terminal identifier memory section 302 are unused identifiers. One identifier is selected from unused identifiers. The selected identifier is, as unused identifier information, transferred to a transmission section 304 and a use-permission determination section 306. The un used identifier information is memorized for a predetermined time after it has been transferred to the transmission section 304 and the use-permission determination section 306. If a permission of use is informed from the use-permission determination section 306 during memorization, the ID information is notified to the terminal identifier memory section 301 to select new unused identifier information. If a permission of use is not transferred in a predetermined period, the memorized ID information is again transferred to the transmission section 304 and the use-permission determination section 306. Then, transference of the use of permission is again waited for a predetermined time. The transmission section 304 is a section for transmitting user information, unused identifier information and permission of use to a network. A receive section 305 is a section for receiving user information, a petition for permission for use and the like. In a case where received information is user information addressed to the own terminal, the information is transferred to the user information processing section 300. If the received information is petition for permission for use, the information is transferred to the use-permission determination section 306.

The use-permission determination section 306 is a section for determining whether use is permitted in a case where the petition for permission is received. If an identifier indicating an inquiry whether a terminal uses the identifier has been transferred from the unused identifier selection section 303, the identifier is memorized for a predetermined time. If a petition for permission for use is transferred from the receive section 305 during memorization, a fact can be detected that a terminal intended to use the memorized identifier exists. Then, the use-permission determination section 306 determines whether use is permitted. If use is permitted, permission of use is transferred to the transmission section 304 and the unused identifier selection section 303. If use is not permitted, the use-permission determination section 306 does not perform any operation. As an alternative to this, a fact that use is not permitted is clarified by transferring inhibition of use to the transmission section 304.

As a result, an identifier can be assigned to each communication terminal which has made a petition for permission for use.

If a function for resetting the assignment of the identifiers arranged to be capable of deleting all identifiers memorized in the terminal identifier memory section 302 is provided, the assignment of the identifiers can easily be redone.

Embodiment 6

Figure 13:
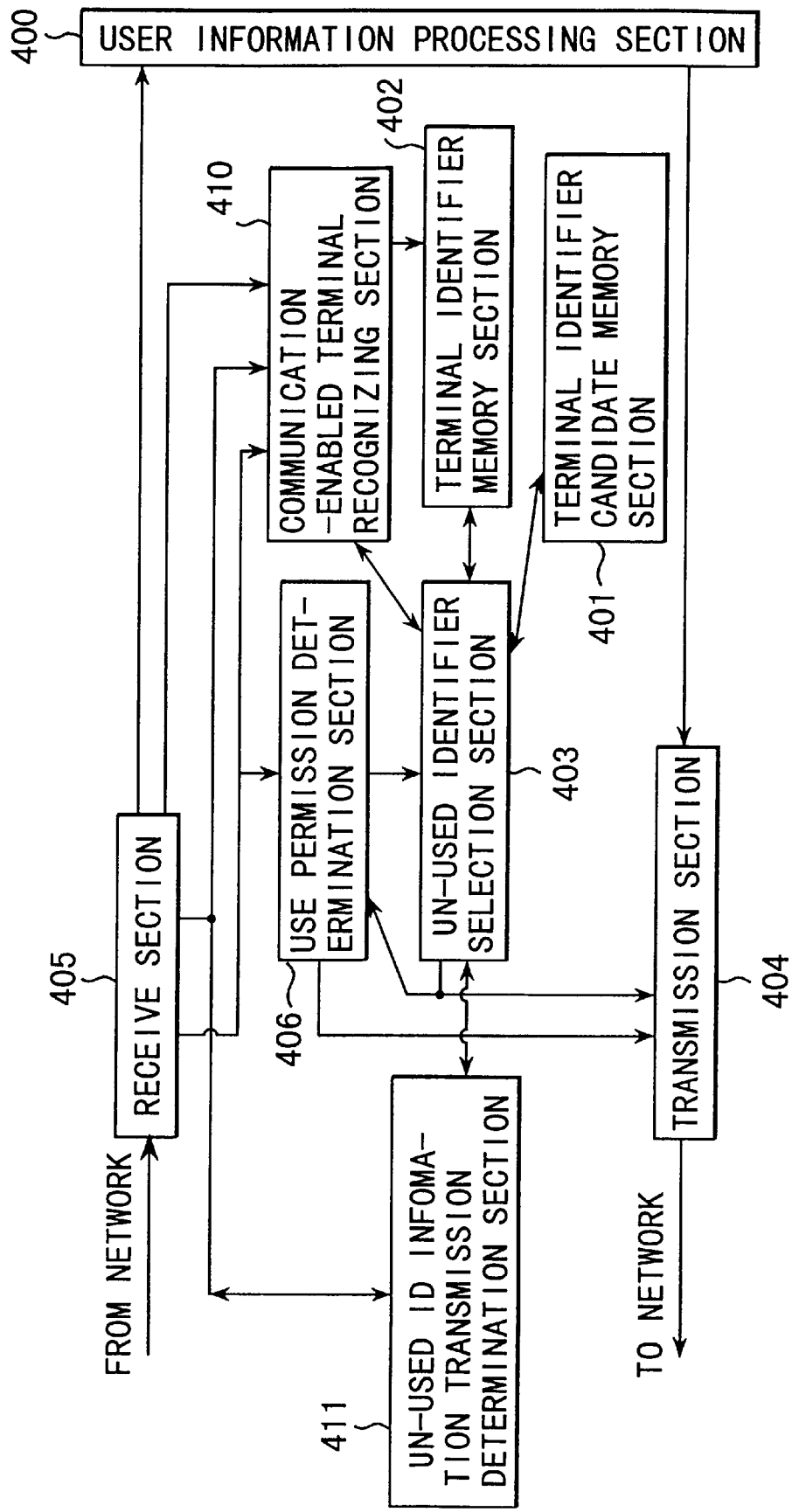
FIG. 13 is a block diagram showing the communication control apparatus according to Embodiment 6 of the present invention.

Embodiment 6 will now be described with reference to FIG. 13.

A user information processing section 400 is a section for executing a so-called application. A terminal identifier candidate memory section 401 is a section for memorizing candidates of terminal identifiers for use to identify adjacent terminals with which communication can be held. As a method of memorization, a list of the candidates may be memorized. In a case where, for example, integers are used as the identifiers, maximum and minimum values may be memorized.

A terminal identifier memory section 402 is a section for memorizing identifiers which have been used by adjacent terminals with which communication can be held. The memorized identifiers are transferred from an unused identifier information selection section 403 and a communication-enabled terminal recognition section 410.

The unused identifier selection section 403 is a section for selecting an identifier which has not been used in adjacent terminals with which communication can be held. Prior to starting selecting the unused identifier, whether the unused identifier information is transmitted is inquired to the unused identifier information transmission determination section 411. If a reply to perform transmission is received from the unused identifier information transmission determination section 411, the unused identifier is selected and transmitted to a transmission section 404.

If a reply of no transmission of the unused identifier information is received from the unused identifier information transmission determination section 411, no operation is performed. A process may be employed which comprises the steps of waiting for a reply for a predetermined time, and again making an inquiry to the unused identifier information transmission determination section 411 whether the unused identifier information is transmitted. As an alternative to this, supply of a transmission start signal from the unused identifier information transmission determination section 411 may be waited for.

In a case where information of the unused identifier is transmitted, identifiers among those memorized in the terminal identifier candidate memory section 401 that are not memorized in the terminal identifier memory section 402 are unused identifiers. One of the unused identifiers is selected. The selected identifier is, as unused identifier information, transferred to the transmission section 404 and a use permission determination section 406. The unused identifier information is memorized for a predetermined time after it has been transferred to the transmission section 404 and the use permission determination section 406. If a permission for use has been notified from the use permission determination section 406 during memorization, ID information is notified to the terminal identifier memory section 402, and then a new unused identifier information is selected. If the permission for use is not supplied in a predetermined time, the held ID information is again transferred to the transmission section 404 and the use permission determination section 406. Then, transference of the permission for use is again waited for a predetermined time.

The transmission section 404 is a section for transmitting user information, unused identifier information, permission for use and the like to the network. A receive section 405 is a section for receiving user information, petition for permission for use, unused identifier information, permission for use and the like transmitted to the network. If the received information is user information addressed to the own terminal, it is transferred to the communication-enabled terminal recognition section 410. The petition for permission for use is transferred to the use permission determination section 406 and the communication-enabled terminal recognition section 410. If the received information is unused identifier information, it is transferred to the communication-enabled terminal recognition section 410 and unused identifier information transmission determination section 411. The permission for use is transmitted to the communication-enabled terminal recognition section 410.

The use permission determination section 406 is a section for determining whether use is permitted if the petition for permission for use has been supplied. If an identifier indicating an inquiry whether a terminal which uses the identifier exists is supplied from the unused identifier selection section 403, the identifier is memorized for a predetermined time. If a petition for permission for use is supplied from the receive section 405 during memorization, a fact can be detected that a terminal intended to use the memorized identifier exists. Whether use is permitted is determined. If use is permitted, permission for use is supplied to the transmission section 404 and the unused identifier information selection section 403. If use is not permitted, no operation is performed. As an alternative to this, inhibition of use may be transferred to the transmission section 404 to clarify inhibition of use.

The communication-enabled terminal recognition section 410 is a section for recognizing terminals existing around the own terminal and with which communication can be held. If unused identifier information is supplied from the receive section 405, the unused identifier information is memorized for a predetermined time. If the petition for permission for use and corresponding permission for use are supplied from the receive section 405 during memorization, a consideration is performed that a communication terminal exists which uses the memorized unused identifier information. Thus, the identifier is notified to the terminal identifier memory section 402.

The unused identifier information transmission determination section 411 is a section for determining whether unused identifier information is transmitted. If an inquiry whether the unused identifier information is transmitted is made from the unused identifier information selection section 403, a reply whether transmission is performed is made. The method of determining whether unused identifier information is transmitted is not limited particularly.

A method may be employed which comprises the steps of inhibiting transmission of unused identifier information during periodical supply of unused identifier information from the receive section 405, and starting transmitting the unused identifier information if the unused identifier information is not supplied for a predetermined time.

Another arrangement may be employed in which a transmission start signal is transmitted to the unused identifier information selection section 403 if the state where transmission must be inhibited is changed to a state where transmission must be performed.

As a result, even if a plurality of communication terminals each having the function of transmitting unused identifier information exist, an individual identifier can be assigned to each of the communication terminals which have made a petition for permission for use.

Embodiment 7

Embodiment 7 will now be described with reference to FIG. 14.

A user information processing section 600 is a section for performing a so-called application. A transmission section 601 is a section for transmitting, to the network, user information supplied from the user information processing section 600 and a petition for permission for use supplied from a use-permission petition section 603.

A receive section 602 is a section for receiving, from the network, user information, unused identifier information indicating identifiers which are not used by adjacent communication terminals and permission for use which indicates permission of use of unused identifiers. User information addressed to the own terminal is transferred to the user information processing section 600, while other user information is deleted. Unused identifier information and the permission for use are transferred to the use-permission petition section 603.

When unused identifier information has been transmitted to the use-permission petition section 603 from the receive section 602, the use-permission petition section 603 transfers petition for permission for use which indicates intention to use the ID information to the transmission section 601. Even after the petition for permission for use has been transferred, the unused identifier information is memorized for a predetermined time. If permission for use is supplied from the receive section 602 during memorization of the unused identifier information, a determination is performed that use of the memorized unused identifier is permitted. Thus, the identifier is transferred to the own terminal identifier memory section 604. After the own terminal identifier has been determined, the supplied unused identifier information is ignored.

The own terminal identifier memory section 604 is a section for memorizing an identifier for identifying the own communication terminal.

As a result, an identifier peculiar to the own terminal can be acquired in a new place if the unused identifier information can be received in the place.

Embodiment 8

Figure 15:
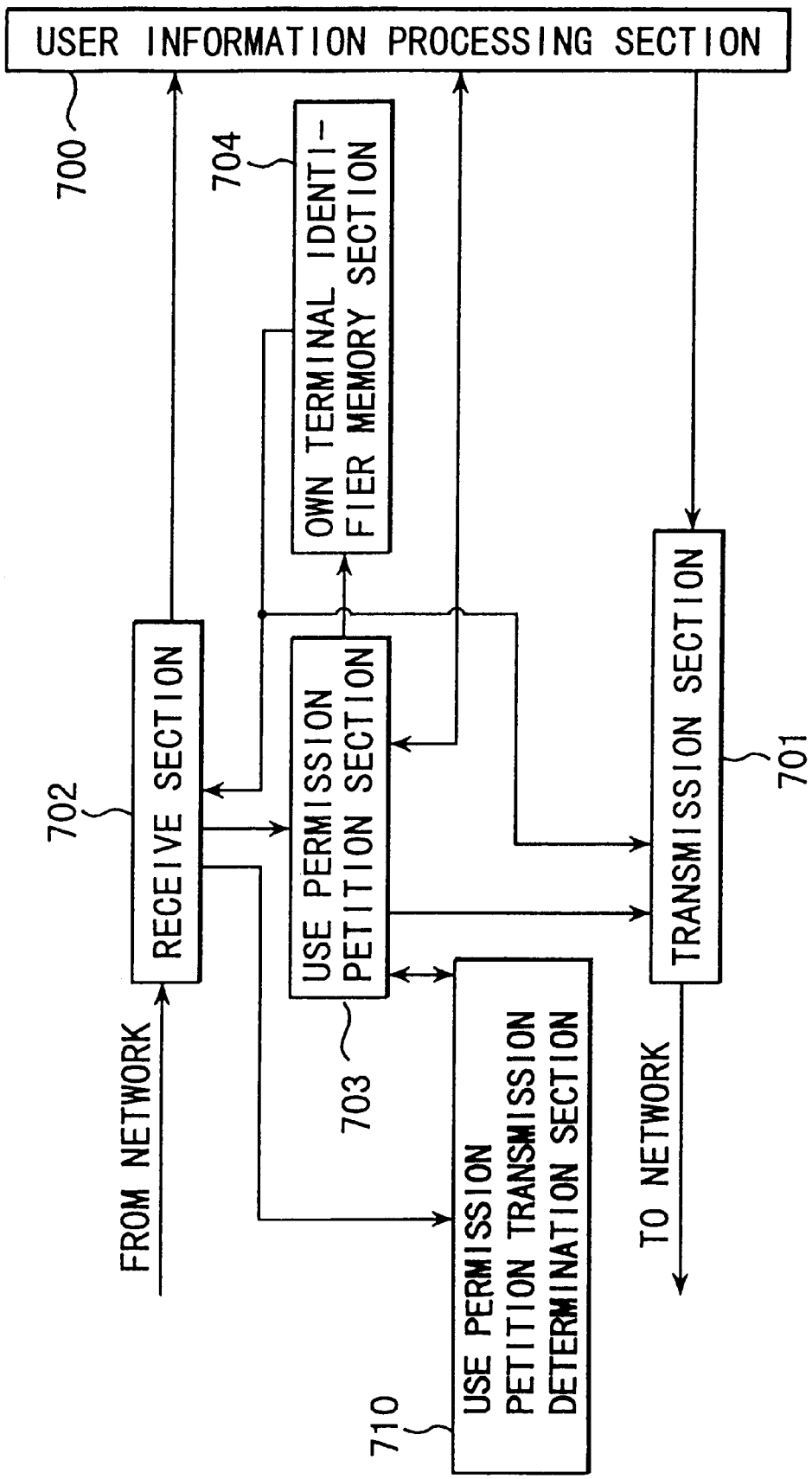
FIG. 15 is a block diagram showing the communication control apparatus according to Embodiment 8 of the present invention.

Embodiment 8 will now be described with reference to FIG. 15.

A user information processing section 700 is a section for executing a so-called application. A transmission section 701 is a section for transmitting, to a network, user information supplied from the user information processing section 700 and petition for permission for use supplied from a use-permission petition section 703. A receive section 702 is a section for receiving, from the network, user information, unused identifier information indicating identifiers which are not being used by adjacent communication terminals, permission for use which indicates permission for use of unused identifiers and petition for permission for use. User information addressed to the own terminal is transferred to the user information processing section 700, while other user information is deleted. The unused identifier information and permission for use are transmitted to a use-permission petition section 703. The petition for permission for use is transferred to a use-permission petition transmission determination section 710.

The use-permission petition section 703 is a section for transferring, to the transmission section 701, petition for permission for use which indicates an intention to use ID information if the ID information is supplied from the receive section 702. Whether or not the petition for permission for use is transferred to the transmission section 701 is determined in accordance with a result of an inquiry made to the use-permission petition transmission determination section 710. If reply of transmission is made from the use-permission petition transmission determination section 710, the petition for permission for use is transferred to the transmission section 701.

Even after the petition for permission for use has been transferred, the unused identifier information is memorized for a predetermined time. If permission for use is supplied from the receive section 702 during memorization of the unused identifier information, a determination is performed that use of the memorized unused identifier is permitted. Thus, the identifier is transferred to the own terminal identifier memory section 704. After the own terminal identifier has been determined, the supplied unused identifier information is ignored.

If a reply of inhibition of the petition for permission for use is made from the use-permission petition transmission determination section 710, the unused identifier information is deleted. Then, an inquiry may be made to the use-permission petition transmission determination section 710 whether the petition for permission for use is again transmitted after waiting for a predetermined time. As an alternative to this, supply of a transmission start signal from the use-permission petition transmission determination section 710 may be waited for.

The own terminal identifier memory section 704 is a section for memorizing an identifier for identifying the own communication terminal.

The use-permission petition transmission determination section 710 is a section for determining whether the petition for permission for use is transmitted. If an inquiry whether the petition for permission for use has been made by the use-permission petition section 703, the use-permission petition transmission determination section 710 replies whether it is transmitted. The method of determining whether the petition for permission for use is transmitted is not limited particularly. For example, if the petition for permission for use, which has been transmitted to the same unused identifier, is received, transmission of the petition for permission for use may be interrupted because conflicting of petition for permission for use takes place.

In a case where a state where the petition for permission for use must be inhibited is changed to a state where it must be transmitted, as is taken place where user has shifted to a new place and intended to acquire a new identifier, a transmission start signal may be transmitted to the use-permission petition section 703.

As a result, even in a new place or even after the user has shifted to a new place, an identifier peculiar to the own terminal can be acquired if the unused identifier information can be received.

Embodiment 9

Embodiment 9 will now be described with reference to the drawings.

FIG. 16 is a structural view showing a communication apparatus according to this embodiment and comprising a user information processing section 801 for executing a so-called application and a communication control section 802 for controlling communication.

An information transmission section 810 satisfies a demand from a receipt confirmation transmission section 811 or a terminal ID information transmission section 813 to transmit information to a network.

The receipt confirmation transmission section 811 add own terminal identifier to receipt confirmation information of the terminal ID information, and then transmits the receipt confirmation information to a transmitter of the terminal ID information received by the terminal ID information receive section 817.

The terminal ID information transmission section 813 transmits the terminal identifier of the own terminal as terminal ID information in accordance with the set interval of a timer 811 or the user information processing section 801.

The terminal ID acquisition section 814 acquires identifier of the own terminal from the own terminal identifier memory section 815.

The own terminal identifier memory section 815 stores the identifier of the own terminal.

An information receive section 816 receives terminal ID information and receipt confirmation information, and then assigns information to the terminal ID information receive section 817 or the receipt confirmation receive section 818 depending upon the type of the received information.

When the terminal ID information receive section 817 has received the terminal ID information, it requires a receipt confirmation transmission section 811 to transmit confirmation of the receipt to the transmitter of the terminal ID information.

When the receipt confirmation receive section 818 has received the confirmation of the receipt, it transfers the confirmation of the receipt to a bi-direction confirmation section 821.

The bi-direction confirmation section 821 confirms whether the confirmation of the receipt is confirmation of receipt of terminal ID information from the own terminal. Then, a result of the confirmation is transferred to a terminal information control section 820. The terminal information control section 820 registers/updates the result of the confirmation to a terminal information memory section 819.

The operations to be performed by the bi-direction confirmation section 821 and the terminal information control section 820 of the apparatus shown according to Embodiment 9 will now be described while taking the situation shown in FIG. 4 for example. At present, terminal Cn is able to hold communication with terminals C1, C2, C3 and C4 and impossible to hold communication with terminals C5 and C8.

(1) The terminal Cn periodically broadcasts terminal ID information having the own terminal identifier. The terminal ID information may be transmitted to satisfy the requirement from the user information processing section 801.

(2) The terminal ID information transmitted from the terminal Cn is received by the information receive section 816 of each of the terminals C1 to C4.

If the terminals C1 to C4, which have received the terminal ID information, determine that the received information is the terminal ID information, they transfer the terminal ID information to the terminal ID information receiving section 817.

(3) The terminal ID information receiving section 817 add the terminal identifier in the received terminal ID information, and the own terminal identifier to receipt confirmation information, and then requires the terminal ID information transmission section 811 to transmit a confirmation of the receipt to the transmitter of the terminal ID information.

(4) When the terminal Cn has received the confirmation of the receipt of each of the terminals C1 to C4 at the information receive section 816, the information receive section 816 transfers the confirmation of the receipt to the receipt confirmation receive section 818.

(5) The receipt confirmation receive section 818 transfers, to the bi-direction confirmation section 821, the terminal identifier of the transmitter of the terminal ID information and the terminal identifier of the transmitter of the confirmation of the receipt in the confirmation of the receipt.

(6) If the terminal identifier of the transmitter of the terminal ID information is the same as the own terminal identifier, the bi-direction confirmation section 821 determines that the bi-direction communication has been confirmed, and then transfers the terminal identifier of the transmitter of the confirmation of the receipt to the terminal information control section 820.

If the terminal identifier is different from the own terminal identifier, the bi-direction confirmation section 821 determines that the bi-directional communication cannot be confirmed, and then deletes the confirmation of the receipt.

(7) When the terminal information control section 820 has received the terminal identifier of the transmitter of the confirmation of the receipt, the terminal information control section 820 investigates whether the terminal identifier exists in the terminal information memory section 819.

If the terminal identifier does not exist, the terminal identifier is, as a new terminal, registered to the terminal information memory section 819.

If the terminal identifier exists, the update time may be updated.

The terminal information control section 820 periodically checks the terminal information memory section 819. Then, the terminal information control section 820 sometimes determines that the link between a terminal identifier which has not been updated for a predetermined time and the own terminal has been disconnected and deletes the terminal identifier.

(8) By presenting the terminal information memory section 819 to the user information processing section 801, the user is able to know information of the surrounding link.

As a result of the foregoing procedure performed by each terminal, each terminal is able to independently detect the surrounding link situation. An example of the terminal information memory section 819 of the terminal Cn obtained as described above is shown in FIG. 17.

Figure 18:
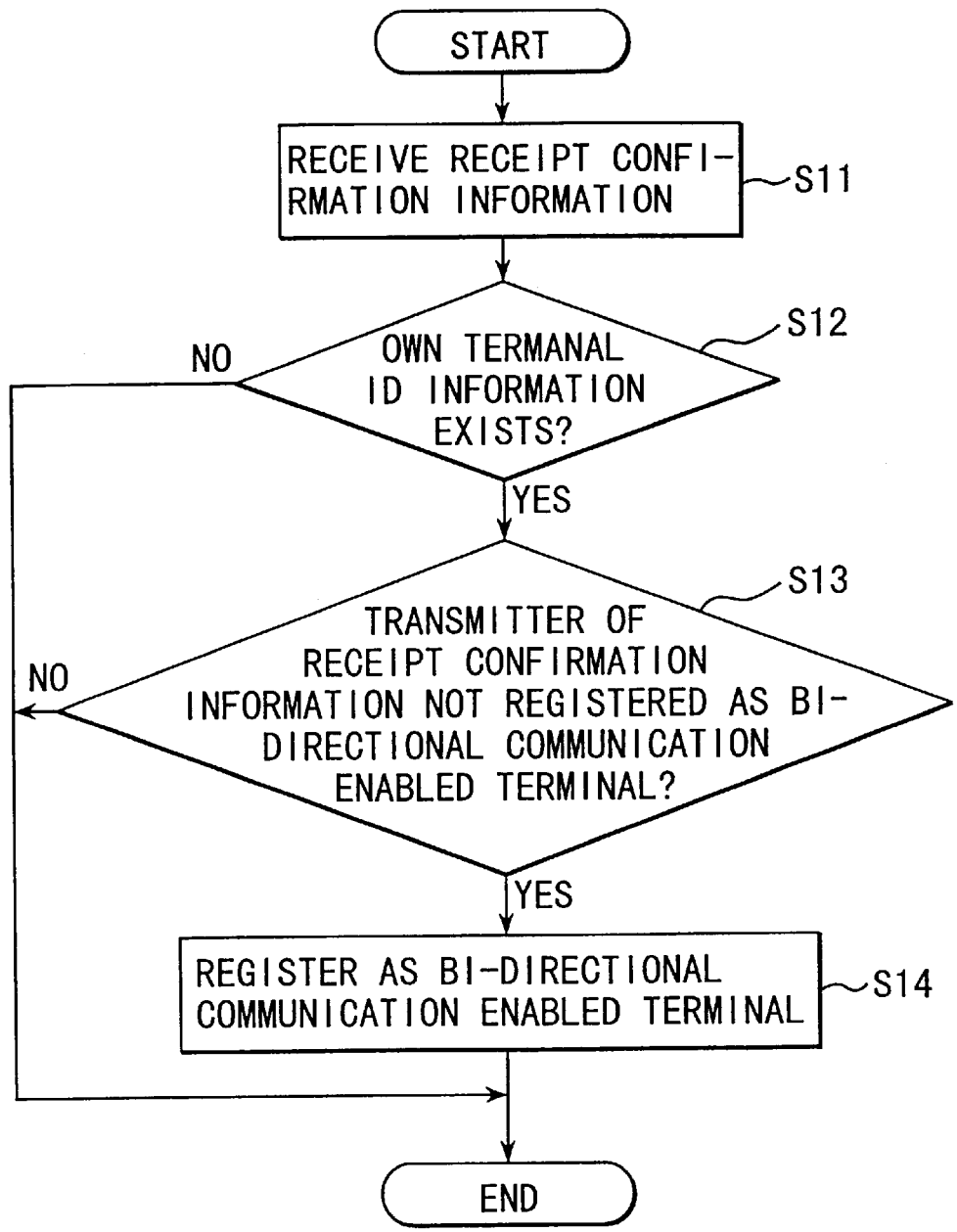
FIG. 18 is a flow chart of a process according to Embodiment 9 of the present invention to be performed when receipt confirmation information is received.

A flow of a process according to Embodiment 9 and to be performed when information of the confirmation of the receipt has been received is shown in FIG. 18. FIG. 18 is a flow chart of a process to be performed when information of the confirmation of the receipt has been received. When information of the confirmation of the receipt has been received (s11), a determination is performed whether the received information of the confirmation of the receipt contains terminal ID information of the own terminal (s12). If the terminal ID information of the own terminal is not contained, the process is ended here. If the same is contained, whether the terminal which has transmitted the information of the confirmation of the receipt has not been registered as the terminal capable of performing the bi-directional communication is determined (s13). If the same has been registered, the process is ended here. If the same has not been registered, it is registered as a terminal capable of performing the bi-directional communication (s14).

A process according to Embodiment 9 and to be performed when terminal ID information transmitted from another terminal has been received is shown in a flow chart shown in FIG. 19. When terminal ID information of another terminal has been received (s21), information of the confirmation of the receipt is formed by adding the received terminal ID information and the terminal ID information of the own terminal (s22). The formed information of the confirmation of the receipt is transmitted to the transmitter of the terminal ID information (s23).

Embodiment 10

Description will now be made about a method for the terminal information memory section 819 to manage detection of terminals with which another terminal permitted to be bi-directional-communicated with the own terminal can be communicated by a procedure similar to that according to Embodiment 9.

When the terminal ID information transmission section 813 transmits terminal ID information containing the terminal identifier, the terminal ID information transmission section 813 adds, as information of peripheral terminals capable of holding communication with the own terminal, the terminal identifier registered in the terminal information memory section 819.

The information receive section 816, which has received the terminal ID information, transfers the terminal ID information to the terminal ID information receiving section 817. The terminal ID information receiving section 817 transfers peripheral terminal information of the terminal ID information to the terminal information control section 820, and then requires the receipt confirmation transmission section 811 to transmit the confirmation of the receipt, similarly to Embodiment 9. At this time, the peripheral terminal information may be added to the confirmation of the receipt or addition may be omitted. The terminal information control section 820, which has received the peripheral terminal information, registers, to the terminal information memory section 819, the peripheral terminal information together with the terminal identifier of the transmitter of the terminal ID information.

As a result of the foregoing procedure performed by each terminal, each terminal is able to independently detect the peripheral link situation. Moreover, terminals with which the terminal permitted to be communicated with the own terminal can be communicated can be detected. An example of the thus-obtained terminal information memory section 819 of the terminal Cn is similar to that shown according to Embodiment 1 shown in FIG. 7.

Embodiment 11

Description will now be made about a method for the terminal information memory section 819 to manage detection of terminals with which another terminal permitted to be bi-directional-communicated with the own terminal can be communicated by a procedure similar to that according to Embodiment 9.

The information receive section 816, which has received the terminal ID information, transfers the terminal ID information to the terminal ID information receiving section 817. The terminal ID information receiving section 817, similarly to Embodiment 8, requires the receipt confirmation transmission section 811 to transmit the confirmation of the receipt. At this time, the terminal identifier of the own terminal and the terminal identifiers registered to the terminal information memory section 819 are, as information of peripheral terminals capable of holding communication with the own terminal, added to the confirmation of the receipt when transmission is performed.

The information receive section 816, which has received the confirmation of the receipt, transfers the confirmation of the receipt to the receipt confirmation receive section 818. The receipt confirmation receive section 818, which has received the confirmation of the receipt, transfers, to the bi-direction confirmation section 821, the terminal identifier of the transmitter of the terminal ID information, the terminal identifier of the transmitter of the confirmation of the receipt and the peripheral terminal information in the confirmation of the receipt. If the terminal identifier of the transmitter of the terminal ID information is the same as the own terminal identifier, the bi-direction confirmation section 821 transfers, to the terminal information control section 820, the terminal identifier of the transmitter of the confirmation of the receipt and the peripheral terminal information. If the terminal identifier is different from the own terminal identifier, the confirmation of the receipt is deleted. When the terminal information control section 820 has received the terminal identifier of the transmitter of the confirmation of the receipt and the peripheral terminal information, the terminal information control section 820 investigates whether the terminal identifier has been memorized in the terminal information memory section 819. If the terminal identifier is not memorized, the terminal identifier and the peripheral terminal information are registered to the terminal information memory section 819 as a new terminal. If the terminal identifier exists, the update time and the peripheral terminal information may be updated.

As a result of the foregoing procedure performed by each terminal, each terminal is able to independently detect the peripheral link situation. Moreover, terminals with which the terminal permitted to be communicated with the own terminal can be communicated can be detected. An example of the thus-obtained terminal information memory section 819 of the terminal Cn is similar to that shown according to Embodiment 1 shown in FIG. 7.

Embodiment 12

Embodiment 12 will now be described with reference to the drawings.

Figure 20:
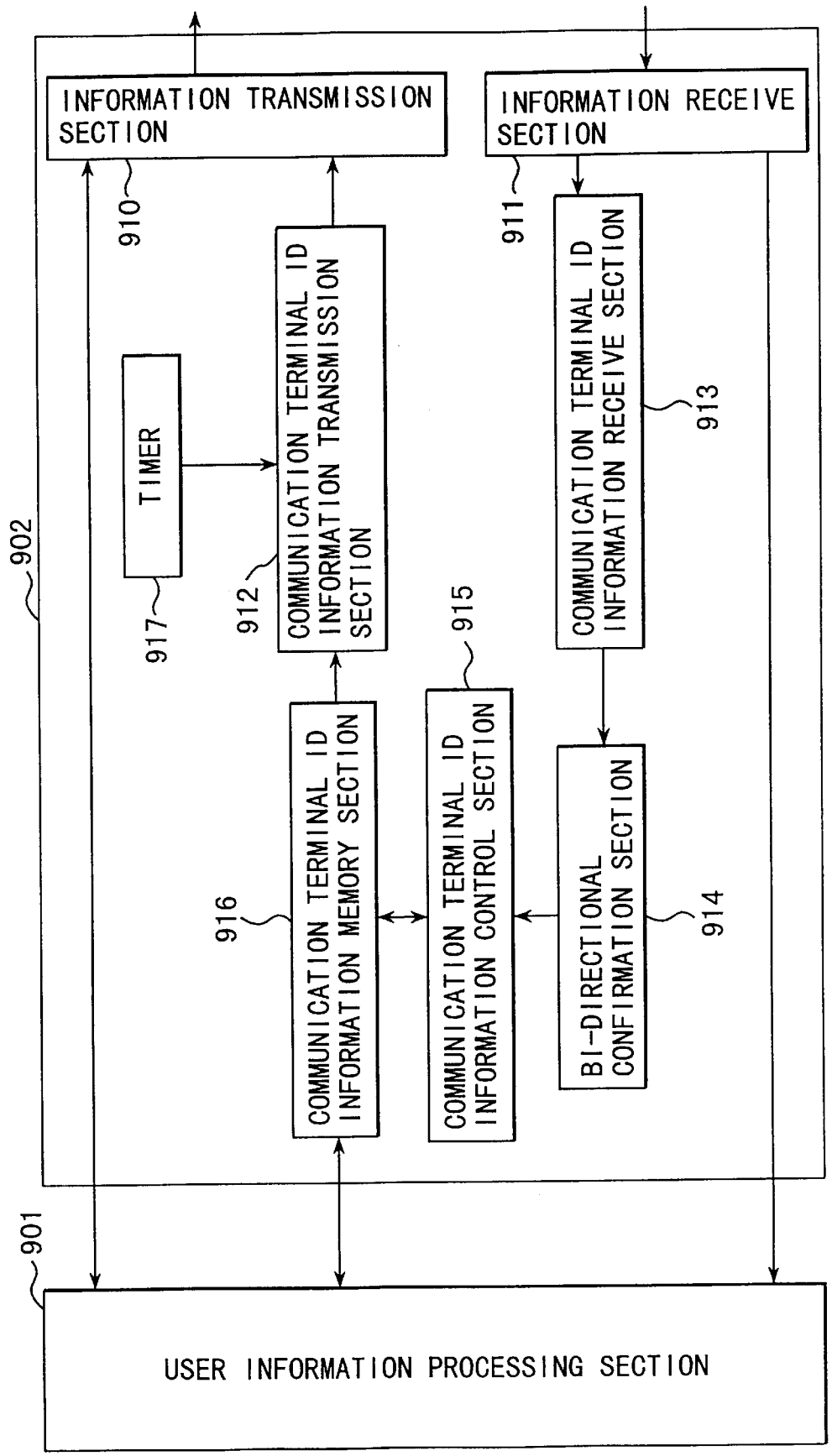
FIG. 20 is a block diagram showing the communication control apparatus according to Embodiment 12 of the present invention.

FIG. 20 is a structural view showing a communication apparatus according to this embodiment and comprising a user information processing section 901 for executing a so-called application and a communication control section 902 for controlling the communication.

The information transmission section 910 satisfies requirements from the communication terminal ID information transmission section 912 and the user information processing section 901 to transmit information to the network.

The communication terminal ID information transmission section 912 adds the own terminal identifier, the terminal identifier of the terminal registered in a communication terminal ID information memory section 916 and a state of communication with the terminal to transmit communication terminal ID information. The communication state includes a bi-directional communication enabled state and an only receipt enabled state.

An information receive section 911 receives the communication terminal ID information transmitted from another terminal and information transmitted from the user information processing section 901 to transfer the communication terminal ID information to a communication terminal ID information receive section 913.

The communication terminal ID information receive section 913 transfers the received communication terminal ID information to a bi-direction confirmation section 914.

The bi-direction confirmation section 914 confirms whether the supplied communication terminal ID information contains the terminal identifier of the own terminal, and then notifies a result of the confirmation to a communication terminal ID information control section 915.

Figure 23:
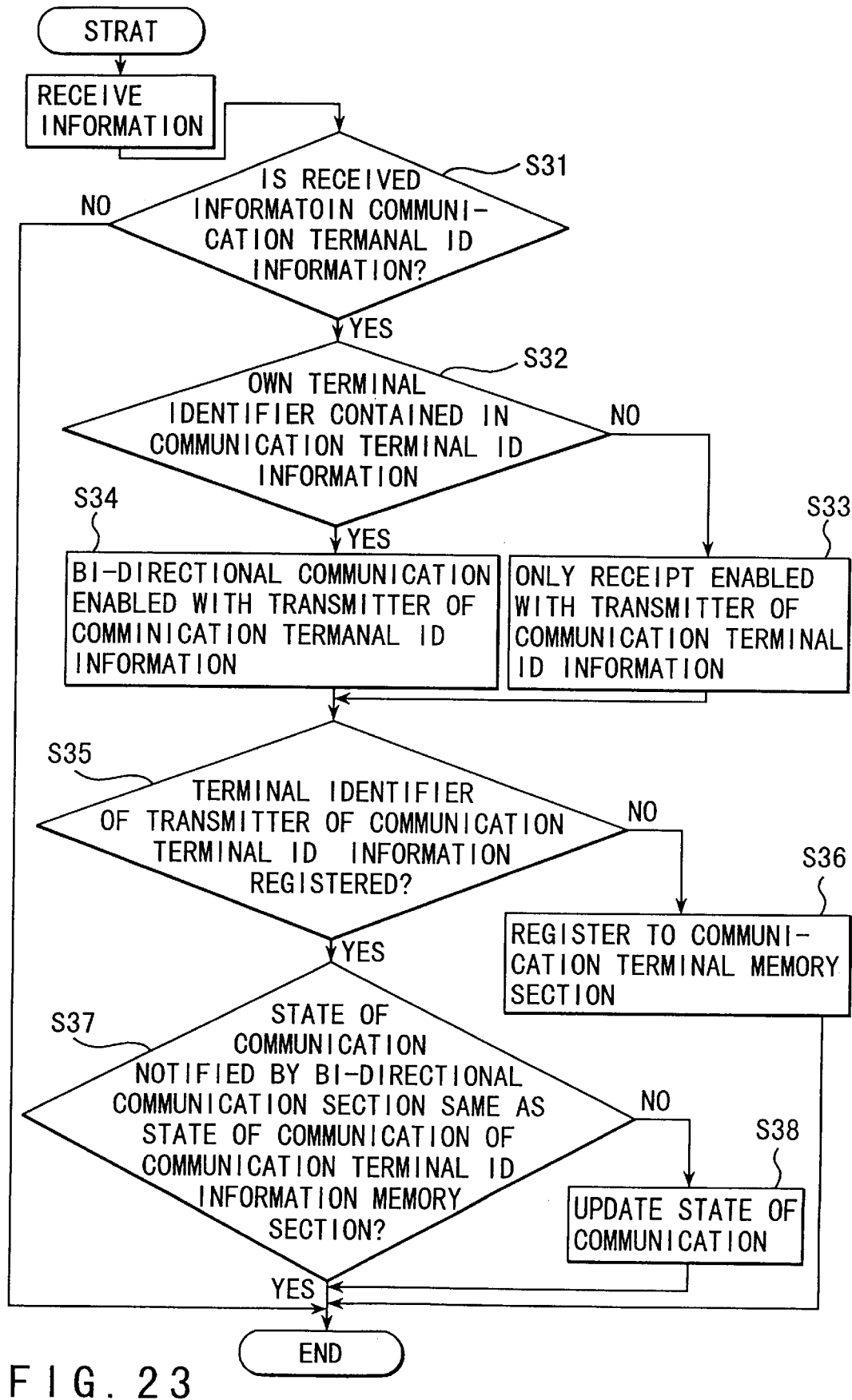
FIG. 23 is a flow chart showing processes to be performed by a bi-direction confirmation section and communication terminal ID information control section according to Embodiment 12 of the present invention.

Processes to be performed by the bi-direction confirmation section 914 and the communication terminal ID information control section 915 of the apparatus according to Embodiment 12 will now be described with reference to FIG. 23 while taking a situation shown in FIG. 4 similar to that according to Embodiment 1 for an example. The terminal Cn is able to hold communication with terminal C1, C2, C3 and C4 and cannot hold communication with terminals C5 and C8.

(1) The terminal Cn periodically broadcasts communication terminal ID information as shown in FIG. 21 and formed by adding the own terminal identifier and the terminal identifiers of terminals registered in the communication terminal ID information memory section 916 and serving as peripheral communication information.

(2) When the terminals C1 to C4, which have received the communication terminal ID information from the terminal Cn, determine that the received information is communication terminal ID information, the terminals C1 to C4 transfer the information from the communication terminal ID information receive section 913 to the bi-direction confirmation section 914 (S31).

(3) The bi-direction confirmation section 914 of each of the terminals C1 to C4 investigates whether the terminal identifier of the own terminal is contained in the communication terminal ID information (S32).

If the terminal identifier of the terminal is not contained, a fact that only receipt can be performed between the transmitter of the communication terminal ID information and the own terminal is notified to the communication terminal ID information control section 915 because information from the transmitter of the communication terminal ID information can be received (S33).

If the terminal identifier of the own terminal is contained, a fact that bi-directional communication can be performed between the transmitter of the communication terminal ID information and the own terminal is notified to the communication terminal ID information control section 915 because the transmitter of the communication terminal ID information has confirmed the receipt of information from the own terminal (S34).

In addition to the terminal identifier of the transmitter of the communication terminal ID information and the state of communication with the own terminal, peripheral communication information may be transferred to the communication terminal ID information control section 915 to notify the state of communication between the transmitter of the communication terminal ID information and peripheral terminals.

(4) When the communication terminal ID information control section 915 has received the terminal identifier and the state of communication with the terminal, the communication terminal ID information control section 915 investigates whether the identifier of the terminal is memorized in the communication terminal ID information memory section 916 (S35).

If the identifier is not memorized, the terminal identifier is, as a new terminal, register to the communication terminal ID information memory section 916 (S36).

If the identifier exists, the notified communication state and the communication state of the terminal register to the communication terminal ID information memory section 916 are compared with each other (S37).

If the two states are different from each other, the notified communication state is registered (S38).

If the two states are the same, the update time may be updated.

If information about communication with peripheral terminals is supplied, it may be registered to the communication terminal ID information memory section 916 as peripheral terminal information.

The communication terminal ID information control section 915 periodically checks the communication terminal ID information memory section 916. The communication terminal ID information control section 915 sometimes determines that link between a terminal having an identifier, which is not updated for a predetermined time or longer, and the own terminal has been cut, and then deletes the terminal identifier.

(5) The communication terminal ID information memory section 916 is presented to the user information processing section 901 so that the user is able to detect information of the present link with peripheral terminals.

As a result of the foregoing procedure performed by each terminal, each terminal is able to independently detect the peripheral link situation. An example of the thus-obtained the communication terminal ID information memory section 916 of the terminal Cn is shown in FIG. 22.

Embodiment 13-1

Embodiment 13-1 of the present invention will now be described with reference to FIG. 24.

A user information processing section 1100 is a section for executing a so-called application. A packet ID imparting section 1101 is a section for forming a group of information supplied from the user information processing section 1100 into one packet and imparting one ID to one packet. If information supplied from the user information processing section 1100 has a large quantity, it may be divided into a plurality of information sections each of which is formed into a packet to which ID is imparted. Since packets include packets of a type having information supplied from the user information processing section 1100 and confirmation packets for indicating receipt of a packet having information supplied from the user information processing section 1100, a flag indicating the type is provided. The packet having the flags indicating the ID and the type of the packet is transferred to a packet transmission section 1102 and a packet re-transmission section 1108. Moreover, the ID of the packet to be transmitted is notified to a receipt-confirmed packet counting section 1106.

The packet transmission section 1102 is a section for broadcasting, to a network, a packet supplied from the packet ID imparting section 1101, the packet re-transmission section 1108 or the receipt-confirmed packet generating section 1109. A broadcasting method is not needed to be limited particularly. A broadcasting method suitable to the network to which the packet is transmitted may be used. For example, a method may be employed in which no address header or the like is imparted and the receive side receives all of supplied packets. As an alternative to this, a method may be employed in which broadcast address is imparted to the packet to be transmitted and the receive side receives only the packet having the broadcast address.

A packet receive section 1103 is a section for receiving the packet broadcasted from the network and transferring the supplied packet to a received-packet determination section 1104.

The received-packet determination section 1104 determines the type of the packet transmitted from the packet receive section 1103 whether the packet being the information packet containing information supplied from the user information processing section 1100 or the receipt confirmation packet indicating receipt of the information packet. The determination is performed such that the flag imparted to the packet and indicating the type of the packet is investigated. If the packet is the information packet, the ID of the received packet is notified to a receipt confirmation packet generating section 1109. Moreover, an inquiry to a packet ID memory section 1105 is performed whether the packet has been transmitted or received by transmitting the packet ID. If a notification that the packet has not been transmitted or received is supplied from the packet ID memory section 1105, information of the packet is transmitted to the user information processing section 1100.

If the packet transmitted from the packet receive section 1103 is the receipt information packet, the ID of the packet to be confirmed is notified to the receipt-confirmed packet counting section 1106.

The packet ID memory section 1105 is a section for memorizing ID of packets which have been transmitted or received. When the packet ID memory section 1105 has received from the received-packet determination section 1104 the ID of the packet from and an inquiry whether the packet has been transmitted or received, the packet ID memory section 1105 compares it with the memorized ID so as to inform the received-packet determination section 1104 whether the ID has been memorized. If the ID has not been memorized, the ID is memorized. Moreover, also ID informed from the receipt-confirmed packet counting section 1106 is memorized.

The receipt-confirmed packet counting section 1106 is a section for counting the number of receipt confirmed packets of the packet ID notified from the packet ID imparting section 1101. If the ID notified from the received-packet determination section 1104 coincides with the ID notified from the packet ID imparting section 1101, a consideration is performed that the receipt confirmed packet corresponding to the packet transmitted from the own terminal has been received. Thus, the number of the receipt confirmed packets is increased by one. When the number of the received receipt confirmed packets has reached-the number notified from the receipt-confirmed packet number setting section 1107, a consideration is performed that information has been transmitted to all of terminals to which information in intended to be transmitted. This fact is notified to a packet re-transmission section 1108 together with the ID. If the number does not reach a predetermined number even after a predetermined time has elapsed, a consideration is performed that the packet must be transmitted again. This fact is, together with the ID of the packet needed to be transmitted again, notified to the packet re-transmission section 1108, and then the number of the receipt confirmed packets counted previously is reset.

The receipt-confirmed packet number setting section 1107 is a section for setting the number of the receipt confirmed packets with respect to the transmitted packets. The number of the receipt confirmed packets may be input manually from the user information processing section 1100. The set number is notified to the receipt-confirmed packet counting section 1106.

If the ID of a packet which is not needed to be transmitted again is notified, the packet re-transmission section 1108 transmits the packet having the ID to the packet transmission section 1102. If the ID of a packet, the necessity of transmission has been eliminated, is notified, the packet having the ID is deleted.

A receipt confirmation packet generating section 1109 is a section for generating a receipt confirmation packet for notifying receipt of information packet to other terminals. If the ID of an information packet received from the received-packet determination section 1104 is notified, the receipt confirmation packet generating section 1109 generates a packet having the notified ID and a flag indicating that the packet is the receipt confirmation packet. The generated packet is transmitted to the packet transmission section 1102.

Embodiment 13-2

Figure 25:
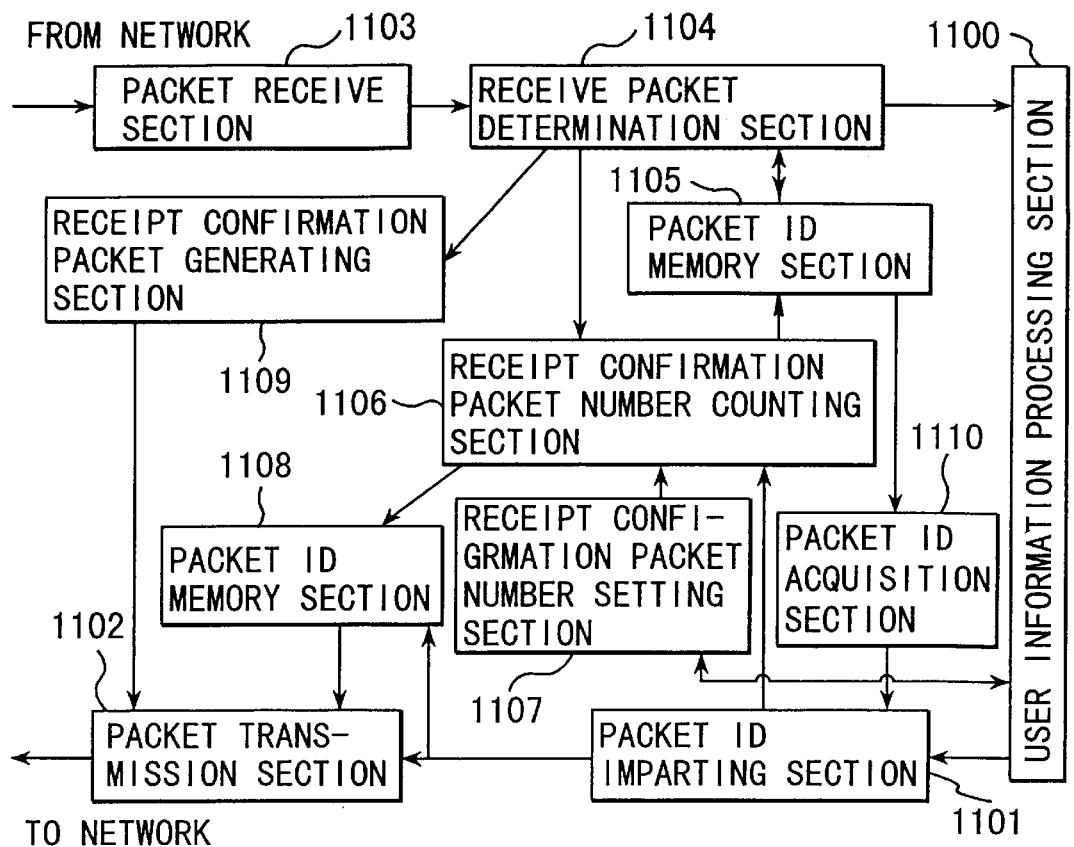
FIG. 25 is a block diagram showing the communication control apparatus according to Embodiment 13-2 of the present invention.

Embodiment 13-2 of the present invention will now be described with reference to FIG. 25.

Since this embodiment is different from Embodiment 13-1 in only a packet ID acquisition section 1110, description will be performed about only the portion relating to the packet ID acquisition section 1110.

The packet ID acquisition section 1110 is a section for acquiring ID to be imparted to a packet to be transmitted. When the packet ID imparting section 1101 has received the transmission packet from the user information processing section, it requires a packet ID to the packet ID acquisition section 1110. When the packet ID has been required, the packet ID acquisition section 1110 searches the packet ID which has not been used in the previous transmission and receipt by making an inquiry to the packet ID memory section 1105. A packet ID obtained due to the search is notified to the packet ID imparting section 1101. The method of searching the packet ID is not limited particularly. For example, candidates of the packet ID are selected by any method, whether the selected ID has been used is inquired to the packet ID memory section 1105, and the ID is notified to the packet ID imparting section 1101 if the ID has not been used. If the ID has been used, new candidates of the ID are selected and a similar procedure is repeated.

Although the acquired packet ID has not been used in the previous transmission and receipt, a method may be employed in which the contents of the packet ID memory section 1105 which stores the packet ID which have been used can be cleared. In a case where the contents can be cleared to satisfy an instruction from the packet ID acquisition section 1110, a portable information terminal may be used to clear the contents before transmission and receipt are commenced. Thus, the packet ID is not used up and, thus, the data transmission and receipt can semipermanently performed.

Embodiment 14-1

Figure 26:
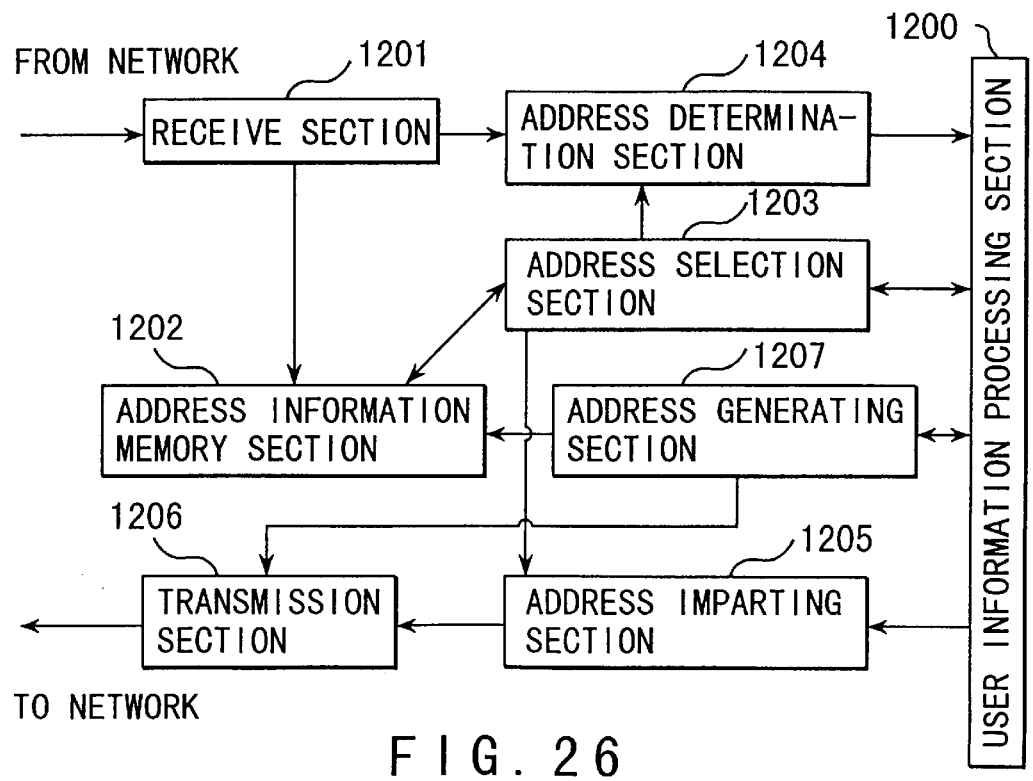
FIG. 26 is a block diagram showing the communication control apparatus according to Embodiment 14-1 of the present invention.

Embodiment 14-1 of the present invention will now be described with reference to FIG. 26.

A user information processing section 1200 is a section for executing a so-called application.

A receive section 1201 is a section for receiving information supplied from a network. Received information includes at least the two types, one of which is user transmission information transmitted from the user information processing section 1200 and the other one of which is address information about the address for use in transmitting or receiving user information. The type of the information can be detected by adding a flag indicating whether information is user transmission information or the address information to information to be transmitted. If the received information is user transmission information, the received information is transmitted to an address determination section 1204. If the received information is address information, the received information is transmitted to an address information memory section 1202. The address information memory section 1202 is a section for memorizing address information transmitted from the receive section 1201.

An address selection section 1203 is a section for selecting the address for use to transmit and receive user information. If the address selection requirement is supplied from the user information processing section 1200, address information is initially read from the address information memory section 1202 to present it to the user information processing section 1200. The user information processing section 1200 instructs the address, to which user information is intended to be transmitted and received, among the present address information to the address selection section 1203. The address to be selected is not limited to one and a plurality of addresses may be selected. After the address has been selected, the selected address is notified to the address determination section 1204 and the address imparting section 1205. The address, the use of which for transmitting and receiving information is interrupted, may be selected as well as selecting the address to and from which transmission and receipt are performed. A method similar to the foregoing method may be employed to perform communication with the user information processing section 1200 for selecting the address. When the address, the use of which is interrupted, has been selected, the address, the use of which is interrupted, is notified to the address determination section 1204 and the address imparting section 1205.

The address determination section 1204 transfers, to the user information processing section 1200, only user information, which is transferred to the address notified by the address selection section 1203, and which is contained in the user information transferred from the receive section 1201. The address, to which the user information has been transferred, is detected in accordance with address information imparted in the address imparting section 1205. The addresses except the selected address may be deleted. When the address, the use of which is interrupted, has been notified from the address selection section 1203, information which is hereinafter transferred to the address is deleted. In a case where a plurality of addresses, from which user information must be received, have been selected, user information and the address, to which the information has been transmitted, are informed.

The address imparting section 1205 adds, to user information, information for causing information transferred from the user information processing section 1200 to be transmitted to the address informed from the address selection section 1203. In a case where a plurality of addresses have been informed from the address selection section 1203, the address to which information is intended to be transmitted, is, together with user information, notified from the user information processing section 1200. User information, to which address information has been added, is transferred to a transmission section 1206.

The transmission section 1206 is a section for transmitting, to the network, user information transferred from the address imparting section 1205 or address information transferred from the address generating section 1207.

The address generating section 1207 is a section for generating new address information to satisfy a requirement from the user information processing section 1200. The generated address information is transmitted to the transmission section 1206 so as to be transmitted to another terminal, if necessary. If address information is periodically transmitted for example, the existence of the address can always be confirmed. Moreover, interruption of the transmission enables determination to be performed that the use of the address has been interrupted. As an alternative to this, transmission may be performed to satisfy a requirement from another terminal in place of the periodical transmission.

Figures 27, 28:
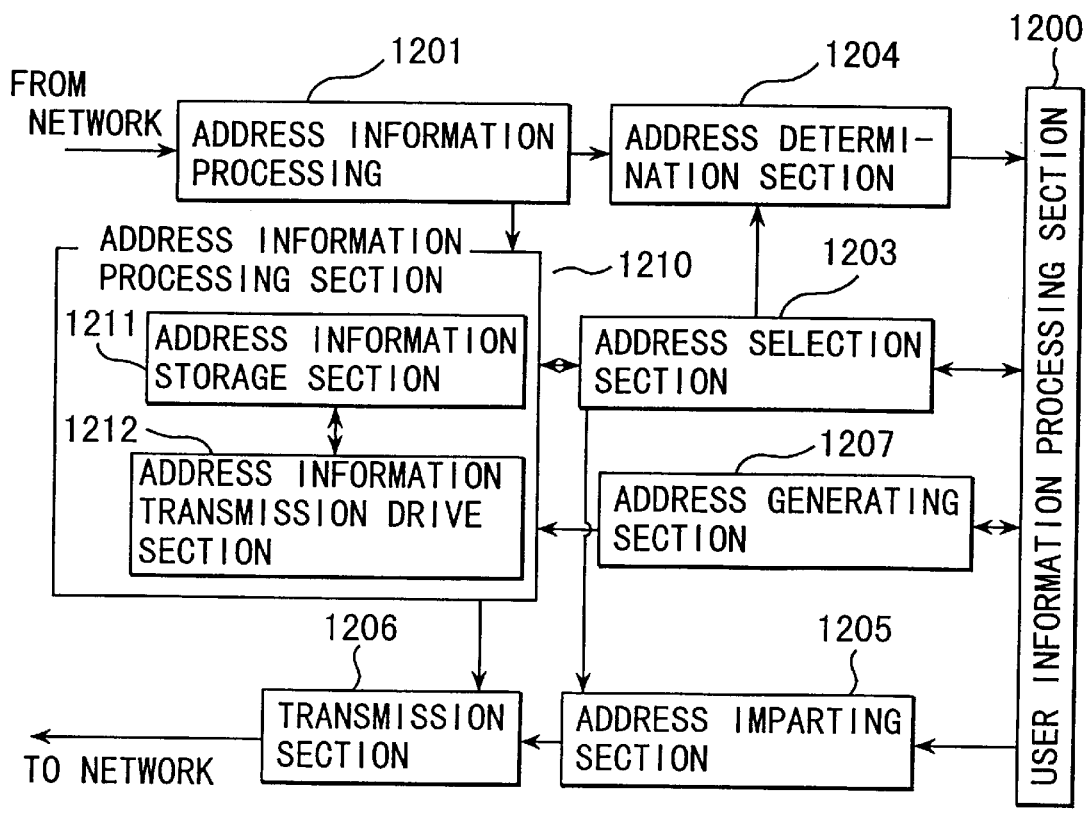
FIG. 27 shows address information according to Embodiment 14-1 of the present invention.
FIG. 28 is a block diagram showing the communication control apparatus according to Embodiment 14-2 of the present invention.

An example of address information is shown in FIG. 27. The address has a value, for example, numerals, which can easily be recognized by the terminal. A value in an address field is used to be imparted in the address imparting section 1205 or used to be determined in the address determination section 1204. The name of the address, which can be determined by a human being, enables the purpose of use of the address to easily be understood. The address set member names are names of users who have selected the address so that the persons, to which data has been transmitted, are detected. Moreover, address generation time and address usage period may be imparted.

Embodiment 14-2

Embodiment 14-2 of the present invention will now be described with reference to FIG. 28.

A user information processing section 1200 is a section for executing a so-called application. A receive section 1201 is a section for receiving information supplied from a network. Received information includes at least the two types, one of which is user transmission information transmitted from the user information processing section 1200 and the other one of which is address information about the address for use in transmitting or receiving user information. The type of the information can be detected by adding a flag indicating whether information is user transmission information or the address information to information to be transmitted. If the received information is user transmission information, the received information is transmitted to an address determination section 1204. If the received information is address information, the received information is transmitted to an address information processing section 1210.

An address selection section 1203 is a section for selecting the address for use to transmit and receive user information. If the address selection requirement is supplied from the user information processing section 1200, address information is initially read from the address information processing section 1210 to present it to the user information processing section 1200. The user information processing section 1200 instructs the address, to which user information is intended to be transmitted and received, among the present address information to the address selection section 1203. The address to be selected is not limited to one, and a plurality of addresses may be selected. After the address has been selected, the selected address is notified to the address determination section 1204 and the address imparting section 1205. The address, the use of which for transmitting and receiving information is interrupted, may be selected as well as selecting the address to and from which transmission and receipt are performed. A method similar to the foregoing method may be employed to perform communication with the user information processing section 1200 for selecting the address. When the address, the use of which is interrupted, has been selected, the address the use of which is interrupted is notified to the address determination section 1204 and the address imparting section 1205.

The address determination section 1204 transfers, to the user information processing section 1200, only user information, which is transferred to the address notified by the address selection section 1203, and which is contained in the user information transferred from the receive section 1201. The address, to which the user information has been transferred, is detected in accordance with address information imparted in the address imparting section 1205. The addressees except the selected address may be deleted. When the address, the use of which is interrupted, has been notified from the address selection section 1203, information which is hereinafter transferred to the address is deleted. In a case where a plurality of addresses, from which user information must be received, have been selected, user information and the address, to which the information has been transmitted, are informed.

The address imparting section 1205 adds, to user information, information for causing information transferred from the user information processing section 1200 to be transmitted to the address informed from the address selection section 1203. In a case where a plurality of addresses have been informed from the address selection section 1203, the address to which information is intended to be transmitted, is, together with user information, notified from the user information processing section 1200. User information, to which address information has been added, is transferred to a transmission section 1206.

The transmission section 1206 is a section for transmitting, to the network, user information transferred from the address imparting section 1205 or address information transferred from the address generating section 1207.

The address generating section 1207 is a section for generating new address information to satisfy a requirement from the user information processing section 1200. The generated address information is transmitted to the address information processing section 1210. The address information processing section 1210 is a section for memorizing address information to be transmitted or received to prepare transmission of the address information, if necessary. The address information processing section 1210 has an address information memory section 1211 and an address information transmission drive section 1212. The two sections will now be described.

The address information memory section 1211 is a section for memorizing address information transmitted from the receive section 1201 and the address generating section 1207.

The address information transmission drive section 1212 is a section for transmitting, to the transmission section 1206, address information among address information memorized in the address information memory section 1211 that is needed to be transmitted. The method of determining that the address information is needed to be transmitted is not limited particularly. A method may be employed in which address information generated by the own terminal is periodically transmitted. If the address information generated by the own terminal is periodically transmitted, each communication terminal is able to periodically receive the present address information.

If a communication terminal, which has been periodically transmitted a certain address information, interrupts transmission of address information because of leaving of the communication terminal or the like, another communication terminal cannot receive the address information which has been received. In this case, the address information may be considered to disappear and may be deleted from the address information memory section 1211. As an alternative to this, transmission of address information may be commenced in place of the terminal which has disappeared.

Embodiment 15

Figure 29:
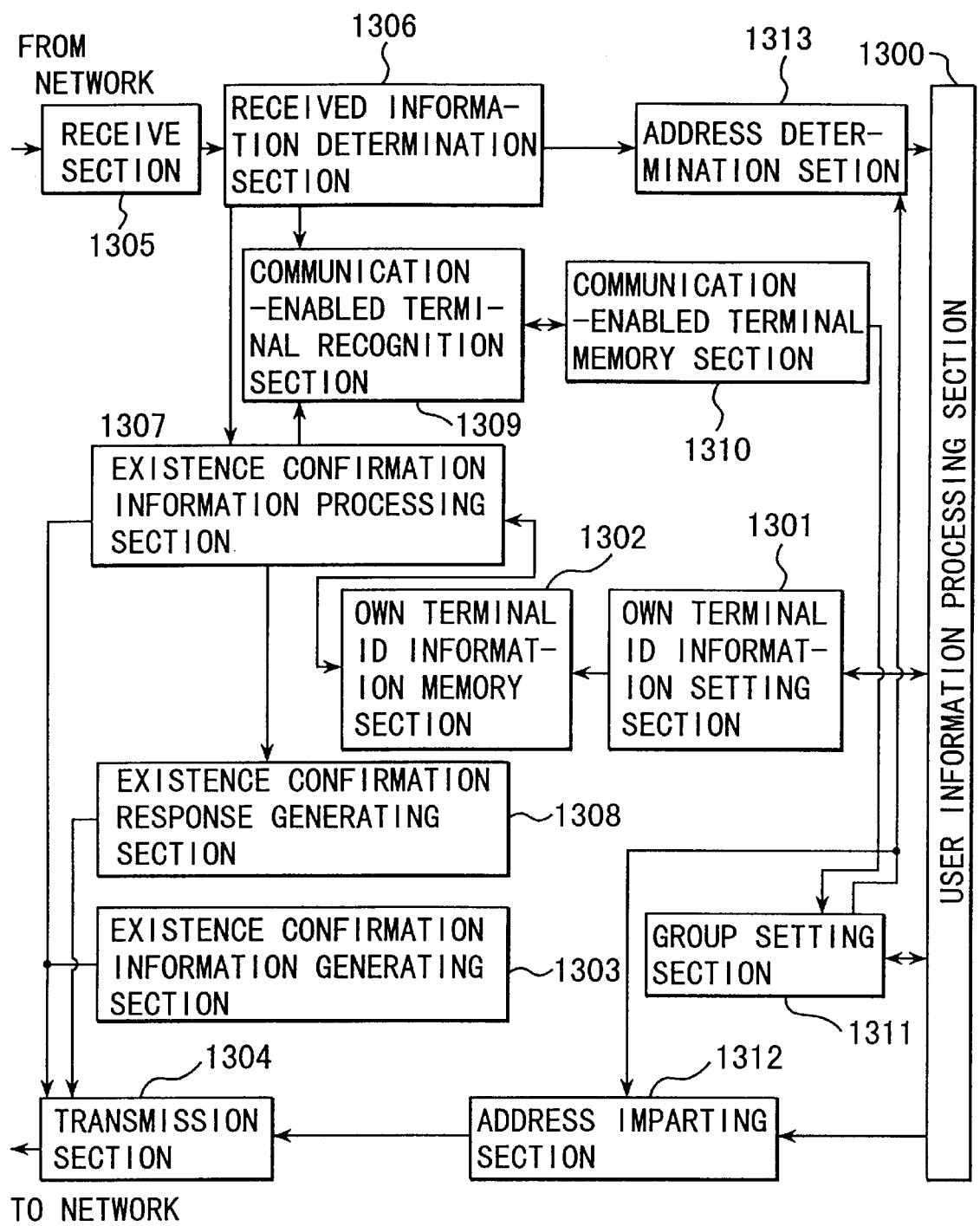
FIG. 29 is a block diagram showing the communication control apparatus according to Embodiment 15 of the present invention.

Embodiment 15 of the present invention will now be described with reference to FIG. 29.

A user information processing section 1300 is a section for executing a so-called application. An own terminal ID information setting section 1301 is a section for setting ID information of the own communication terminal. The method of setting and ID information are not limited particularly. A simplest method may be employed in which input from the user information processing section 1300 is used as ID information as it is. Another method may be employed in which a returned value of a function, the factor of which is the input from the user information processing section 1300, is employed as ID information. The set own terminal ID information is transferred to an own terminal ID information memory section 1302.

The own terminal ID information memory section 1302 is a section for memorizing own terminal ID information transferred from the own terminal ID information setting section 1301. The memorized ID information is used to recognize existence of a communication terminal in a manner to be described later.

An existence confirmation information generating section 1303 is a section for generating information for making an inquiry whether a communication terminal having a certain ID information exists. Existence confirmation information includes communication terminal ID information to be inquired and information indicating existence confirmation information. Generated existence confirmation information is transferred to a transmission section 1304 and an existence confirmation information processing section 1307.

The transmission section 1304 is a section for transmitting supplied information to the network. Information to be transmitted includes the foregoing existence confirmation information, existence confirmation response to be described later and user information to which address has been imparted.

A receive section 1305 is a section for receiving information transmitted from a transmission section of another communication terminal to the network. Received information is transferred to a received information determination section 1306.

The received information determination section 1306 is a section for determining the type of information transmitted from the receive section 1305. Information transmitted from the receive section 1305 may include existence confirmation information, existence confirmation response and user information. Existence confirmation information is transmitted to the existence confirmation information processing section 1307, while existence confirmation response is transmitted to a communication-enabled terminal recognizing section 1309, while user information is transmitted to an address determination section 1313.

The existence confirmation information processing section 1307 initially extracts ID information of the communication terminal, which is the subject, the existence of which has been confirmed, from transmitted existence confirmation information. The extracted ID information is subjected to a comparison with ID information of the own terminal memorized in the own terminal ID information memory section 1302. If the two ID information items coincide with each other, a consideration is performed that the existence of the own terminal has been inquired and this fact is informed to an existence confirmation response generating section 1308. If the extracted ID information and the ID information of the own terminal are different from each other, the extracted ID information is transferred to the communication-enabled terminal recognizing section 1309.

The existence confirmation response generating section 1308 is a section for generating existence confirmation response for informing, another terminal, coincidence of the ID information, the confirmation of the existence of which has been inquired, with the ID information of the own communication terminal. Coincidence of the inquired ID information and the ID information of the own terminal can be detected from notification from the existence confirmation information processing section 1307. When notification that the inquired ID information and the own ID information coincide with each other has been supplied, existence confirmation response is immediately generated so as to be transmitted to the transmission section 1304.

The communication-enabled terminal recognizing section 1309 is a section for recognizing adjacent terminals with which communication can be held. When the communication-enabled terminal recognizing section 1309 has received ID information, which has been extracted by the existence confirmation information processing section 1307 and the existence of which has been inquired, the communication-enabled terminal recognizing section 1309 stores it for a predetermined time. Any method may be employed to determine the memorizing time. The method may previously be determined to follow an instruction from the user information processing section 1300. In this case, a default value may be determined if no instruction is issued from the user information processing section 1300. The method may appropriately be changed to be suitable to the busyness of the network. If the network is busy, the memorizing time may be elongated. If the network is not busy, the memorizing time may be shortened. Another method may be employed in which the ID information is maintained until notification of next ID information is supplied from the existence confirmation information processing section 1307.

In a case where the existence confirmation response has been transmitted from the received information determination section 1306 during memorization of ID information, a determination is performed that a communication terminal having the memorized ID information exists and ID information is transmitted to the communication-enabled terminal memory section 1310. If the existence confirmation response is not transmitted in a predetermined time in which the ID information is memorized, the memorized ID information is deleted.

The communication-enabled terminal memory section 1310 is a section for memorizing ID information of terminals which has been transmitted from the communication-enabled terminal recognizing section 1309 and with which communication can be held at present.

A group setting section 1311 is a section for setting a group-of communication terminals among communication-enabled terminals memorized in the communication-enabled terminal memory section 1310 to which information is intended to be transmitted simultaneously. The setting operation basically is performed to follow an instruction from the user information processing section 1300. A portion from the user information processing section 1300 to an address imparting section 1312 for setting a group is a section for imparting information indicating the group among the groups memorized in the group setting section 1311 to which the user information is transmitted.

An address determination section 1313 is a section for transmitting, to the user information processing section 1300, only information contained in user information transmitted from the received information determination section 1306 that has been transmitted to the group to which the own terminal belongs. Information transmitted to another group to which the own terminal does not belong is deleted.

As a result, terminals which exist around the own terminal and with which communication can be held can be recognized, a group can be formed by the recognized communication-enabled terminals and information can simultaneously be transmitted to the terminals belonging to the group.

In a case where the terminal recognized to be communication-enabled terminal has disappeared, the disappearance can be detected when existence confirmation response with respect to the existence confirmation information of the terminal ID information memorized in the communication-enabled terminal recognizing section 1309 has disappeared.

Generation of the existence confirmation information may be inhibited during receipt of existence confirmation information from another terminal. In this case, if a terminal to which existence confirmation information is transmitted disappears in the vicinity of the own terminal, whether the generation of existence confirmation information is performed may be determined by any method. For example, each communication terminal which has detected interruption of receipt of the existence confirmation information is arranged to generate and transmit existence confirmation information after it has waited for a certain random time. Since the terminal which has selected the shortest waiting time initially generates and transmits existence confirmation information, other terminals interrupt generation and transmission of existence confirmation information.

Figure 30:
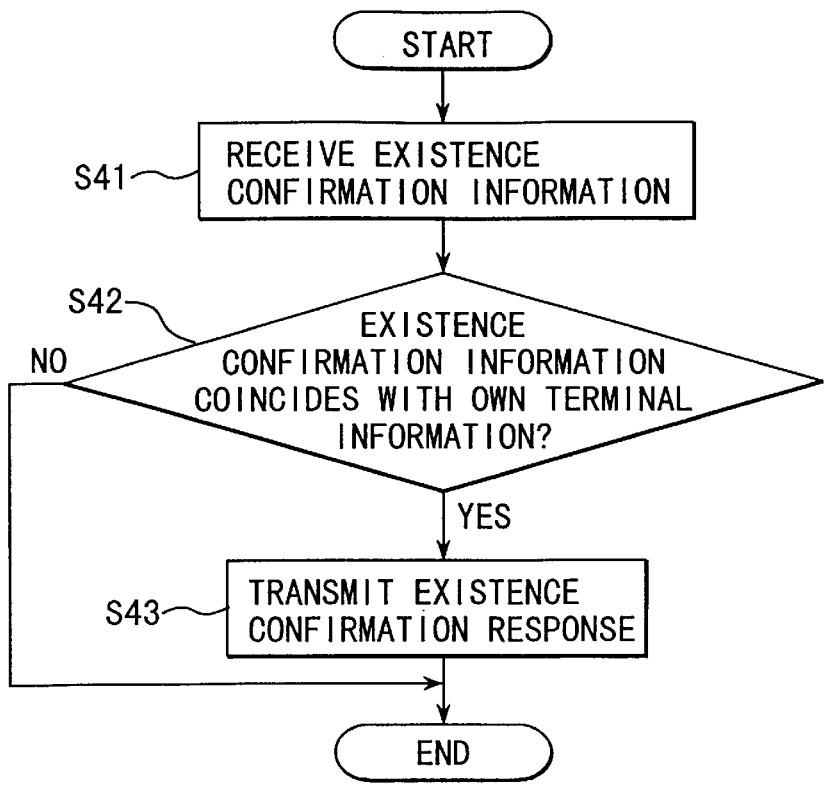
FIG. 30 is a flow chart showing a process according to Embodiment 15 of the present invention to be performed when existence confirmation information is received.
Figure 31:
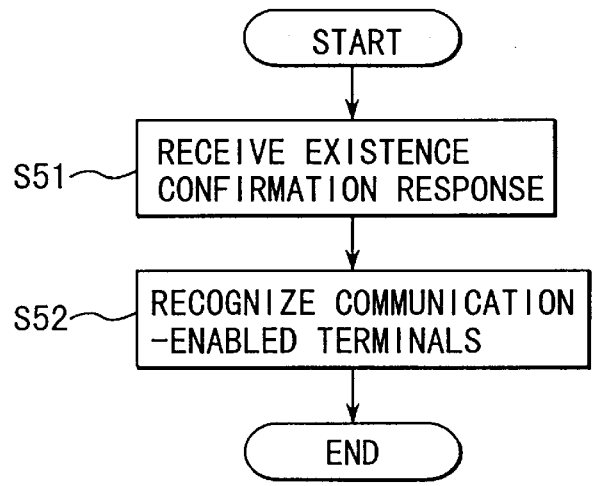
FIG. 31 is a flow chart according to Embodiment 15 of the present invention to be performed when existence confirmation response is received.

A main flow chart of the operation according to Embodiment 15 of the present invention is shown in FIGS. 30 and 31.

FIG. 30 is a flow chart of a process to be performed when existence confirmation information has been received. When existence confirmation information has been received (s41), whether the received existence confirmation information and the own terminal ID information coincide with each other is determined (s42). If the two information items do not coincide with each other, the process is ended. If the two information items coincide with each other, the existence confirmation response is transmitted (s43).

FIG. 31 is a flow chart of a process to be performed when the existence confirmation response has been received. When the existence confirmation response has been received (s51), a determination is performed that communication with the terminal indicated by the existence confirmation information received immediately before can be held and the terminal is registered (s52).

Embodiment 16-1

Figure 32:
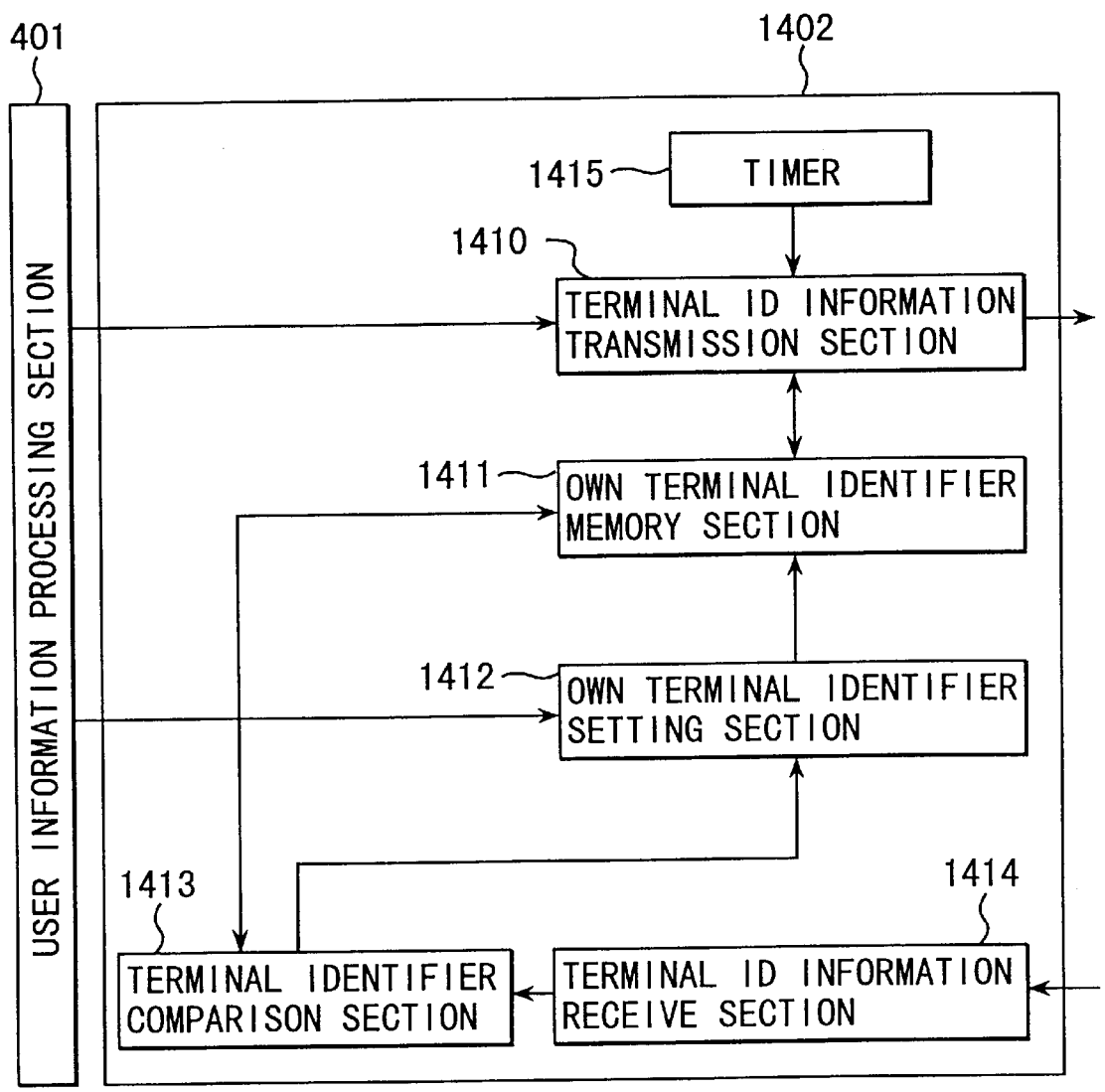
FIG. 32 is a block diagram showing the communication control apparatus according to Embodiment 16-1 of the present invention.

Embodiment 16-1 of the present invention will now be described with reference to the drawings. FIG. 32 is a structural view showing a communication apparatus according to Embodiment 16-1 of the present invention and comprising a user information processing section 1401 for executing a so-called application and a communication control section 1402 for controlling communication.

A terminal ID information transmission section 1410 transmits terminal ID information to satisfy a requirement from the user information processing section 1401 or in accordance with a value set by a timer 1415. The terminal ID information contains terminal identifier for specifying each terminal.

An own terminal identifier memory section 1411 stores own terminal identifier set by an own terminal identifier setting section 1412. The own terminal identifier setting section 1412 satisfies a requirement from the user information processing section 1401 or that from a terminal identifier comparison section 1413 to set an own terminal identifier. The set own terminal identifier and the received terminal identifier are compared with each other. If the two identifiers overlap, the own terminal identifier is again set.

A terminal ID information receive section 1414 receives terminal ID information transmitted from another terminal to transfer it to terminal ID comparison section 1413.

The terminal ID comparison section 1413 fetches the terminal identifier from received terminal ID information to compare it with the terminal identifier of the own terminal memorized in the own terminal identifier memory section 1411. If the two identifiers are the same and the terminal ID comparison section 1413 requires the terminal identifier of the own terminal to be changed, the terminal ID comparison section 1413 requires the own terminal identifier setting section 1412 to set the terminal identifier.

A process to be performed when the two identifiers are the same as a result of the comparison performed by the terminal ID comparison section 1413 will now be described. If the two identifiers are the same, overlap with the terminal identifier of another terminal takes place. Therefore, the terminals having the overlapping terminal identifiers cannot be distinguished from each other. Thus, the terminal, which has detected the overlap of the terminal identifiers, changes the terminal identifier in the own terminal identifier setting section 1412.

As an alternative to this, terminal priority is assigned to each terminal so as to be imparted to terminal ID information and then transmitted. If the priority of the received terminal ID information is high or the same, the own terminal identifier setting section 1412 changes the terminal identifier. If the priority is low, change is not required. Moreover, the terminal ID setting time, for which the terminal identifier has been set, is imparted to the terminal ID information and transmitted. In accordance with the length of the setting time, whether the terminal identifier is changed is determined.

Figure 33:
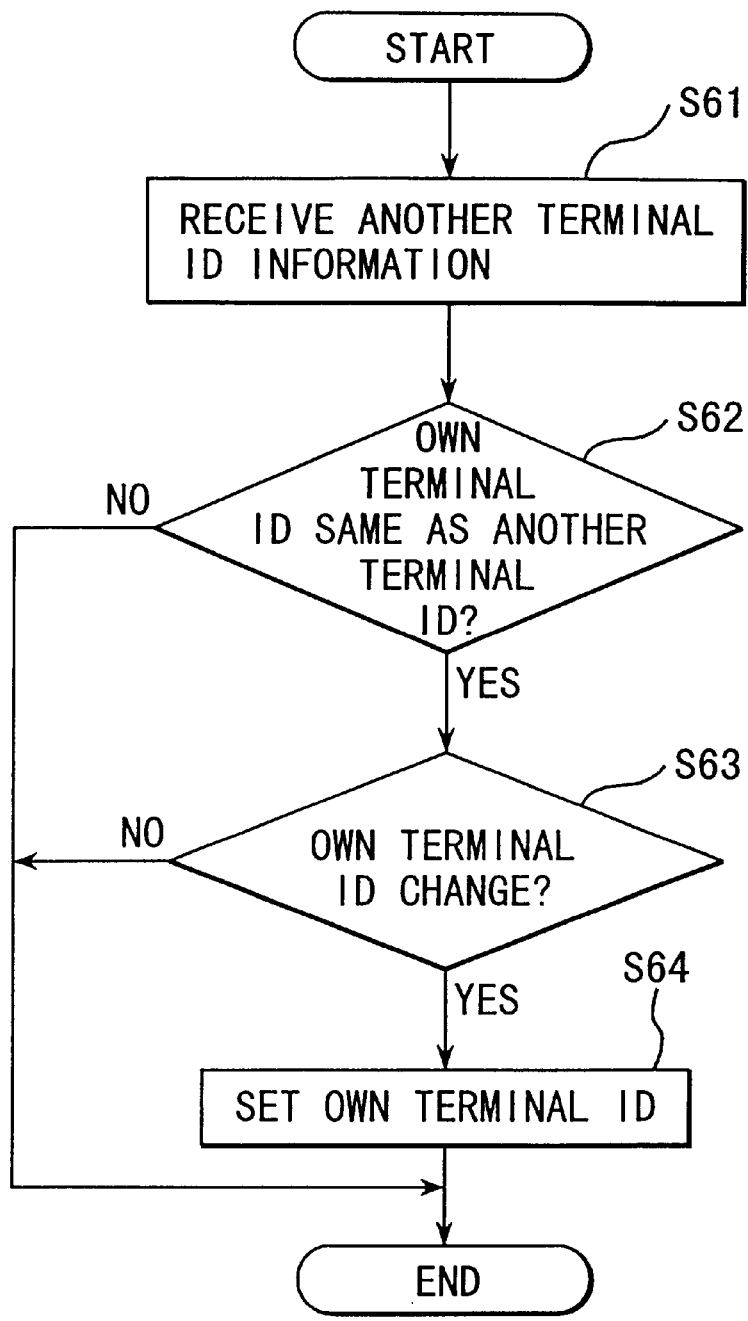
FIG. 33 is a flow chart of a process according to Embodiment 16-1 of the present invention to be performed when another terminal ID information is received.

A process according to Embodiment 16-1 shown in FIG. 32 and to be performed when terminal ID information of another terminal has been received is shown in FIG. 33.

FIG. 33 is a flow chart of the process to be performed when the terminal ID information transmitted from each terminal has been received. When terminal ID information transmitted from another terminal has been received (s61), whether the received terminal ID and the terminal ID of the own terminal coincide with each other is determined (s62). If the two terminal ID items do not coincide with each other, the process is ended. If the two terminal ID coincide with each other, whether terminal ID of the own terminal is changed is determined (s63). If the terminal ID is not changed, the process is ended. If the terminal ID is changed, the terminal ID of the own terminal is again set (s64).

Embodiment 16-2

Figures 34, 35:
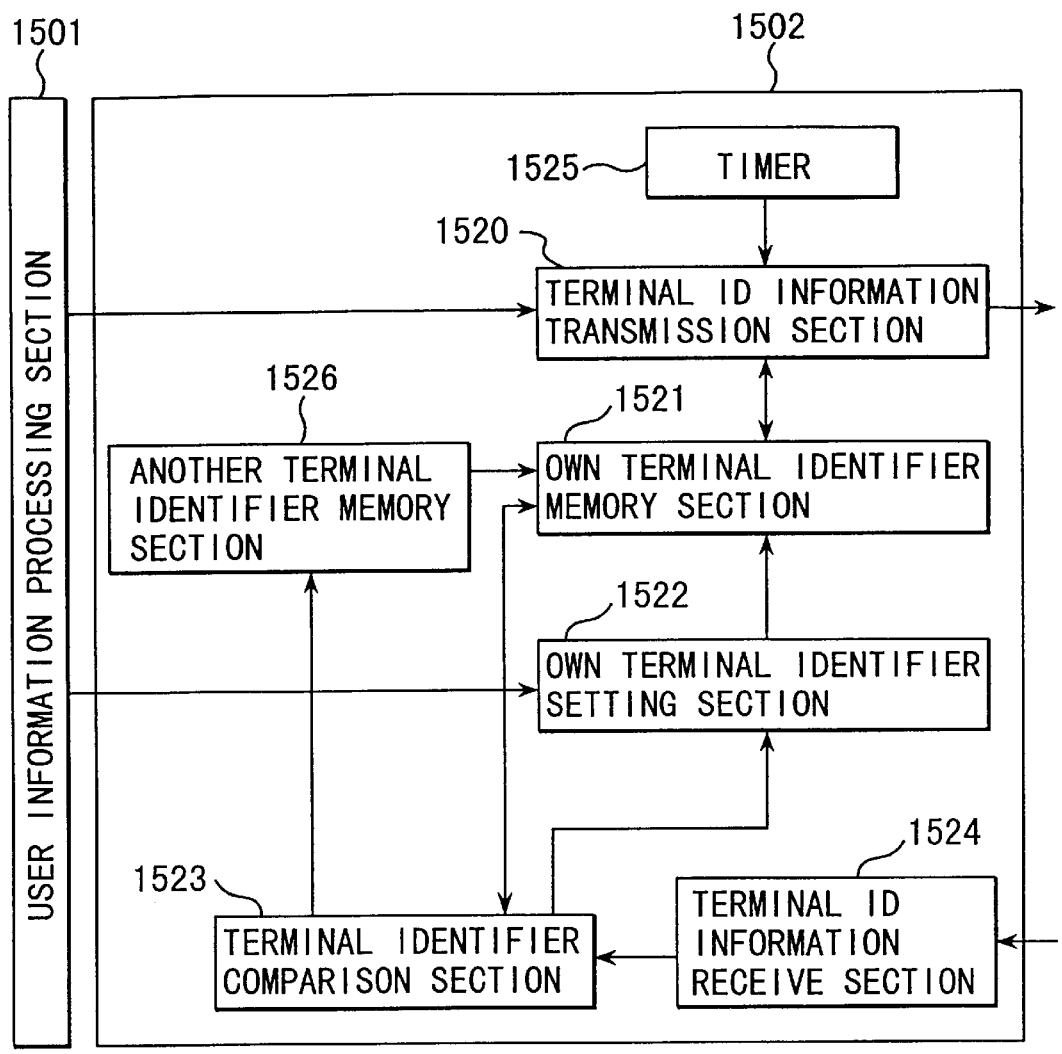
FIG. 34 is a block diagram showing the communication control apparatus according to Embodiment 16-2 of the present invention.
FIG. 35 shows a table memorized in the another terminal ID information memory section according to Embodiment 16-2 of the present invention.

Embodiment 16-2 according to the present invention will now be described. FIG. 34 is a structural view showing a communication apparatus according to Embodiment 16-2 of the present invention and comprising a user information processing section 1501 for executing a so-called application and a communication control section 1502 for controlling communication.

A terminal ID information transmission section 1520 satisfies a requirement from the user information processing section 1501 or in accordance with a value set by a timer 1525 to transmit terminal ID information. The terminal ID information includes a terminal identifier for specifying each terminal and a specific terminal identifier capable of identifying each terminal.

An own terminal identifier memory section 1521 stores the own terminal identifier set by an own terminal identifier setting section 1522. The own terminal identifier setting section 1522 satisfies a requirement from the user information processing section 1501 or that from a terminal identifier comparison section 1523 to set the own terminal identifier. The set own terminal identifier and the received terminal identifier are compared with each other. If two identifiers overlap, the own terminal identifier is again set.

A terminal ID information receive section 1524 receives terminal ID information transmitted from another terminal to transfer it to a terminal identifier comparison section 1523.

The terminal identifier comparison section 1523 fetches the terminal identifier from the received terminal ID information so as to compare it with the memorized terminal identifier of the own terminal. If the two identifiers are the same and the terminal identifier comparison section 1523 requires the terminal identifier of the own terminal, a requirement is made to the own terminal identifier setting section 1522 to set the terminal identifier. If the two identifiers are different, the received terminal identifier and the specific terminal identifier are memorized in an another terminal ID information memory section 1526.

As described above, the terminal receives terminal ID information from each terminal so that a table as shown in FIG. 35 is memorized in the another terminal ID information memory section 1526. Moreover, priority is provided for each terminal and the priority is contained in terminal ID information so as to be transmitted so that a table as shown in FIG. 36 is memorized in the another terminal ID information memory section 1526. As an alternative to this, the time for which the terminal identifier is set is memorized by each terminal and the time is imparted to terminal ID information so as to be transmitted. Thus, a table as shown in FIG. 37 can be memorized in the another terminal ID information memory section 1516.

A process to be performed when the two identifiers are the same as a result of the comparison performed by the terminal identifier comparison section 1523 will now be described.

If the two identifiers are the same, the terminal identifier overlaps the terminal identifier of another terminal. Therefore, the terminals having the overlapping terminal identifier cannot be distinguished from each other. Therefore, the terminal, which has detected the overlapping of the terminal identifier, changes the terminal identifier by the own terminal identifier setting section 1522.

As an alternative to this, priority is assigned to each terminal. If the priority of the received terminal ID information is high or the same, the own terminal identifier setting section 1522 changes the terminal identifier. If the priority is low, the terminal identifier is not changed. As an alternative to this, whether the terminal identifier is changed is determined in accordance with the magnitude of the specific terminal identifier. As an alternative to this, the time for which the terminal identifier has been set is imparted to the terminal ID information and transmitted. In accordance with the length of the setting time, whether the terminal identifier is changed is determined.

In a case where the terminal identifier is needed to be changed because of overlapping, the own terminal identifier setting section 1522 sets a new terminal identifier. At this time, terminal ID information from another terminal is received for a predetermined time and the received terminal identifier is memorized. A terminal identifier, which is not used at present, is detected from the memorized terminal identifier. Then, the own terminal identifier setting section 1522 assigns the terminal identifier, which has not been used, as a new terminal identifier. At this time, transmission of information from the terminal is interrupted until the own terminal identifier setting section 1522 sets the new terminal identifier. Moreover, receipt of information from another terminal may be interrupted.

In a case where the terminal identifier is needed to be changed due to overlapping, an empty terminal identifier may be assigned as a new terminal identifier by using the another terminal ID information memory section 1526.

Embodiment 16-3

A terminal identifier changing process and a method of transmitting user data to be performed and employed when overlapping of terminal identifiers is detected by a procedure similar to that according to Embodiment 16-2 will now be described.

In a case where overlapping of terminal identifiers has been detected, the own terminal identifier setting section 1522 sets a new terminal identifier. At this time, terminal ID information from another terminal is received for a predetermined time. Terminal identifiers received at this time are memorized. A terminal identifier, which is not used at present, is detected from the memorized terminal identifiers. Then, the own terminal identifier setting section 1522 assigns the terminal identifier, which has not been used, as a new terminal identifier.

At this time, transmission of information from the terminal is interrupted until a new terminal identifier is set by the own terminal identifier setting section 1522.

Embodiment 16-4

A terminal identifier changing process and a method of transmitting user data to be performed and employed when overlapping of terminal identifiers is detected by a procedure similar to that according to Embodiment 16-2 will now be described.

In a case where overlapping of terminal identifiers has been detected, the own terminal identifier setting section 1522 sets a new terminal identifier. At this time, terminal ID information from another terminal is received for a predetermined time. Terminal identifiers received at this time are memorized. A terminal identifier, which is not used at present, is detected from the memorized terminal identifiers. Then, the own terminal identifier setting section 1522 assigns the terminal identifier, which has not been used, as a new terminal identifier.

At this time, transmission of information from the terminal and receipt of information from another terminal are interrupted until a new terminal identifier is set by the own terminal identifier setting section 1522.

Embodiment 16-5

Embodiment 16-5 of the present invention will now be described. FIG. 38 is a structural view showing a communication apparatus according to Embodiment 16-5 of the present invention and comprising a user information processing section 1601 for executing a so-called application and a communication control section 1602 for controlling communication.

A terminal ID information transmission section 1610 satisfies a requirement from the user information processing section 1601, that from a terminal ID information comparison section 1613 or in accordance with a value set by a timer 1615 to transmit terminal ID information. The terminal ID information includes a terminal identifier for specifying each terminal and a specific terminal identifier for specifying, by itself, each terminals.

An own terminal identifier memory section 1611 stores the own terminal identifier set by an own terminal identifier setting section 1612. The own terminal identifier setting section 1612 satisfies a requirement from the user information processing section 1601, that from the terminal ID information comparison section 1613 or that from a terminal ID information receive section 1614 to set the own terminal identifier.

In a case where the apparatus according to any one of Embodiment 16-1 to 16-4 is employed, the set own terminal identifier is compared with the received terminal identifier. If the terminal identifiers overlap, the own terminal identifier may be set again.

The terminal ID information receive section 1614 receives a packet transmitted from another terminal and transfers terminal ID information to the terminal ID comparison section 1613 and supplies terminal ID information change requirement to the own terminal identifier setting section 1612.

The terminal ID comparison section 1613 fetches the terminal identifier from the received terminal ID information to compare the same with all of terminal identifiers of other terminals memorized in a another terminal ID information memory section 1616. If the two terminal identifiers are the same and therefore overlapping of the terminal identifiers in which the specific terminal identifier is different is detected, the terminal ID information comparison section 1613 recognizes that the terminal identifier of another terminal must be changed. Then, the terminal ID information comparison section 1613 transmits, to the terminal, a terminal ID information change requirement packet to instruct the terminal to change the terminal identifier or transmits an instruction for broadcasting the terminal information to the terminal ID information transmission section 1610. The received terminal ID information is memorized in the another terminal identifier memory section 1616.

When the terminal ID information receive section 1614 has received the terminal ID information change requirement packet and has determined that the own terminal is the subject terminal, the terminal ID information receive section 1614 supplies the terminal ID information change requirement to the own terminal identifier setting section 1612 so that a process for changing the terminal identifier of the own terminal starts. Since the terminal identifiers overlap in this case, the terminals having the overlapping terminal identifiers cannot be distinguished from each other. Therefore, the own terminal identifier setting sections 1612 of all terminals having the overlapping terminal identifiers simultaneously change the terminal identifiers. The change may be performed similarly to the method according to Embodiment 16-2 by either of the terminals by using the priority, the magnitude of the terminal identifier or the length of the setting time.

If no overlapping takes place after a predetermined time has elapsed from change of the terminal identifier, the identifier is used as the identifier of the own terminal. At this time, a terminal ID information change completion packet is sometimes broadcasted to all terminals.

Figure 39:
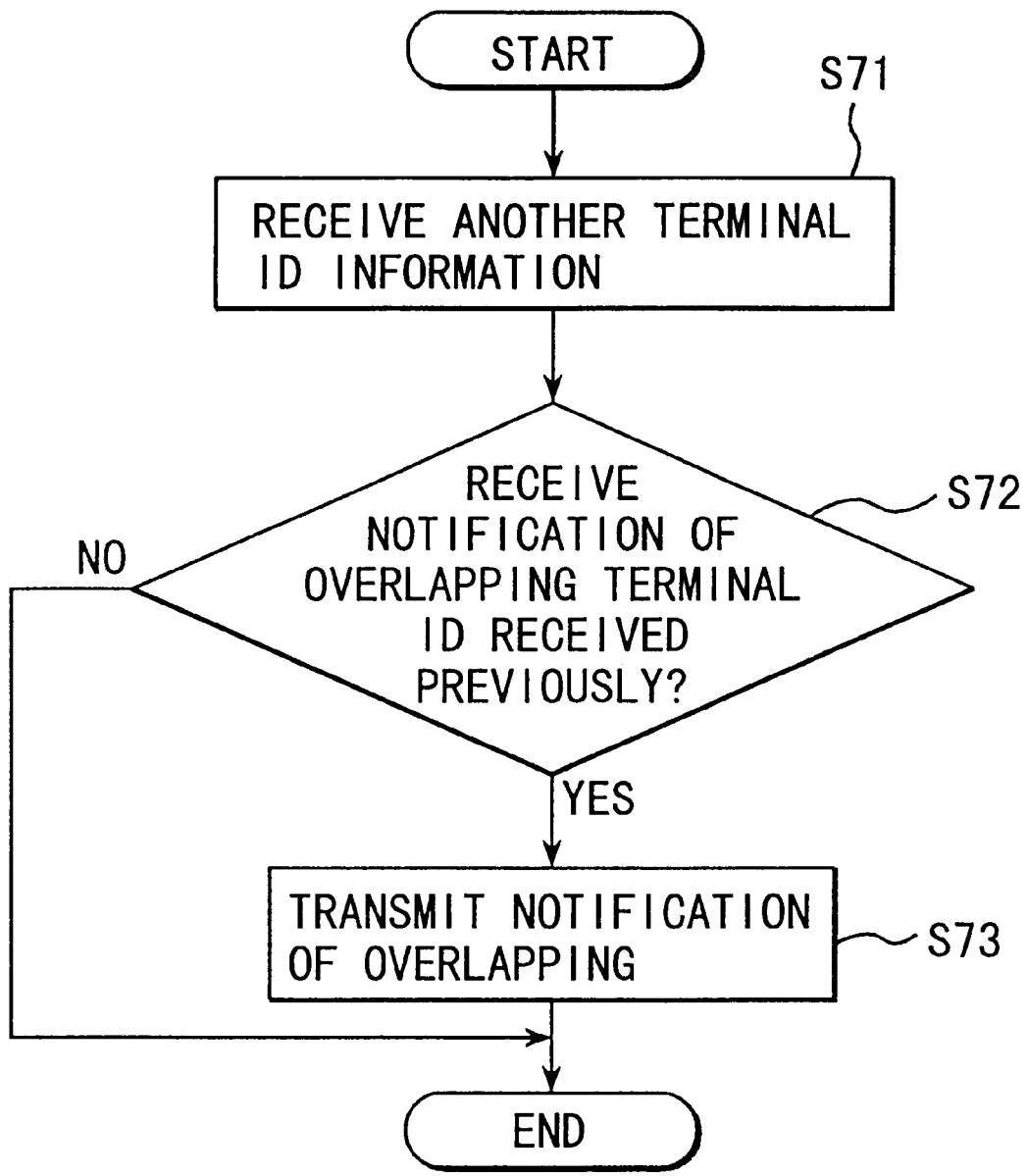
FIG. 39 is a flow chart of a process according to Embodiment 16-5 of the present invention to be performed when another terminal ID information is received.

A process according to Embodiment 16-5 and to be performed when terminal ID information of another terminal has been received is shown in FIG. 39.

FIG. 39 is a flow chart of a process to be performed when terminal ID information transmitted from each terminal has been received. When terminal ID information transmitted from another terminal has been received (s71), whether the received terminal ID information overlaps the terminal ID information received previously is investigated (s72). Whether overlapping takes place is detected by investigating terminals having different specific terminal identifiers and same terminal identifiers. If no overlapping takes place, the process is ended. If overlapping takes place, a notification indicating overlapping is transmitted (s73).

Figure 40:
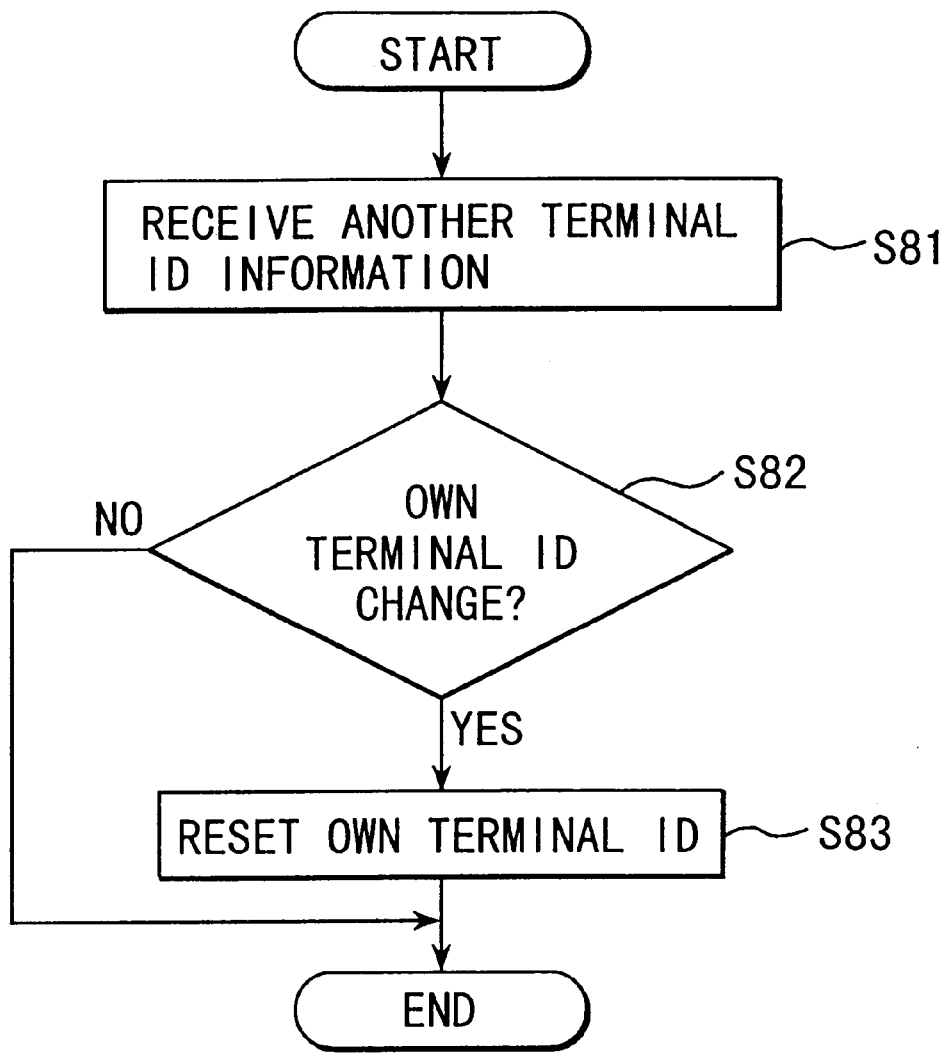
FIG. 40 is a flow chart according to Embodiment 16-5 of the present invention to be performed when overlap notification is received.

FIG. 40 is a flow chart to be performed when the notification indicating overlapping has been received. When the notification indicating overlapping has been received (s81), whether the terminal identifier of the own terminal is changed is determined (s82). If determination is performed that ID information is not changed, the process is ended. If the ID information is changed, the ID information of the own terminal is set again (s83) and the process is ended.

Embodiment 16-6

Figure 41:
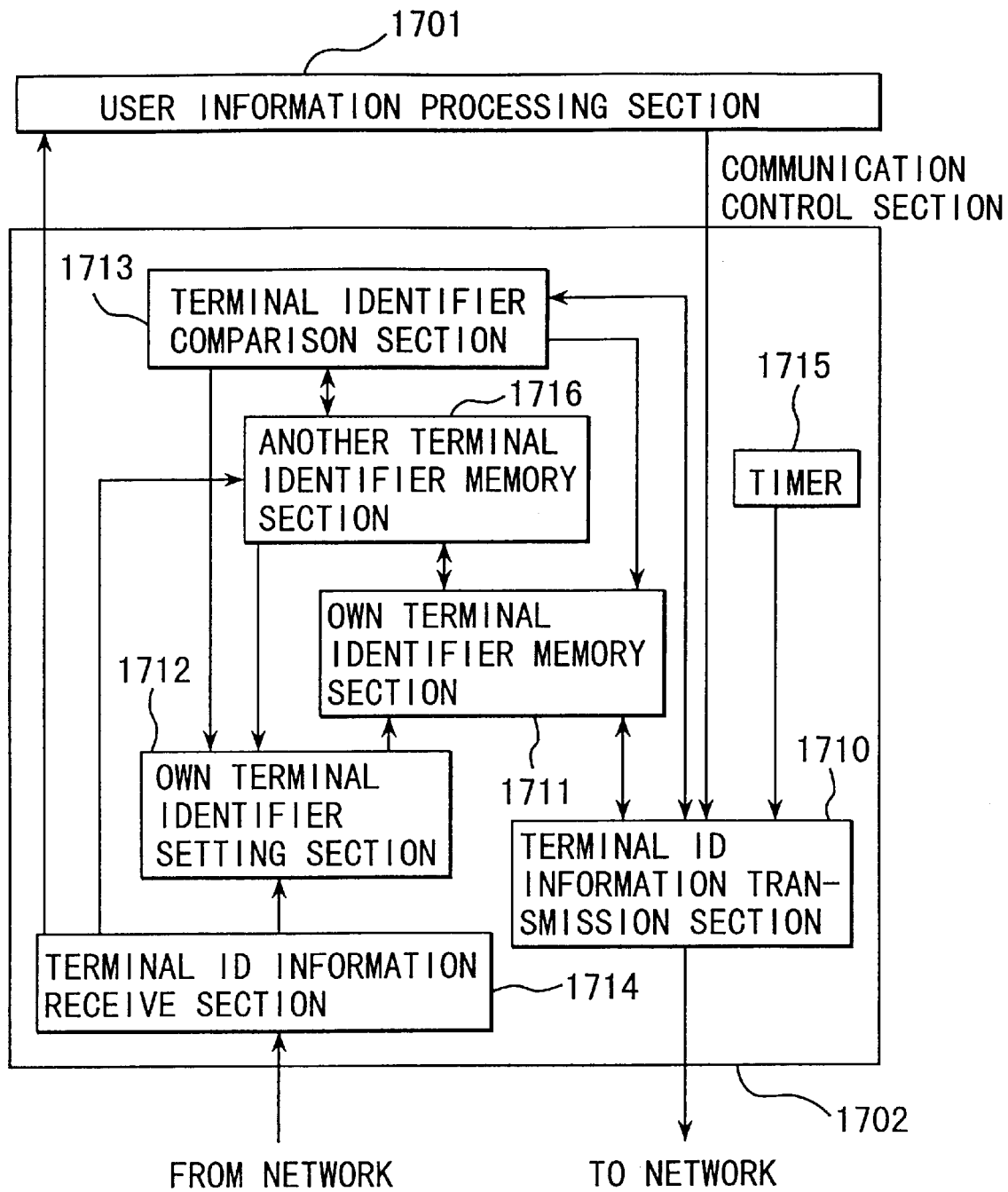
FIG. 41 is a block diagram showing the communication control apparatus according to Embodiment 16-6 of the present invention.

Embodiment 16-6 of the present invention will now be described with reference to the drawings. FIG. 41 is a structural view of a communication apparatus according to Embodiment 16-6 of the present invention and comprising a user information processing section 1701 for executing a so-called application and a communication control section 1702 for controlling communication.

A terminal ID information transmission section 1710 satisfies a requirement from the user information processing section 1701 or that from a terminal identifier comparison section 1713 or in accordance with a value set by a timer 1715 to transmit terminal ID information and user information. The terminal ID information includes a terminal identifier for specifying each terminal and a specific terminal identifier for specifying, by itself, each terminals.

An own terminal identifier memory section 1711 stores the own terminal identifier set by an own terminal identifier setting section 1712. The own terminal identifier setting section 1712 satisfies a requirement from the user information processing section 1701, that from a terminal identifier comparison section 1713 or that from the terminal ID information receive section 1714 to set the own terminal identifier.

In a case where the apparatus according to any one of Embodiments 16-1 to 16-4 is used, the set own terminal identifier is compared with the received terminal identifier. If overlapping takes place, the own terminal identifier may be set again.

A terminal ID information receive section 1714 receives a packet transmitted from another terminal to transfer user information to the user information processing section 1701, transfers terminal ID information to the terminal identifier comparison section 1713 and transfers terminal ID information change requirement to the own terminal identifier setting section 1712. The terminal identifier comparison section 1713 fetches the terminal identifier from the supplied terminal ID information to compare it with all of terminal identifiers of other terminals memorized in an another terminal identifier memory section 1716. If the terminal identifiers are the same and thus overlapping of the terminal identifiers is detected in which the specific terminal identifier is different, the terminal identifier comparison section 1713 recognizes that the terminal identifier of another terminal must be changed. Thus, the terminal identifier comparison section 1713 issues an instruction to the terminal ID information transmission section 1710 in order to broadcast the terminal ID information change requirement packet to instruct the terminal identifier to be changed. The supplied terminal ID information is memorized in the another terminal identifier memory section 1716.

When the terminal ID information receive section 1714 has received the terminal ID information change requirement packet and has determined that the own terminal is the subject terminal, the terminal ID information receive section 1714 issues a terminal ID information change requirement to the own terminal identifier setting section 1712 so that a process of changing the terminal identifier of the own terminal starts. Since the terminal identifiers overlap in this case, the terminals having the overlapping terminal identifiers cannot be distinguished from each other. Therefore, the own terminal identifier setting sections 1712 of all terminals having the overlapping terminal identifiers simultaneously change the terminal identifiers. The change may be performed by either of the terminals by using the priority, the magnitude of the terminal identifier or the length of the setting time, similarly to the method according to Embodiment 16-2.

If no overlapping takes place even after a predetermined time has passed from change of the terminal identifier, the identifier is used as the identifier of the own terminal. At this time, the terminal ID information change completion packet is sometimes broadcasted to all terminals.

When the terminal, which has received the broadcasted terminal ID information change requirement packet, has detected that the terminal identifier of another terminal overlaps in accordance with the terminal information indicated by the packet, the terminal instructs the terminal ID information transmission section 1710 to inhibit transmission of the packet to the subject terminal. Inhibition of transmission of user information and control information may selectively be performed as well as inhibition of the transmission of the packet.

Suspension of the transmission inhibition is informed to the terminal ID information transmission section 1710 when the terminal ID information receive section 1714 has received the terminal ID information change completion packet from the terminal. In a case where the terminal ID information received by the terminal ID information receive section 1714 has been transferred to the terminal identifier comparison section 1713 and then the determination has been made by the terminal that no overlapping takes place because the identifier of the terminal has been changed, suspension of the transmission inhibition may be instructed to the terminal ID information transmission section 1710.

Embodiment 16-7

Figure 42:
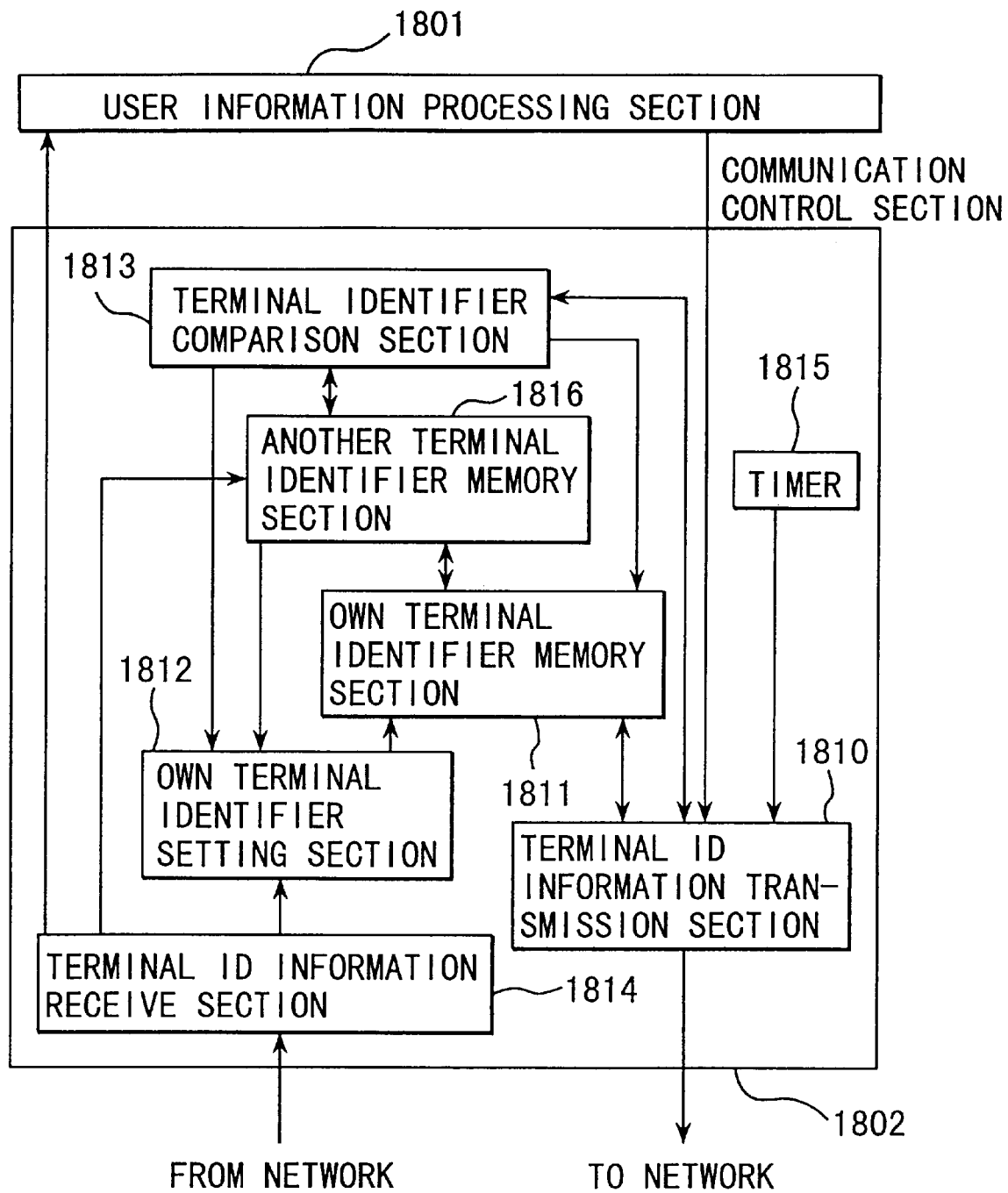
FIG. 42 is a block diagram showing the communication control apparatus according to Embodiment 16-7 of the present invention.

Embodiment 16-7 of the present invention will now be described with reference to the drawings. FIG. 42 is a structural view showing a communication apparatus according to Embodiment 16-7 of the present invention and comprising a user information processing section 1801 for executing a so-called application and a communication control section 1802 for controlling communication.

The structure of the apparatus is similar to that according to Embodiment 16-6.

When the terminal, which has received the broadcasted terminal ID information change requirement packet, has detected that the terminal identifier of another terminal overlaps in accordance with the terminal information indicated by the packet, the terminal instructs a terminal ID information receive section 1814 to inhibit receiving of a packet from the subject terminal. Inhibition of transmission of user information and control information may selectively be performed as well as inhibition of the receipt of the packet.

Suspension of inhibition of the transference is performed such that when terminal ID information change completion packet has been supplied from the subject terminal to the terminal ID information receive section 1814, suspension of inhibition of receipt is performed. In a case where the terminal ID information received by the terminal ID information receive section 1814 has been transferred to the terminal identifier comparison section 1813 and then a determination has been made by the terminal that no overlapping takes place because the identifier of the terminal has been changed, suspension of the receipt inhibition may be performed.

Embodiment 16-8

Figure 43:
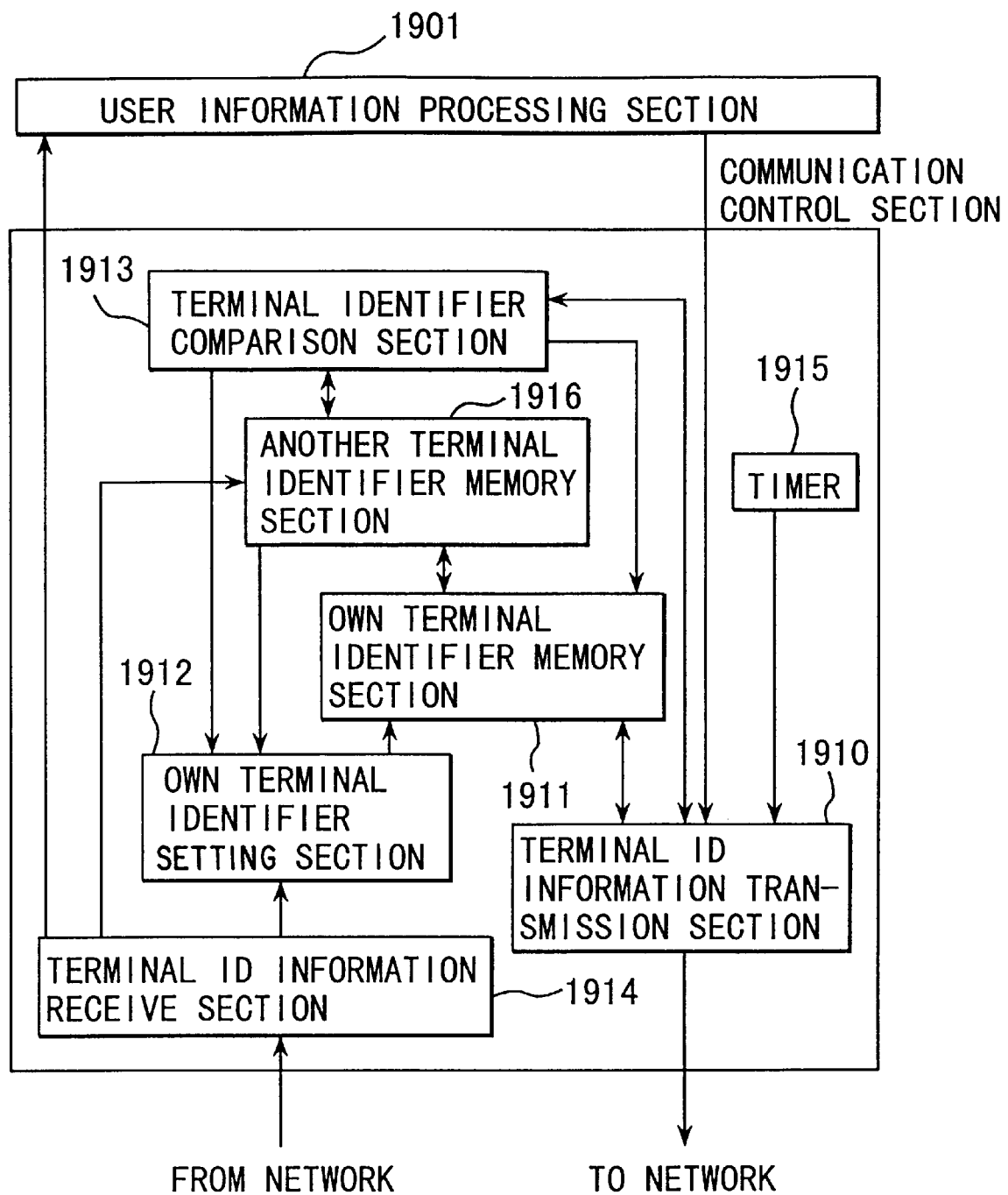
FIG. 43 is a block diagram showing the communication control apparatus according to Embodiment 16-8 of the present invention.

Embodiment 16-8 of the present invention will now be described with reference to the drawing. FIG. 43 is a structural view showing a communication apparatus according to Embodiment 16-8 of the present invention and comprising a user information processing section 1901 for executing a so-called application and a communication control section 1902 for controlling communication.

The structure of the apparatus is similar to that according to Embodiment 16-6.

When a terminal ID information receive section 1914 has received a terminal ID information change requirement packet and has determined that the own terminal is the subject terminal, the terminal ID information receive section 1914 issues a terminal ID information change requirement to an own terminal identifier setting section 1912 so that a process for changing the terminal identifier of the own terminal starts. Since the terminal identifiers overlap in this case and therefore the terminals having the overlapping terminal identifiers cannot be distinguished from each other, the terminal identifiers are simultaneously changed by the own terminal identifier setting section 1912 of all terminals having the overlapping terminal identifiers. The change may be performed by either of the terminal by using the priority, the magnitude of the terminal identifier or the length of the setting time similarly to the method according to Embodiment 16-2. If no overlapping takes place after a predetermined time has elapsed after the change of the terminal identifiers, the identifier is used as the identifier of the own terminal.

The own terminal identifier setting section 1912 receives the terminal ID information change requirement packet. When the own terminal identifier setting section 1912 starts the process of changing the terminal identifier of the own terminal, interruption of transmission of the terminal information is instructed to a terminal ID information transmission section 1910. When a new terminal identifier has been set by the own terminal identifier setting section 1912, restart of transmission of information of the terminal is instructed to the terminal ID information transmission section 1910. When transmission is interrupted, inhibition of transmission of all packets may selectively be performed.

Embodiment 16-9

Figure 44:
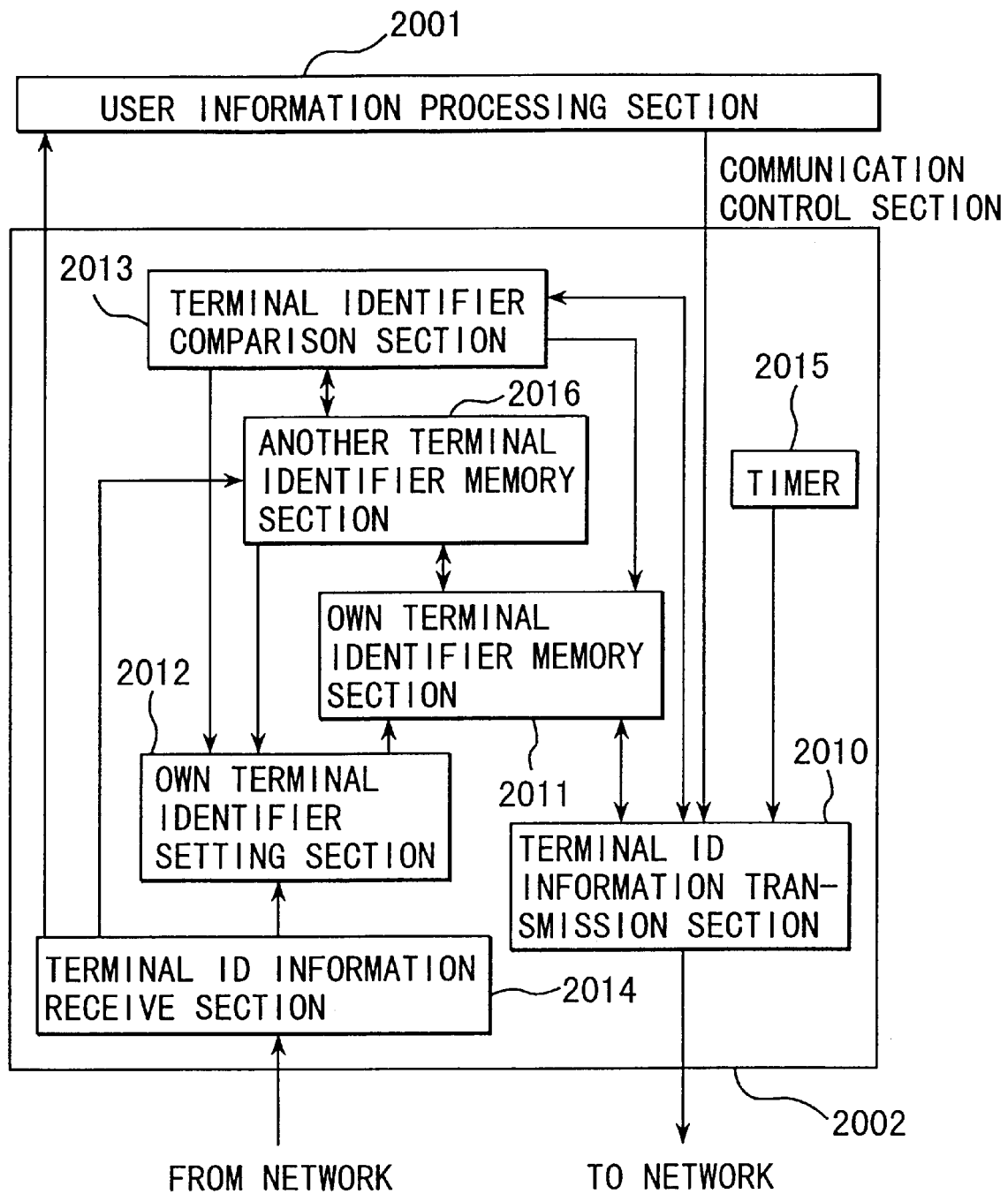
FIG. 44 is a block diagram showing the communication control apparatus according to Embodiment 16-9 of the present invention.

Embodiment 16-9 of the present invention will now be described with reference to a drawing. FIG. 44 is a structural view of a communication apparatus according to Embodiment 16-9 of the present invention and comprising a user information processing section 2001 for executing a so-called application and a communication control section 2002 for controlling communication.

The structure of the apparatus is similar to that according to Embodiment 16-6.

When a terminal ID information receive section 2014 has received a terminal ID information change requirement packet and has determined that the own terminal is the subject terminal, a terminal ID information change requirement is issued to an own terminal identifier setting section 2012 so that a process for changing the terminal identifier of the own terminal starts. Since the terminal identifiers overlap in this case and therefore the terminals having the overlapping terminal identifiers cannot be distinguished from each other, the terminal identifiers are simultaneously changed by the own terminal identifier setting sections 2012 of all terminals having the overlapping terminal identifiers. The change may be performed by either of the terminals by using the priority, the magnitude of the terminal identifier and the length of the setting time similarly to the method according to Embodiment 16-2. If no overlapping takes place after a predetermined time has elapsed from the change of the terminal identifier, the identifier is used as the identifier of the own terminal.

When the own terminal identifier setting section 2012 has received a terminal ID information change requirement packet and starts performing the process of changing the terminal identifier of the own terminal, interruption of receipt of information of the terminal is instructed to a terminal ID information receive section 2014. When the terminal ID information receive section 2014 has received the terminal ID information change requirement packet, interruption of receipt of information of the terminal may be set.

When the own terminal identifier setting section 2022 has set a new terminal identifier, restart of receipt of information of the terminal is instructed to the terminal ID information receive section 2014.

When receipt has been interrupted, inhibition of receipt of user information and control information may selectively be performed as well as inhibition of the receipt of all packets.

Embodiment 16-10

Figure 45:
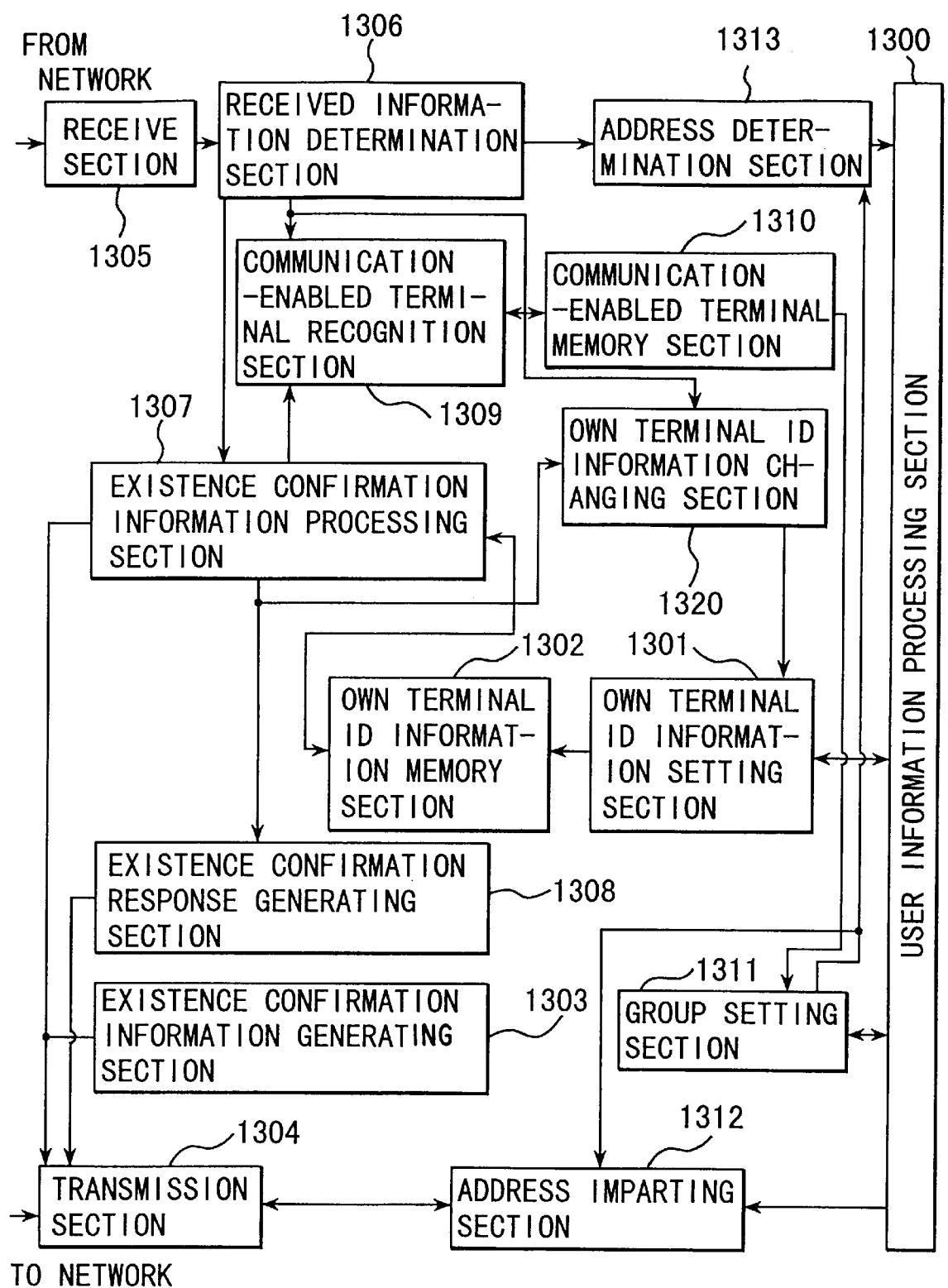
FIG. 45 is a block diagram showing the communication control apparatus according to Embodiment 16-10 of the present invention.

Embodiment 16-10 will now be described with reference to FIG. 45. Since transmission and receipt of existence recognition information and existence confirmation response and corresponding processes are similar to those according to Embodiment 15, they are omitted from description. This embodiment is different from Embodiment 15 in an own terminal ID information changing section 1320 being added. Therefore, a portion relating to the own terminal ID information changing section 1320 will now be described.

The own terminal ID information changing section 1320 is a section for detecting existence of a communication terminal having ID information which is the same as the ID information of the own communication terminal and changing ID information of the own terminal to prevent overlapping of ID information, if necessary. An existence confirmation information processing section 1307 extracts, from supplied existence confirmation information, ID information of the communication terminal, which is the subject of inquiry. Extracted ID information is compared with ID information of the own terminal memorized in an own terminal ID information memory section 1302. If the two ID information items coincide with each other, a determination is performed that the existence of the own terminal has been inquired and this fact is informed to an existence confirmation response generating section 1308 and the own terminal ID information changing section 1320. If coincidence of ID information of the own terminal and ID information extracted by the existence confirmation information processing section 1307 has been informed, the own terminal ID information changing section 1320, for a predetermined time, stores the fact that the notification has been performed. The time in which the notification is memorized may be made to be the same as the time in which a communication-enabled terminal recognition section 1309 stores the ID information notified from the existence confirmation information processing section 1307.

A received information determination section 1306 transfers supplied information to the communication-enabled terminal recognition section 1309 and the own terminal ID information changing section 1320 if the received information is existence confirmation response. The own terminal ID information changing section 1320 is able to detect that another communication terminal having ID information, which is the same as the ID information of the own communication terminal, exists if existence confirmation response is supplied during a period in which the notification of coincidence of the ID information of the own terminal and the ID information extracted by the existence confirmation information processing section 1307 is memorized. In this case, whether ID information of the own terminal is needed to be changed is determined. If a determination is performed that the change is needed, then resetting of the own terminal ID information is instructed to the own terminal ID information setting section 1301.

The determination whether the own terminal ID information is changed may be performed by, for example, a method in which the change is performed without exception if existence of a communication terminal having the same ID information as the ID information of the own communication terminal is detected. As an alternative to this, whether the own terminal ID information is changed may be determined in a probability manner.

When the own terminal ID information setting section 1301 has been instructed from the own terminal ID information changing section 1320 to again set the ID information of the own terminal, it sets new ID information of the own terminal and notifies this to the own terminal ID information memory section 1302.

As a result, even if same ID information item are set between adjacent communication terminals, it can be detected and prevented.

The following method may be employed to efficiently detect and prevent overlapping of ID information items of communication terminals. When the existence confirmation information processing section 1307 has confirmed that the subject of inquiry of confirmation of the existence is ID information of the own terminal, the existence confirmation information processing section 1307 informs this to an existence confirmation response generating section 1308 and the own terminal ID information changing section 1320. The existence confirmation response generating section 1308 does not immediately generate an existence confirmation response and transmit the same to the transmission section immediately after the notification has been supplied from the existence confirmation information processing section 1307. The existence confirmation response generating section 1308 waits for a certain time, and then generates the existence confirmation response. On the other hand, when the own terminal ID information changing section 1320 has been supplied with the notification from the existence confirmation information processing section 1307 and then, within a predetermined time, supplied with the existence confirmation response from the received information determination section 1306, the own terminal ID information changing section 1320 detects existence of a communication terminal having ID information which is the same as ID information of the own terminal. At this time, the own terminal identification information changing section 1320 informs the own terminal identification information setting section 1301 resetting of identification information and informs the existence confirmation response generating section 1308 resetting of identification information of the own terminal. When existence confirmation response generating section 1308 has been supplied with the notification to reset identification information of the own terminal, the existence confirmation response generating section 1308 interrupts generation of the existence confirmation response if the generation of the existence confirmation response is waited for.

In the case where a plurality of adjacent communication terminals have the same identification information items, the foregoing method causes the terminal, which has first generated and transmitted the existence confirmation response, to use the original identification information as it is. As a result, the labor required to again set identification information can be omitted. Since the terminal, which is waiting for generation of the existence confirmation response, interrupts generation, the number of existence confirmation response items to be transmitted to the network can be decreased. Therefore, the traffic of the network can be moderated.

Embodiment 16-11

Figure 46:
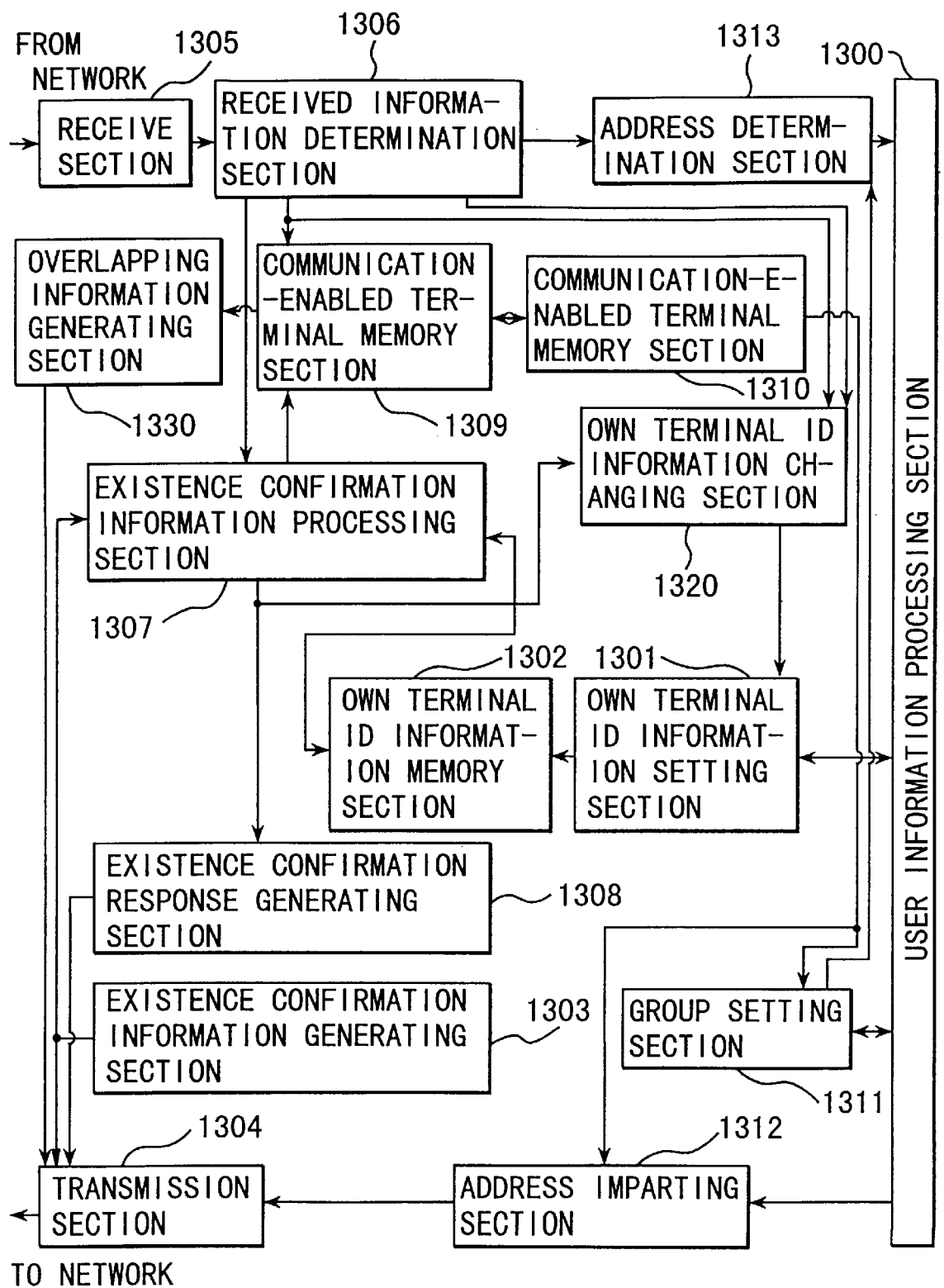
FIG. 46 is a block diagram showing the communication control apparatus according to Embodiment 16-11 of the present invention.

Embodiment 16-11 of the present invention will now be described with reference to FIG. 46.

Since the processes for transmitting and receiving existence confirmation information and existence confirmation response are performed similarly to those according to Embodiment 15, the similar processes are omitted from description. Since a major difference from Embodiment 16-10 is overlapping information generating section 1330 added to the structure, description will now be performed about portions relating to the overlapping information generating section 1330 and portions relating to the process of transmitting and receiving overlap information.

The overlapping information generating section 1330 is a section for generating overlap information for informing existence of a plurality of terminals having the same identification information. Generation of overlap information is performed to follow an instruction from the communication-enabled terminal recognition section 1309. Initially, a process to be performed by the communication-enabled terminal recognition section 1309 to a step of instructing the overlapping information generating section 1330 to generate overlap information will now be described. When the communication-enabled terminal recognition section 1309 has been supplied with identification information, which has been extracted by the existence confirmation information processing section 1307 and existence of which has been inquired, the communication-enabled terminal recognition section 1309 stores it for a predetermined time. In a case where existence confirmation response is supplied from the received information determination section 1306 during memorization of identification information, the communication-enabled terminal recognition section 1309 determines that a communication terminal having the identification information which has been memorized exists and then supplies identification information to the communication-enabled terminal memory section 1310. If identification information is received during memorization of identification information extracted by the existence confirmation information processing section 1307, the number of the existence confirmation response items is not limited to one. If a plurality of existence confirmation response items are supplied, a determination is performed that a plurality of communication terminals having the same identification information exist. Thus, the communication-enabled terminal recognition section 1309 instructs the overlapping information generating section 1330 to generate overlap information.

The overlap information generating section 1330 generates information indicating existence of a plurality of communication terminals having the same ID information to transmit the information to the transmission section 1304 when instructed to generate overlap information from the communication-enabled terminal recognition section 1309.

The received information determination section 1306 transfers supplied overlap information to the own terminal identification information changing section 1320.

The own terminal identification information changing section 1320 is a section for detecting existence of a communication terminal having identification information which is the same as identification information of the own communication terminal and changing identification information of the own terminal to prevent overlap of identification information, if necessary. The existence confirmation information processing section 1307 extracts identification information of the communication terminal, which is the subject, the existence of which is being inquired, identification information being extracted from the supplied existence confirmation information. Extracted identification information is compared with identification information of the own terminal memorized in the own terminal identification information memory section 1302. If the two identification information items coincide with each other, a determination is performed that inquiry of existence of the own terminal is made. Thus, this fact is informed to the existence confirmation response generating section 1308 and to the own terminal identification information changing section 1320. When the own terminal identification information changing section 1320 has been supplied with the notification that the identification information of the own terminal and identification information extracted by the existence confirmation information processing section 1307 coincide with each other, the own terminal identification information changing section 1320, for a predetermined time, stores the fact that the notification has been supplied. If overlap information is supplied from the received information determination section 1306 during the memorization, existence of another terminal having the same identification information as the identification information of the own communication terminal can be detected. In this case, whether identification information of the own terminal must be changed is determined. If the necessity of the change is determined, resetting of the identification information of the own terminal is instructed to the own terminal identification information setting section 1301.

Embodiment 17

Figure 47:
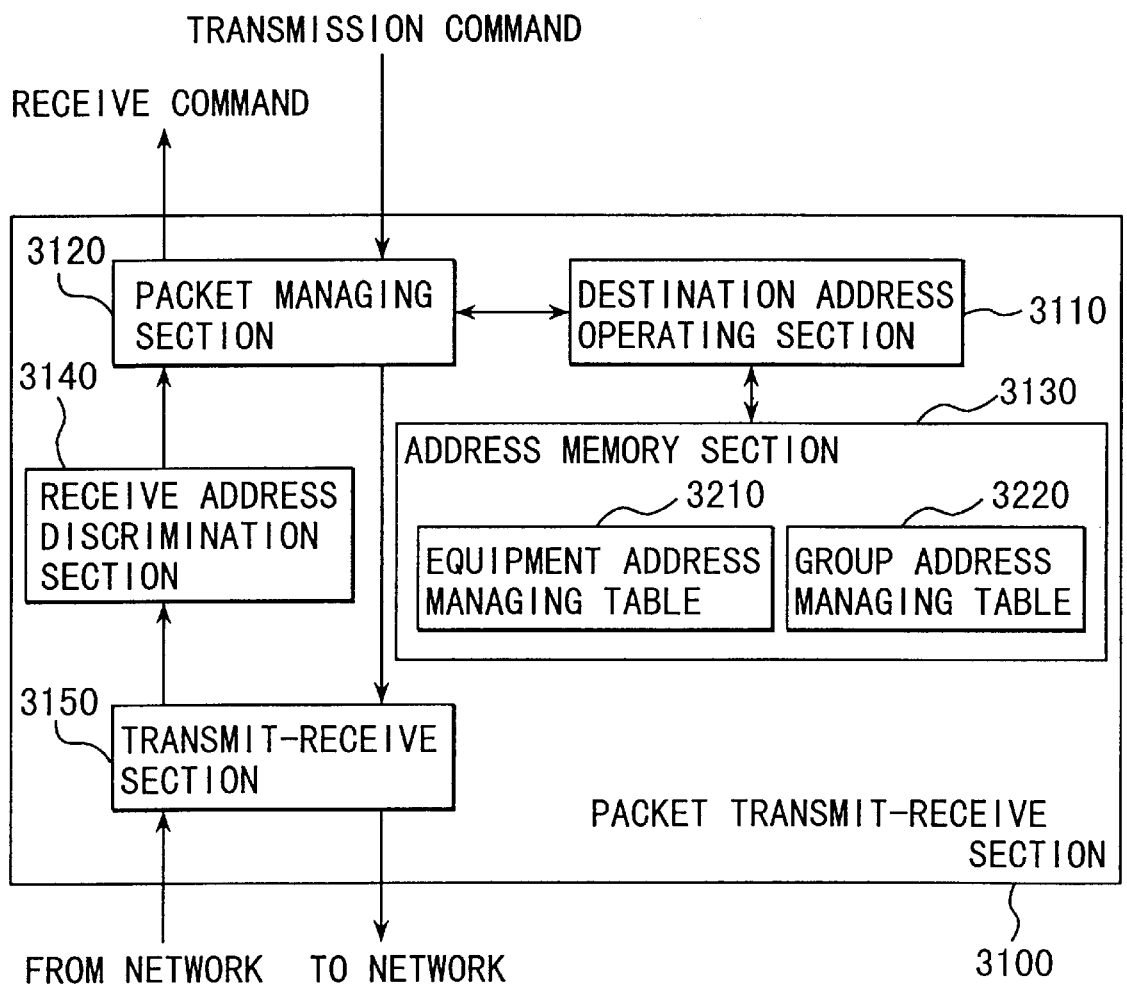
FIG. 47 is a block diagram showing the communication control apparatus according to Embodiment 17 of the present invention.

The operation of an apparatus embodying Embodiment 17 will now be described. FIG. 47 shows the structure of the apparatus.

Figures 48, 49:
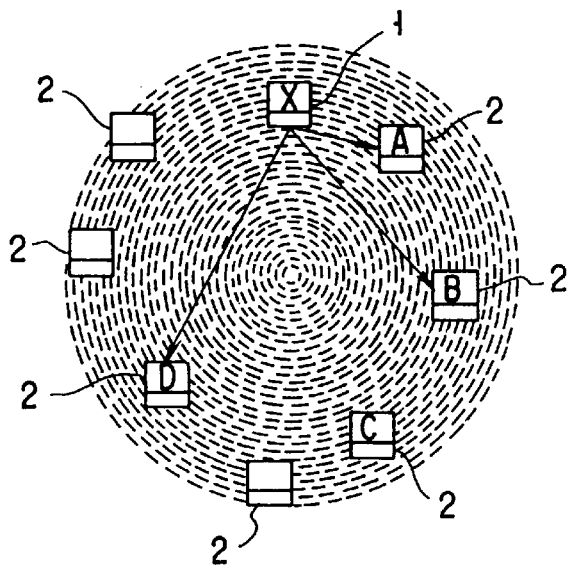
FIG. 48 shows an equipment address managing table according to Embodiment 17 of the present invention.
FIG. 49 is a diagram showing the network according to Embodiment 17 of the present invention.

A packet transmit-receive section 3100 comprises a destination address operating section 3110 for calculating and determining the address of the terminal to which information is transmitted; an address memory section 3130 having an equipment address managing table 3210 for memorizing own logic equipment address and another logic equipment address, as shown in FIG. 48, and a group address managing table 3220 for memorizing names of equipment groups which are sets of equipment with which multicast communication can be held, names of devices forming the groups and, if necessary, group address calculated by the destination address operating section 3110; a packet managing section 3120 supplied with a transmission demand to impart destination address and, if necessary, own equipment address to data as a packet header and arranged to issue a receive command of the packet destined to the own terminal; a receive address discrimination section 3140 for receiving the address of the supplied packet and providing an address filtering mask to determine whether the supplied packet is addressed to the own terminal; and a transmit-receive section 3150 for performing communication with the network.

Plural, that is, n information communication equipment, X1, A, B, C, . . . , (A+B+C+, . . . ,+X=n) 2, of the foregoing type capable of transmitting and receiving information are gathered to form a network as shown in FIG. 49. An assumption is performed that terminals identified by the technique disclosed in Japanese Patent Laid-Open No. 7-336370 and capable of holding communication are arranged such that transmission device is X and terminals, to be information is transmitted, are A, B and D. Note that each device has a unique logical equipment address Madd (N), N=A, B, . . . , X in the network shown in FIG. 48.

Figure 50:
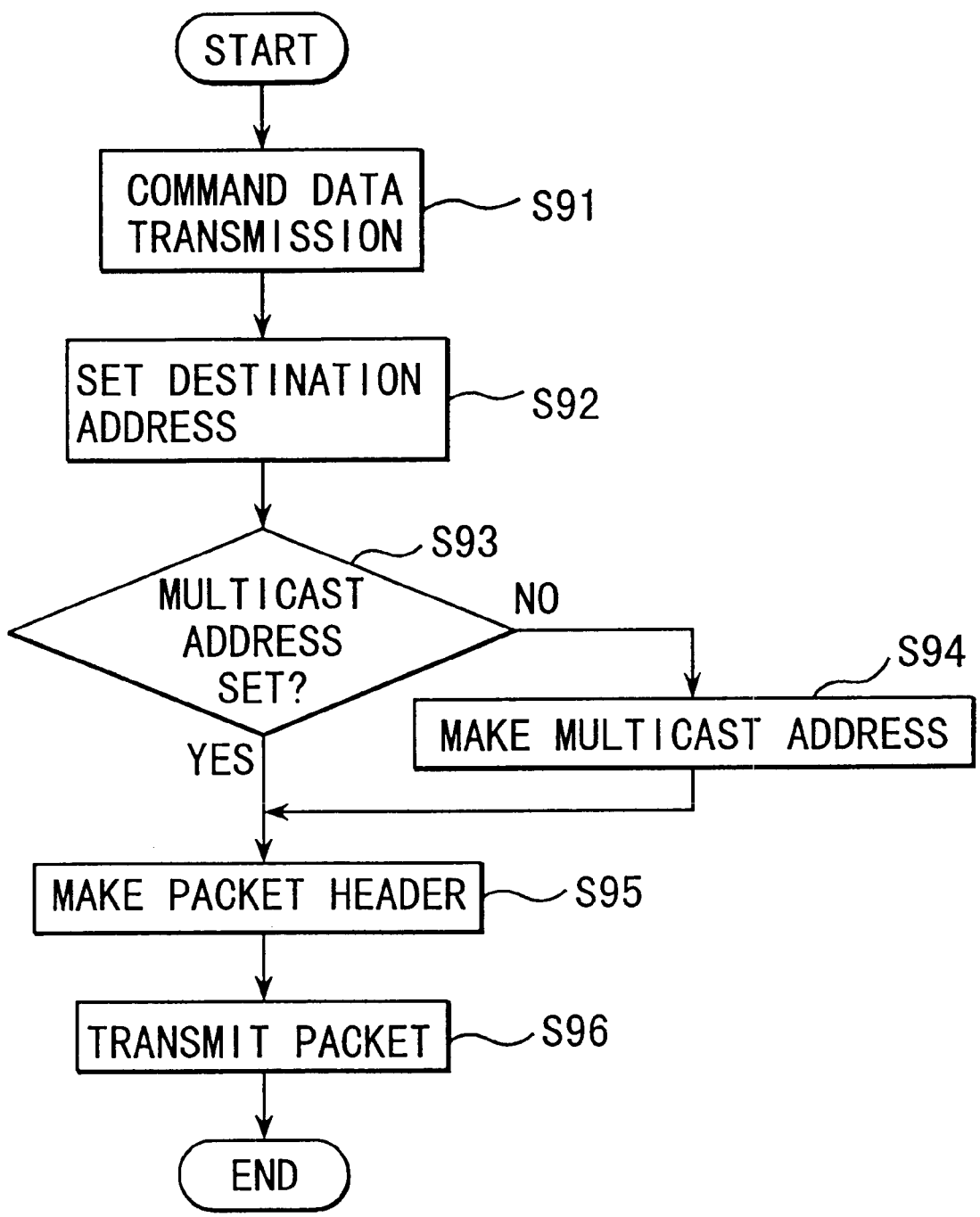
FIG. 50 is a flow chart of a process to be performed by the apparatus according to Embodiment 17 of the present invention when transmission is performed.

Processing steps of the foregoing apparatus will now be described with reference to FIG. 50.

When a transmission demand is issued to the packet managing section 3120 to perform multiple-address communication with A, B and D (s91), the packet managing section 3120 issues a command to the destination address operating section 3110 to set multicast address (s92). The destination address operating section 3110 selects terminals A, B and D, to which information is transmitted, from a group consisting of A, B, . . . , 2 memorized in the equipment address managing table 3210 of the address memory section 3130. Then, the destination address operating section 3110 transmits, to the destination address operating section 3110, destination logical equipment addresses Madd (A), Madd (B) and Madd (D) and, if necessary, own logical equipment address Madd (X).

The destination address operating section 3110 calculates, from Madd (N), multicast address Gadd (X, A, B, D) which satisfies Gadd (X, A, B, D)=f (Madd (X), Madd (A), Madd (B), Madd (D)) to make the obtained Gadd (X, A, B, D) to be destination address (s94). Then, the multicast address Gadd (X, A, B, D) and the own equipment address Madd (X) are, as address header, imparted to data to be transmitted (s95). The generated packet is, from the transmit-receive section 3150, transmitted to the network (s96).

If the set consisting of A, B and D is previously register to the group address managing table 3220 as group G1, the packet managing section 3120 is able to issue transmission command with group name G1. When the packet managing section 3120 has issued a command to the destination address operating section 3110 to set the multicast address with the group name G1, the destination address operating section 3110 searches for G1 from group names G1, . . . , memorized in the group address managing table 3220 of the address memory section 3130 so that members A, B and D of G1 are selected and transmission is enabled by the following method.

When multicast address Gadd (X, A, B, D) is, as the multicast address of the group G1, memorized in the group address managing table 3220 of the address memory section 3130 when the multicast address Gadd (X, A, B, D) is set as shown in FIG. 48, the memorized multiple address multicast address Gadd (X, A, B, D) is supplied from the address memory section 3130 to the packet managing section 3120 when the A, B and D are instructed or the group G1 is instructed so that calculation of the multicast address is omitted (s93).

Figure 51:
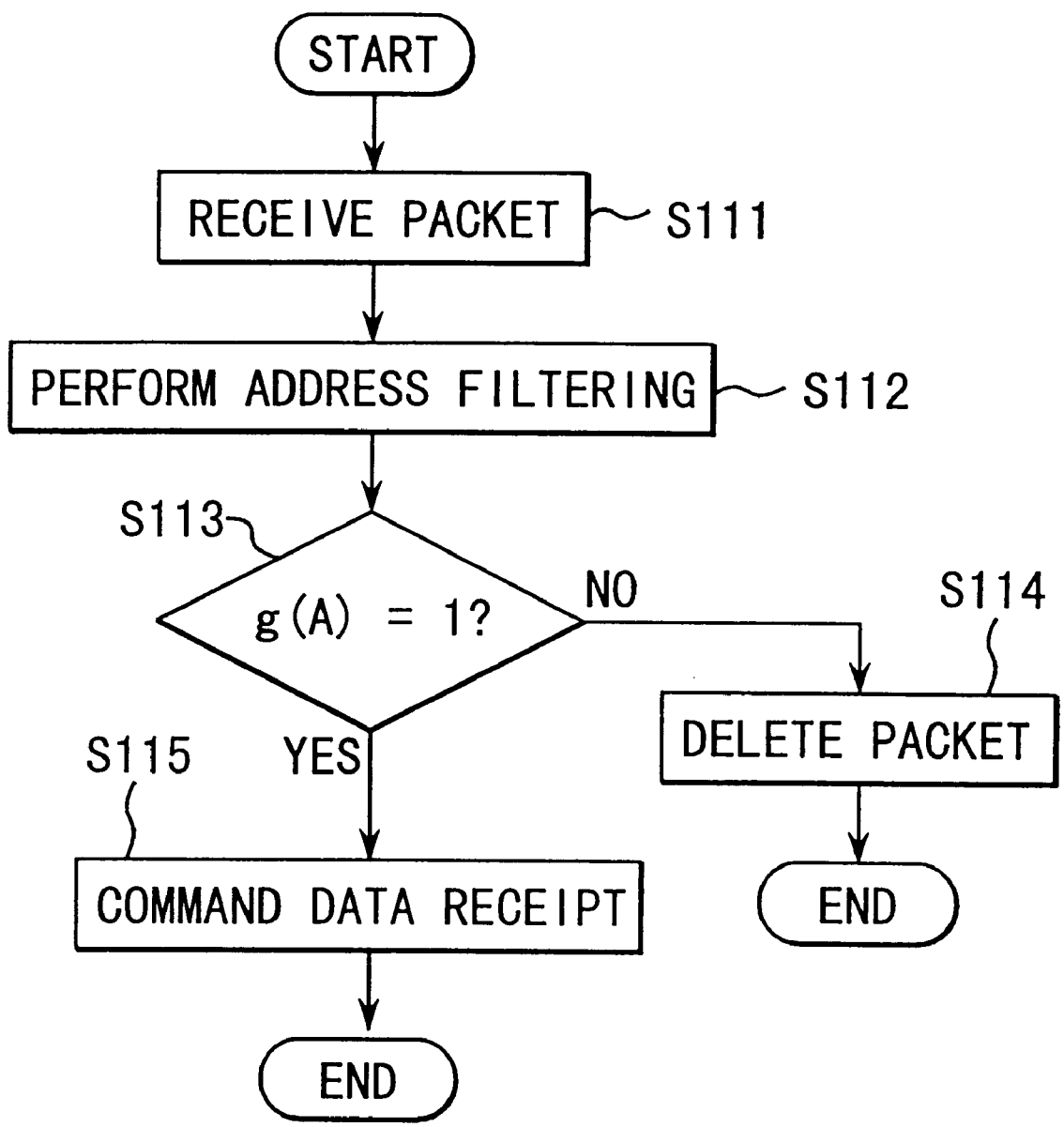
FIG. 51 is a flow chart to be performed by the communication control apparatus according to Embodiment 17 of the present invention when receipt is performed.

Also a flow shown in FIG. 51 is executed. The packet supplied from the network is transmitted to the receive address discrimination section 3140 (s111). Note that the member A is a receiver. The receive address discrimination section 3140 determines, from the supplied multicast address Gadd (X, A, B, D) and the own logical equipment address Madd (A) in the address memory section 3130, whether the supplied packet is addressed to the own device by setting g (A)=h (Gadd (X, A, B, D), Madd (A)) (s112) (s113). If a determination has been performed that the packet is destined to the own device in accordance with g (A), data is transmitted to the packet managing section 3120 (s115). If data is not destined to the own device, data is deleted (s114).

Embodiment 18

A packet transmit-receive method to be performed by the apparatus according to Embodiment 17 will now be described.

Figures 52, 53, 54:
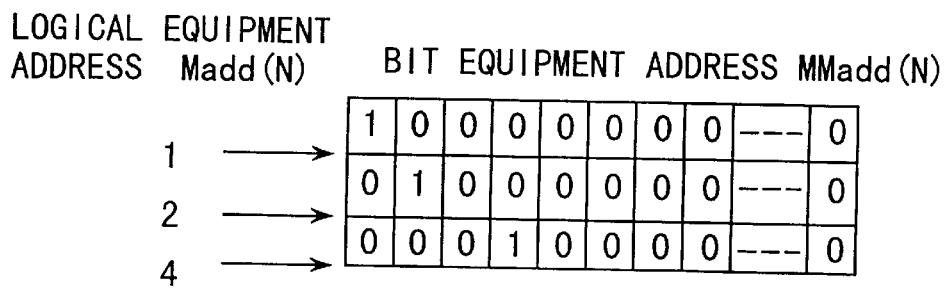
FIG. 52 shows logical equipment address of the communication control apparatus according to Embodiment 18 of the present invention.
FIG. 53 shows conversion of the logical equipment address to bit equipment address according to Embodiment 18 of the present invention.
FIG. 54 shows address filtering calculation according to Embodiment 18 of the present invention.

An assumption is performed that each device has the logical equipment address Madd (N), N=A, B, . . . , X shown in FIG. 52 and Gadd (X, A, B, D)=MMadd (A) ⊕ MMadd (B) ⊕ MMadd (D). Note that ⊕ indicates a logical sum for each bit, and MMadd (N) is formed by providing a bit flag at the number of digits of the numeral counted from the left-hand end of each logical equipment address. FIG. 53 shows an example of conversion from logical equipment address to bit equipment address. Then, the logical sum for each bit is calculated so that Gadd (X, A, B, D) is obtained.

On the other hand, the receiving side calculates function g (A) for address filtering such that g (A)=Gadd (X, A, B, D) ⊗ MMadd (A). Note that ⊗ indicates a bitwise logical product. That is, the logical product of multicast address Gadd (X, A, B, D)=110100, . . . , imparted to the received packet and bit equipment address MMadd (A)=1000, . . . as filtering mask, of A for each bit is calculated. If the packet is destined to the own device, the digit at which the flag of the own equipment address is bit-masked such that g (A)=1. According to this Embodiment, when A has received Gadd (X, A, B, D), g (A)=1 is satisfied so that a fact that the packet has been addressed to the own device is detected (see FIG. 54).

Embodiment 19

Figure 55:
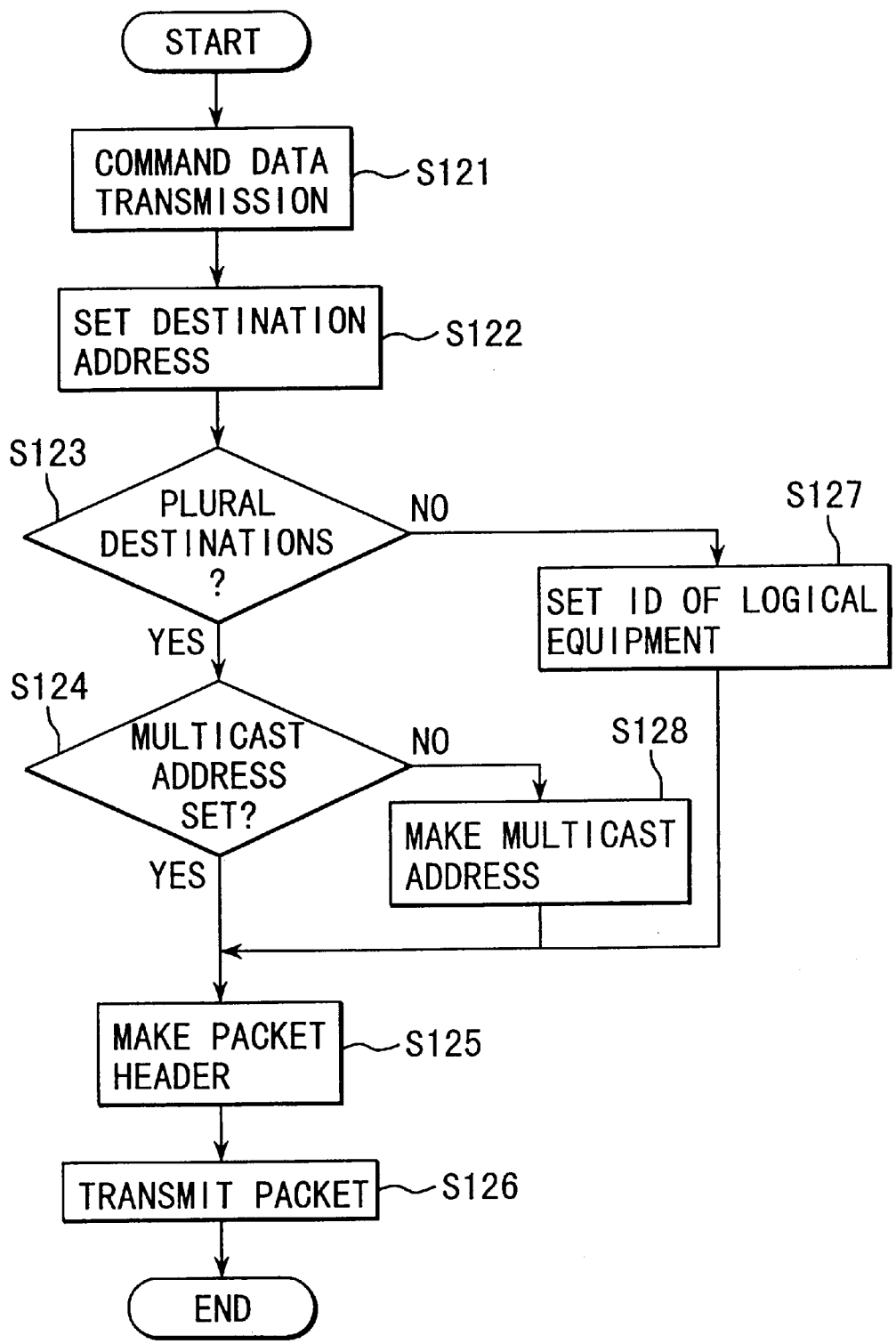
FIG. 55 is a flow chart to be performed by the communication control apparatus according to Embodiment 19 of the present invention when receipt is performed.
Figure 56:
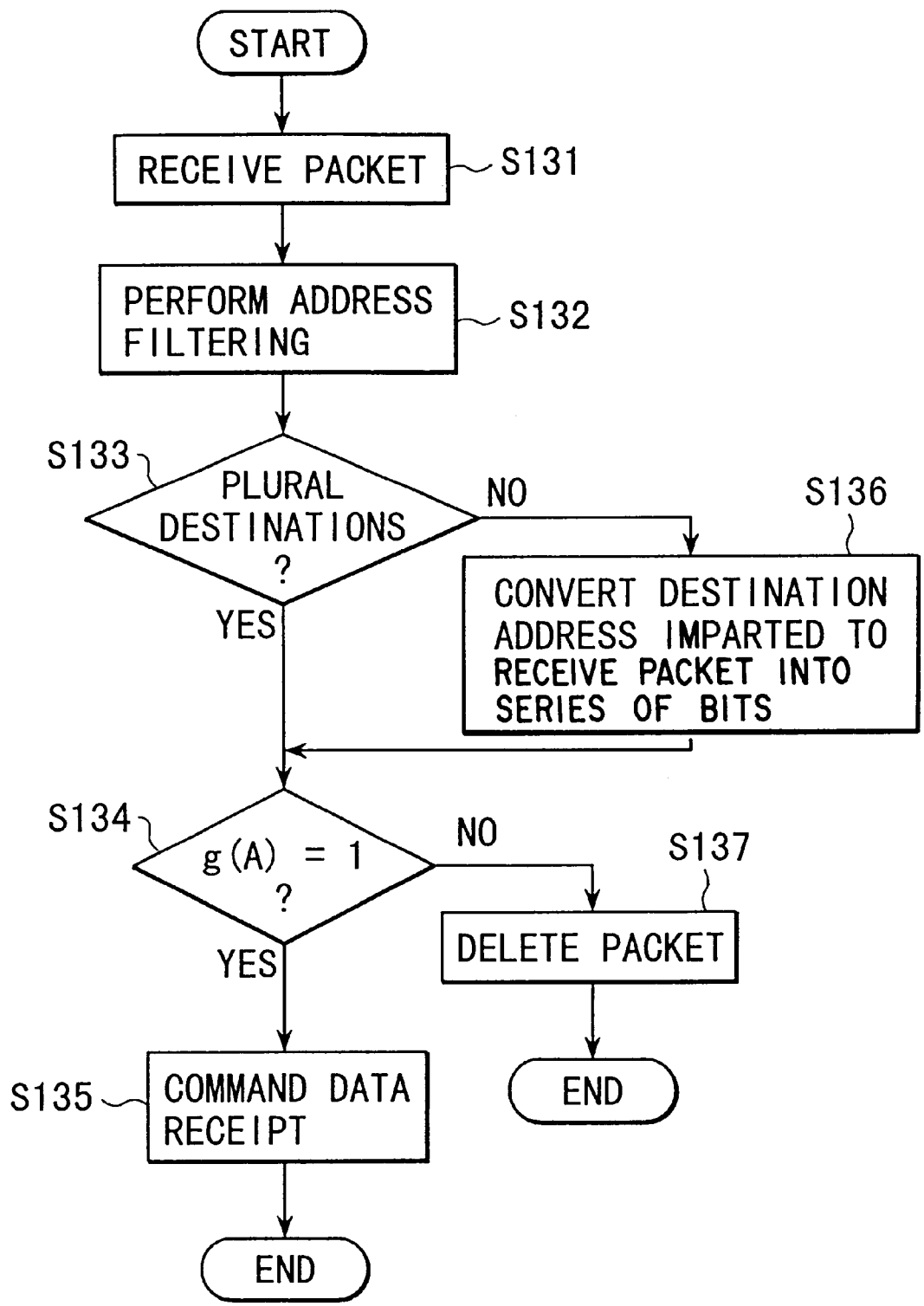
FIG. 56 is a flow chart to be performed by the communication control apparatus according to Embodiment 19 of the present invention when receipt is performed.

An example of a process to be performed when information is transmitted to one device with the packet transmit-receive method by the apparatus according to Embodiment 17 will now be described. FIG. 55 is a flow chart of a process according to Embodiment 19 to be performed when information is transmitted. FIG. 56 is a flow chart of a process to be performed when information is received.

When an instruction to set the destination address has been issued, whether information is transmitted to a plurality of devices is determined (s123). If information is transmitted to a plurality of devices, multicast address Gadd (X, A, B, D) is set by the same method as that according to Embodiment 18. If the information is transmitted to only one device (for example, only A), the logical equipment address Madd (A) of the destination equipment is set as the destination address (s128). Then, a packet header 13 is generated in each packet managing section 3120 (s125). The header format is, as show in FIG. 57, arranged such that a region of an address equipment number discrimination flag 17 indicating whether information is transmitted to plural devices is provided. If information is transmitted to one device, the flag is turned on.

The receiving side device recognizes the address number discrimination flag 17 when it performs address filtering (s133). If information is transmitted to a plurality of devices, a process similar to that according to Embodiment 18 is performed. If information is transmitted to one device, logical equipment address Madd (A)=1, which is the destination address imparted to the received packet, is converted into MMadd (A)=100000, . . . , in which the bit flag is provided at the digit of the numeral counted from the left-hand end of the address (s136) and address filtering similar to Embodiment 18 is performed (s134), or filtering mask is converted from MMadd (A) to logical equipment address Madd (A). Then, whether the destination address and the filtering mask coincide with each other is detected so that also address filtering is performed.

Embodiment 20

Figures 58, 61:
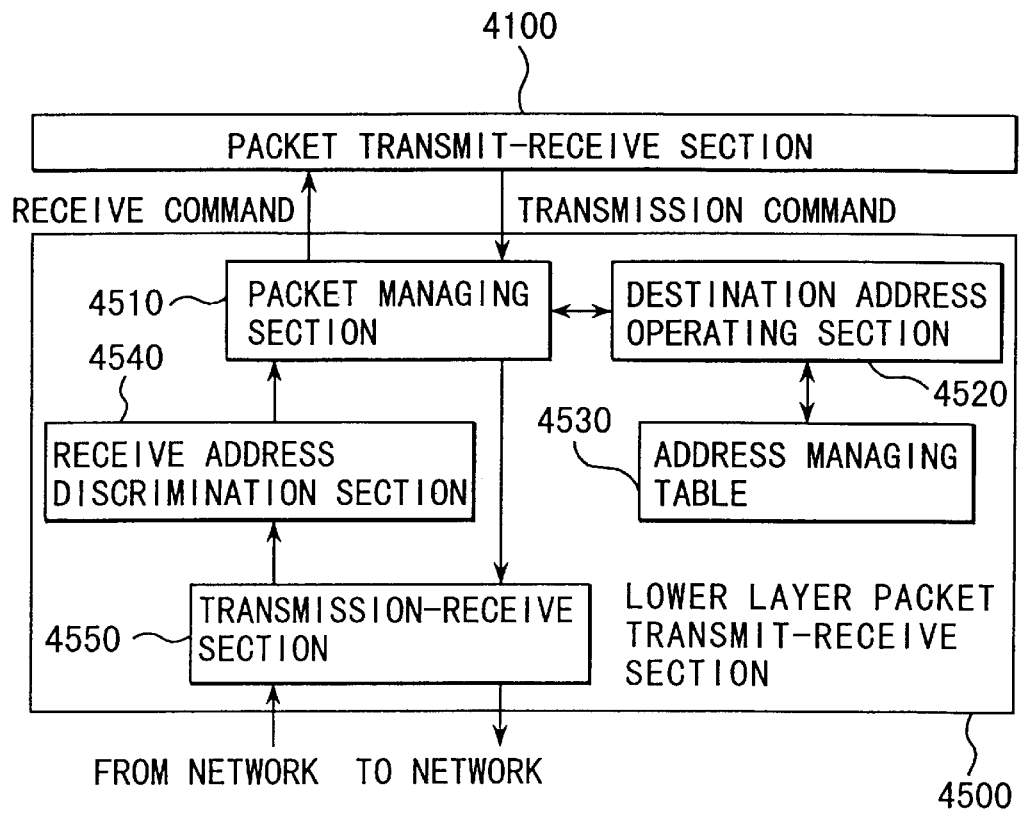
FIG. 58 is a block diagram showing the communication control apparatus according to Embodiment 20 of the present invention.
FIG. 61 shows an address managing table according to Embodiment 20 of the present invention.
Figure 59:
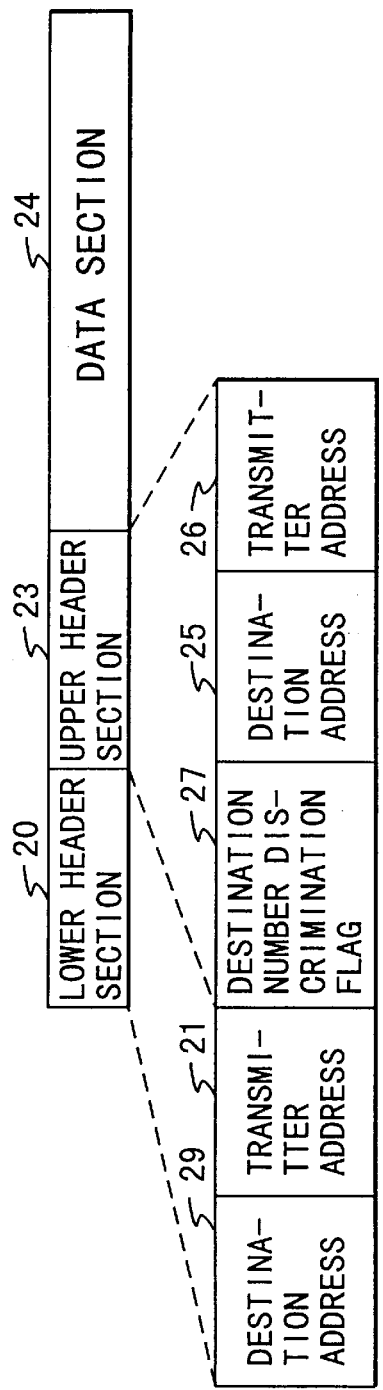
FIG. 59 shows the packet structure according to Embodiment 20 of the present invention.
Figure 60:
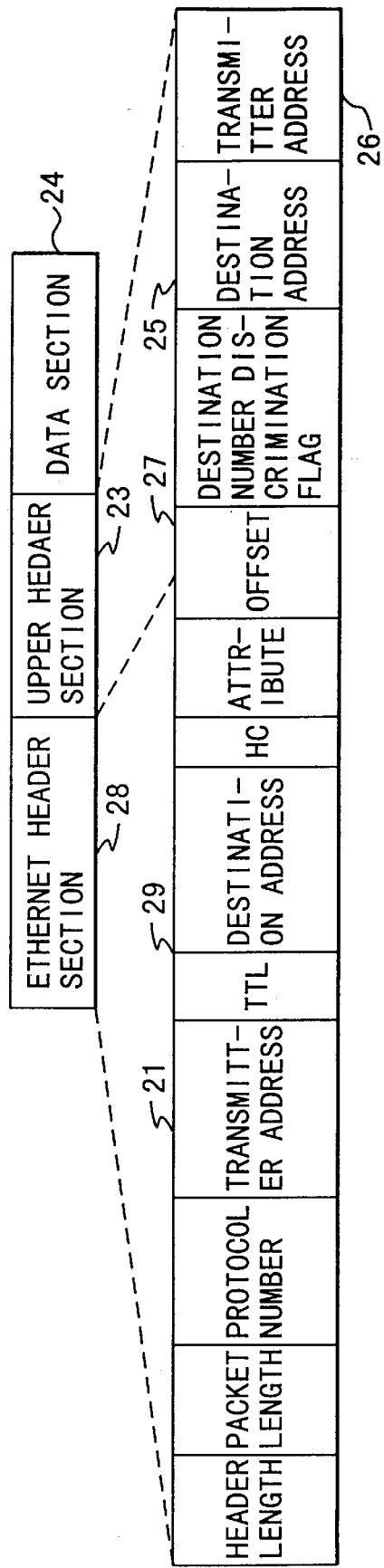
FIG. 60 shows Ethernet frame format according to Embodiment 20 of the present invention.

An example of a process to be performed by a lower device which receives a packet transmitted from the packet transmit-receive apparatus according to Embodiments 17 to 19 and imparts address to be transmitted will now be described. The relationship between the upper device and the lower device is a relationship as is employed between IP (Internet Protocol) and MAC (Media Access Control) driver or that between TCP (Transmission Control Protocol) and IP. FIG. 58 shows the structure of the lower device according to Embodiment 20. FIG. 59 shows the structure of a packet according to Embodiment 20. FIG. 60 shows the structure of a packet for use when the lower device is an Ethernet MAC driver.

A lower packet transmit-receive section 4500 comprises a packet managing section 4510 for inputting/outputting packet to and from a packet transmit-receive section 4100 which is an upper device, a transmission address operating section 4520 for calculating and determining the inquiry, an address managing table 4530 for memorizing the logical equipment address as shown in FIG. 61 and the corresponding lower equipment address, a received address discrimination section 4540 for receiving the address of the supplied packet, providing the address filtering mask and discriminating whether the supplied packet is addressed to the own device, and a transmit-receive section 4550 for transmitting and receiving the packet to and from the network.

When a packet transmission demand is issued from the packet transmit-receive section 4100 to the packet managing section 4510, the packet managing section 4510 checks an address number discrimination flag 27 imparted to the destination head of the upper device to determine whether the packet is transmitted to a plurality of devices so that the packet header 28 in the lower device is imparted from the address managing table 4530. In a case where the packet is transmitted to one device, unicast address of the lower device corresponding to the equipment address is, as the destination address 29, set. In a case where the packet is transmitted to a plurality of devices, broadcast address is set. In a case where the packet managing section 4510 receives address information simultaneously with the packet transmission command, it may determine whether the packet is transmitted to a plurality of devices or one device in accordance with the address information to impart the packet header 28 in the lower device by a procedure similar to that employed above.

The receiving side discriminates in the received address discrimination section 4540 whether information received by the lower packet transmit-receive section 4500 is addressed to the own device. If information is addressed to the own device, the packet header is deleted, the payload portion is transferred to the packet managing section 4510 and the receive command is issued to the packet transmit-receive section 4100. The following procedure is the same as that according to Embodiment 19.

Embodiment 21

Figure 62:
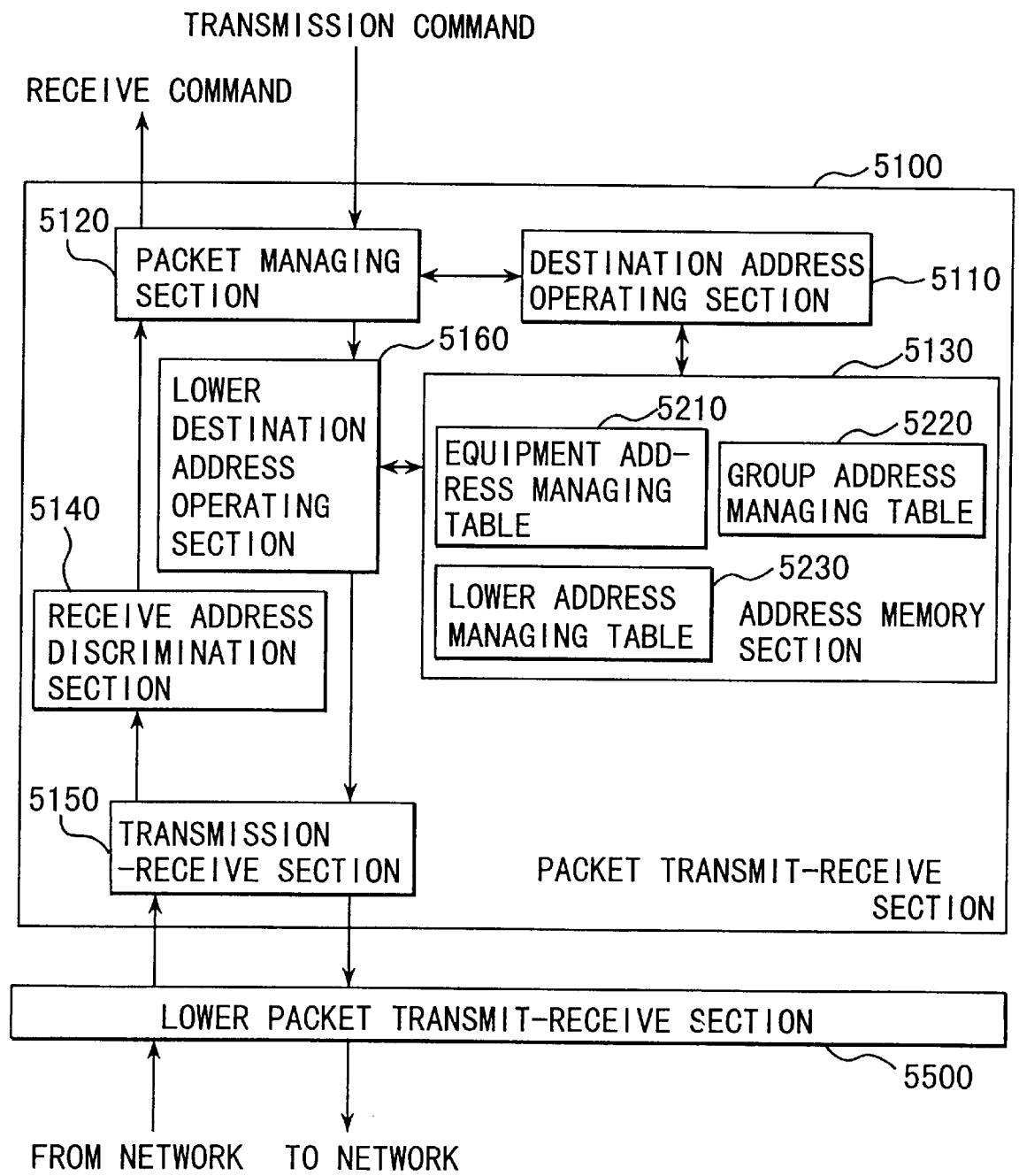
FIG. 62 is a block diagram showing the communication control apparatus according to Embodiment 21 of the present invention.

A case will now be described in which the lower device address is imparted by the upper device. FIG. 62 is a structural view of the apparatus.

When a packet transmission command is supplied together with transmission information from an upper device, a packet managing section 5120 acquires, from a destination address operating section 5110, the address of the own device managed therein in a case where address information is not imparted to the header in the transmitted information and supplied to the device, the address being imparted to the packet header. A lower address operating section 5160 supplied with transmission information from the packet managing section 5120 determines whether information is transmitted to a plurality of devices. If information is transmitted to one device, the unicast address of the lower device corresponding to the equipment address is acquired from an address memory section 5130. If information is transmitted to a plurality of devices, the broadcast address is acquired from the same. The acquired address is imparted to the lower device packet header. As an alternative to this, the acquired address is managed as additional information individually from the packet body. The transmission information and, if necessary, additional information, are transmitted to a lower device packet transmit-receive section 5500 through a transmit-receive section 5150.

The receive side causes a received address discrimination section 5140 to discriminate whether information received by the transmit-receive section 5150 is addressed to the own terminal. If information is addressed to the own device, the packet header is deleted, the payload section is transferred to the packet managing section 5120 and issues a receive command.

Embodiment 22

An example of a process will now be described which is performed in a case where the number of devices capable of mutually transmitting and receiving information is larger than the bit length (n or longer in Embodiment 18) of the address field such that the number is increased from n to n+k (k=1, 2, 3, . . . ).

Figure 63:
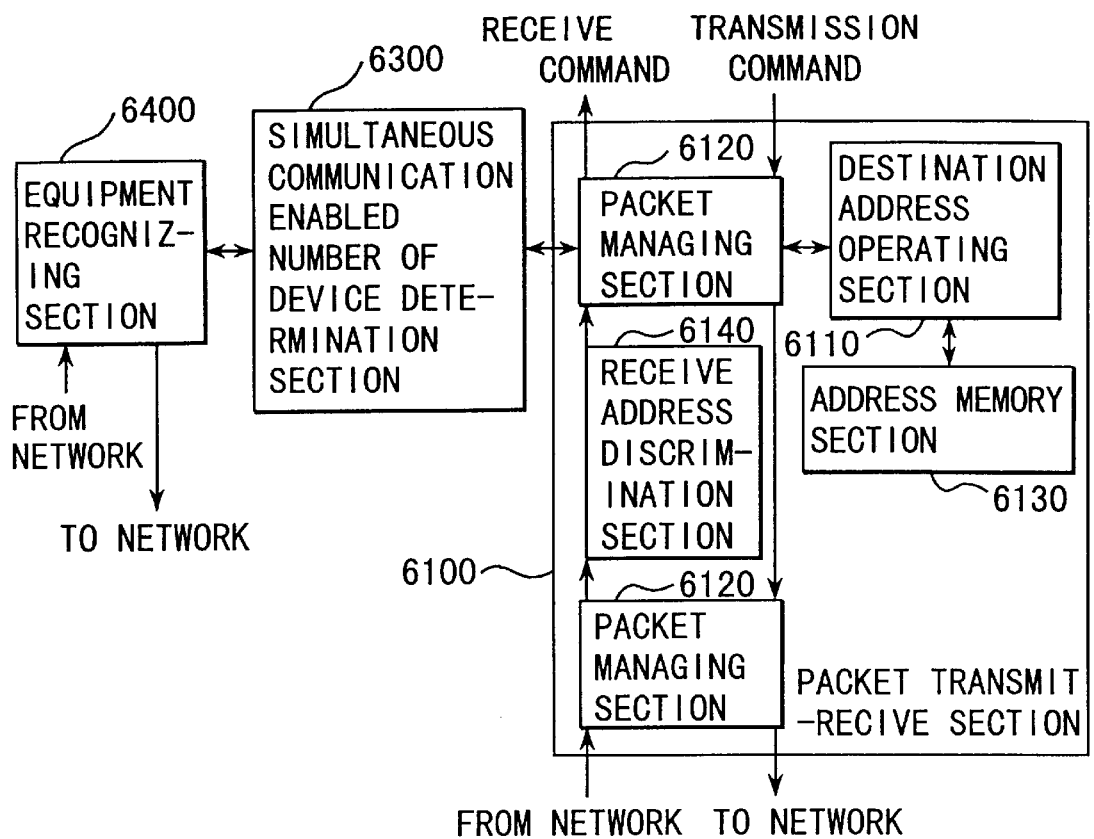
FIG. 63 is a block diagram showing the communication control apparatus according to Embodiments 22 and 23 of the present invention.

FIG. 63 shows the structure of an apparatus according to Embodiment 22. An equipment recognition section 6400 employs a method as disclosed in Japanese Patent Laid-Open No. 7-336370 to mutually recognize equipment. A simultaneous communication-enabled device number determination section 6300 determines the maximum number of the equipment recognized by the equipment recognition section 6400.

Figure 64:
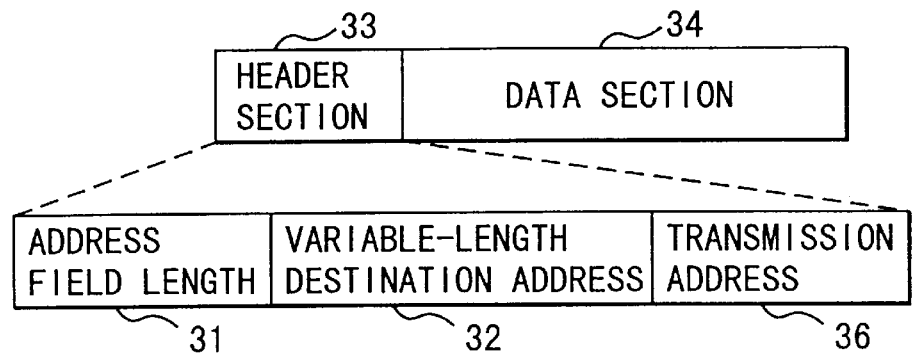
FIG. 64 shows the packet header of the transmission packet according to Embodiments 22 and 23 of the present invention.

When a transmission command is issued to a packet managing section 6120, the packet managing section 6120 checks the simultaneous communication-enabled device number determination section 6300 to detect the number of equipment with which simultaneous communication is held. In this embodiment, the number is n+k. To change the length of the destination address field from n bits to n+k bits, the address field length is written in an address field 31 of a packet header 33 shown in FIG. 64. Moreover, a destination address operating section 6110 and a received address discrimination section 6140 are rewritten to set a multicast address 9 and a filtering mask in the address field having the foregoing length. The following method of determining the destination address and method of receiving the same are similar to those according to Embodiment 18.

Embodiment 23

An example of a process to be performed when the number of devices with which mutual communication can be held is changed from n to n–k (n>k) will now be described.

FIG. 63 shows the structure of an apparatus according to Embodiment 23. A simultaneous communication-enabled device number determination section 6300 determines the smallest number of the devices recognized by an equipment recognition section 6400 and writes the minimum number of the devices on an address field length 31 of a header 33 of the destination packet (refer to FIG. 64).

The other operations are the same as those according to Embodiment 22.

As described above, according to Embodiments 17 to 23, network communication is performed such that the transmission device sets the multicast address calculated from the address of a group of devices with which information can be transmitted to transmit the multicast address. The receiving side device uses a new function set from the transmitted multicast address and the own address so that a packet is selectively received. As a result, information can efficiently be transmitted and received to and from a plurality of unspecific devices which are capable of receiving information.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A terminal which communicates with other terminals, said terminal comprising:
   a communication control apparatus for communicating with said other terminals, said communication control apparatus, including:

receive means for receiving terminal ID information transmitted from another terminal in said other terminals said terminal ID information including information of terminal identifiers of some terminals in said other terminals, said receive means storing said received terminal ID information in a table;

own terminal identifier setting means for setting, as an own terminal identifier of said terminal, one of a plurality of terminal identifier candidates, which are previously set and enabled to be used to perform communication, except the terminal identifiers obtained from said terminal ID information stored in said table.

2. A terminal according to claim 1, wherein said own terminal identifier setting means has a plurality of candidates of terminal identifiers which can be used to hold the communication, said own terminal identifier setting means sets, as an own terminal identifier, one of the plural terminal identifier candidates except the terminal identifiers of other terminals obtained from all of terminal ID information items received from the receive means, and said own terminal identifier setting means increases or decreases a number of the own terminal identifier candidates in accordance with the number of the terminal identifiers which have been received by said receive means and which are being used.

3. A method for enabling communication between a terminal and other terminals, said method comprising the steps of:

receiving, at said terminal, terminal ID information transmitted from another terminal in said other terminals, said terminal ID information including information of terminal identifiers of some terminals in said other terminals;

storing said terminal ID information in a table; and setting, as an own terminal identifier of said terminal, one of a plurality of terminal identifier candidates, which are previously set and enabled to be used to perform communication, except the terminal identifiers obtained from said terminal ID information stored in said table.

4. A recording medium comprising a program for enabling communication between a terminal and other terminals, said program executing the steps of:

receiving, at said terminal, terminal ID information transmitted from another terminal in said other terminals, said terminal ID information including information of terminal identifiers of some terminals in said other terminals;

storing said terminal ID information in a table; and setting, as an own terminal identifier of said terminal, one of a plurality of terminal identifier candidates, which are previously set and enabled to be used to perform communication, except the terminal identifiers obtained from said terminal ID information stored in said table and previously set.

5. A communication terminal which communicates with other communication terminals, said communication terminal comprising:

a communication control apparatus for communicating with said other communication terminals, said communication control apparatus, including:

own terminal ID information setting means for setting own terminal ID information for discriminating said communication terminal from said other communication terminals;

means for storing said own terminal ID information in a table;

means for acquiring said own terminal ID information from said table and for transmitting said own terminal ID information as existence information of said communication terminal;

existence information receive means for receiving existence information from at least one of said other communication terminals, said existence information including existence information of some terminals in said other communication terminals; and own terminal ID information changing means for determining whether or not said own terminal ID information is changed in a case where received existence information includes said own terminal ID information and for changing said own terminal ID information in said table if said own terminal ID information is included in said received existence information, wherein each terminal of said communication terminal and said other communication terminals prevents overlap of terminal ID information in a case where own terminal ID information of a communication terminal and terminal ID information of said some terminals overlap.

6. A recording medium comprising a program for a communication terminal which communicates with other communication terminals, said program executing the steps of:

setting own terminal ID information for discriminating said communication terminal from at least one of said other communication terminals, said existence information including existence information of some terminals in said other communication terminals;

storing said own terminal ID information in a table;

acquiring said own terminal ID information in said table and transmitting said own terminal ID information as existence information of said communication terminal;

receiving existence information from said other communication terminals; and determining whether or not said own terminal ID information is changed in a case where received existence information includes said own terminal ID information and for changing said own terminal ID information if said own terminal ID information is included in said received existence information, wherein each terminal of said communication terminal and said other communication terminals prevents overlap of terminal ID information in a case where own terminal ID information of a communication terminal and terminal ID information of said some terminals overlap.

7. A communication control apparatus comprising:

communication terminal ID information transmission means for transmitting information of an own terminal identifier and information of terminals with which communication can be held with an own terminal identified by the own terminal identifier as communication terminal ID information;

communication terminal ID information receive means for receiving communication terminal ID information from another terminal and for storing said terminal ID information in a table;

bi-direction confirmation means for bi-directionally confirming whether the own terminal identifier is contained in the received communication terminal identifier and recognizing a transmitter of communication terminal ID information and the own terminal to be able to hold bi-directional communication in the case where the own terminal identifier is contained in said table;

memory means for memorizing a state of communication with the transmitter of the communication terminal ID information in said table;

means for comparing the terminal identifier of the transmitter of the communication terminal ID information confirmed to be capable of holding bi-directional communication by said bi-direction confirmation means and the terminal identifier in said table with each other; and registration means for newly registering, to said table, the terminal identifier of the transmitter of communication terminal ID information to be capable of holding bi-directional communication in a case where a result of a comparison performed by said comparison means is such that the terminal identifier of the transmitter of communication terminal ID information and the terminal identifier in said table do not coincide with each other.

8. A communication control method comprising the steps of:

transmitting information of an own terminal identifier and information of terminals with which communication can be held with an own terminal identified by the own terminal identifier as communication terminal ID information;

receiving communication terminal ID information from another terminal;

storing said terminal ID information in a table;

confirming whether the own terminal identifier is contained in the received communication terminal identifier to recognize a transmitter of communication terminal ID information and the own terminal to be able to hold bi-directional communication in the case where the own terminal identifier is contained in said table;

memorizing a state of communication with the transmitter of the communication terminal ID information in said table;

comparing the terminal identifier of the transmitter of the communication terminal ID information confirmed to be capable of holding bi-directional communication by said bi-direction confirmation means and the terminal identifier in said table with each other; and newly registering, to said table, the terminal identifier of the transmitter of communication terminal ID information to be capable of holding bi-directional communication in a case where a result of a comparison performed by said comparison means is such that the terminal identifier of the transmitter of communication terminal ID information and the terminal identifier in said table do not coincide with each other.

9. A communication control apparatus comprising:

transmission means for transmitting from a table information of an own terminal identifier to a first other terminal as terminal ID information;

terminal ID information receive means for receiving terminal ID information of a second other terminal and for storing said terminal ID information in said table;

receipt confirmation information generating means for generating receipt confirmation information such that information of the own terminal identifier is added to terminal ID information received by said terminal ID information receive means and stored in said table;

receipt confirmation information transmission means for transmitting receipt confirmation information generated by said receipt confirmation information generating means to said second other terminal which has transmitted terminal ID information;

receipt confirmation receive means for receiving receipt confirmation information from the first other terminal;

bi-direction confirmation means for confirming whether information of the own terminal identifier is contained in receipt confirmation information received by said receipt confirmation information receive means to recognize that bi-directional communication can be held with the first other terminal, which has transmitted receipt confirmation information, in a case where information of the own terminal identifier is contained;

memory means for memorizing in said table terminal identifiers of terminals with which bi-directional communication can be held;

comparison means for comparing the terminal identifier of the first other terminal contained in receipt confirmation information confirmed by said bi-direction confirmation means to be capable of holding bi-directional communication and the terminal identifier in said table with each other; and registration means for newly registering, to said table, the terminal identifier of the first other terminal to be capable of holding bi-directional communication in a case where a result of a comparison performed by said comparison means is such that the terminal identifier of the first other terminal contained in receipt confirmation information and the terminal identifier in said table do not coincide with each other.

10. A communication control method comprising the steps of:

transmitting from a table information of an own terminal identifier to a first other terminal as terminal ID information;

receiving terminal ID information of a second other terminal;

storing said terminal ID information in said table;

generating receipt confirmation information such that information of the own terminal identifier is added to terminal ID information and stored in said table;

transmitting receipt confirmation information to said second other terminal which has transmitted terminal ID information;

receiving receipt confirmation information from the first other terminal;

confirming whether information of the own terminal identifier is contained in receipt confirmation information to recognize that bi-directional communication can be held with the first other terminal, which has transmitted receipt confirmation information, in a case where information of the own terminal identifier is contained;

memorizing in said table terminal identifiers of terminals with which bi-directional communication can be held;

comparing the terminal identifier of the first other terminal contained in receipt confirmation information confirmed to be capable of holding bi-directional communication and the terminal identifier in said table with each other; and determining the terminal identifier of the first other terminal to be capable of holding bi-directional communication in a case where a result of a comparison is such that the terminal identifier of the first other terminal contained in receipt confirmation information and the terminal identifier in said table do not coincide with each other.

11. A recording medium comprising a program for a terminal which communicates with other terminals, said program executing the steps of:

receiving receipt confirmation information from said other terminals;

storing said receipt confirmation information in a table;

determining from said table whether terminal ID information of said terminal is contained in said received receipt confirmation information;

determining whether or not a terminal of said other terminals, which has transmitted said receipt confirmation information, has not been registered as a bi-directional communication enabled terminal from said table; and registering in said table said terminal which has transmitted said receipt confirmation information as a bi-directional communication enabled terminal ID in a case where said terminal which has transmitted said receipt confirmation information has not been registered.

12. A terminal which communicates with other terminals, said terminal comprising:

a communication control apparatus for communicating with said other terminals, said communication control apparatus, including:

own terminal ID information setting means for setting own terminal ID information for discriminating said terminal from said other terminals;

means for storing said own terminal ID information in a table;

means for acquiring said own terminal ID information from said table and for transmitting said own terminal ID information as existence information of said terminal;

existence information receive means for receiving existence information from at least one terminal of said other terminals, said existence information including existence information of some terminals in said other communication terminals;

means for storing said received existence information in said table;

terminal ID information overlap determination means for determining whether or not said received terminal ID information overlap in accordance with information supplied from said table;

means for transmitting terminal ID information overlap notification in a case where terminal ID information overlap;

overlap information receive means for receiving said terminal ID information overlap notification from at least one terminal of said other terminals; and own terminal ID information changing means for determining whether said own terminal ID information is changed in accordance with said received terminal ID information overlap notification to change said own terminal ID information in said table if an overlap exists, wherein overlap of terminal ID information detected by said terminal is notified to said other terminals, and each terminal supplied with said overlap notification prevents overlap of terminal ID information.

13. A recording medium comprising a program for executing the steps of:

receiving terminal ID information transmitted from at least one terminal in other terminals, said terminal ID information including information of terminal identifiers of some terminals in said other terminals;

storing said terminal ID information in a table;

investigating whether said terminal identifiers of received terminal ID information and terminal identifiers of terminal ID information received previously overlap from said table; and transmitting an overlap notification in a case where said terminal identifiers of the received terminal ID information and said terminal identifiers of the terminal ID information received previously overlap.

14. A recording medium comprising a program for a terminal which communicates with other terminals, said program executing the steps of:

receiving an overlap notification from said other terminals, said other terminals having investigated whether terminal identifiers of received terminal ID information and terminal identifiers of terminal ID information received previously overlap and transmitting the overlap notification in a case where said terminal identifiers of the received terminal ID information and said terminal identifiers of the terminal ID information received previously overlap, said terminal ID information including information of terminal identifiers of some terminals in said other terminals;

determining whether an own terminal identifier of said terminal stored in a table is changed to an unused terminal identifier; and resetting said own terminal identifier in said table to the unused terminal identifier.

15. A packet transmit-receive apparatus comprising:

an address memory section for memorizing in a table at least information of an own terminal having an address field having a fixed length and logical equipment address of a destination equipment;

a destination address operating section for determining from said table destination address having a fixed-length address field for a transmission packet by using logical address information in said table;

a packet generating section for generating a packet in which the destination address generated by said destination address operating section is added to a header of the packet; and a received address discrimination section for discriminating whether the supplied packet is addressed to the own terminal, wherein the destination address is set in the header of the packet as a multicast address calculated from equipment addresses of all or a portion of all equipment groups and own equipment address of the own terminal, said multicast address being different from a multicast address obtained by communication with the other terminals, and receiving side uses all or a portion of the multicast address imparted to the received packet, address of a transmitter and the own equipment address of the own terminal to determine whether information is addressed to the own terminal so as to acquire only information addressed to the own terminal.

16. A packet transmit-receive apparatus according to claim 15, wherein a destination equipment number discrimination flag is provided for the header of a destination packet, the flag is set to indicate one address in a case where the packet is transmitted to one equipment, and the destination address is transmitted as logical equipment address, and the receive side determines whether information is addressed to the own equipment in accordance with at least a portion of the logical address, the own equipment logical address and the transmitter address when a determination has been made from the address equipment number discrimination ID flag that the destination address is the logical equipment address so as to acquire only information addressed to the own equipment.

17. A packet transmit-receive apparatus according to claim 15 or 16, wherein a lower apparatus for receiving a packet transmitted from the packet transmit-receive apparatus according to claim 15 or 16 to impart address managed therein so as to again transmit the packet is arranged such that broadcast address is set in a case where the packet received from the apparatus according to claim 15 or 16 is addressed to a plurality of apparatuses and unicast address is set in a case where the packet is addressed to one apparatus.

18. A packet transmit-receive apparatus according to claim 15 or 16 and having another equipment address detection section for discriminating another equipment with which wireless communication can be held and detecting the number of the another equipment;

simultaneous communication enabled equipment number determination section for discriminating the number of equipment with which simultaneous communication with the detected equipment can be held to determine a maximum number; and an address memory section for processing a variable-length address field, a destination address operating section and a packet generating section, wherein equipment address of all or a portion of addressed equipment and multicast address calculated from the address of the own equipment are set to an address field in which the maximum number of equipment determined by said simultaneous communication enabled number of equipment determination section to be transmitted together with the maximum number, and the receiving side determines whether information is addressed to the own equipment in accordance with at least a portion of the maximum number, the multicast address, the address of the transmitter and own equipment address of the own equipment so that only information addressed to the own equipment is acquired.

19. A communication control apparatus comprising:

own terminal ID information setting means for setting own terminal ID information for discriminating own communication terminal from other terminals;

an own terminal ID information memory section for memorizing own terminal ID information in a table;

existence confirmation information transmission means for transmitting existence confirmation information for recognizing communication-enabled terminals existing around an own terminal, said existence confirmation information having information except said own terminal ID information;

existence confirmation information receive means for receiving existence confirmation information supplied from said other terminals;

existence confirmation response transmission means for transmitting existence confirmation response for informing existence of a coincident terminal in a case where received existence confirmation information and own terminal ID information in said table coincide with each other;

communication-enabled terminal recognition means for recognizing communication-enabled terminals existing around the own terminal in accordance with existence confirmation information and existence confirmation response transmitted from said other terminals;

group setting means for setting one or a plurality of communication terminals among the recognized communication enabled terminals as a same group; and information transmission means for transmitting the same information to communication terminals belonging to the same group set by said group setting means.

20. A communication control method comprising the steps of:

setting and memorizing ID information of an own terminal in a table;

transmitting existence confirmation information to recognize communication-enabled terminals existing around an own terminal, said existence confirmation information having information except said own terminal ID information;

receiving existence confirmation response with respect to existence confirmation information supplied from other terminals;

transmitting the existence confirmation response in a case where received existence confirmation information and memorized ID information of the own terminal in said table coincide with each other;

recognizing communication-enabled terminals existing around the own terminal from a coincidence between the existence confirmation information and the existence confirmation response;

setting one or a plurality of recognized communication-enabled communication terminals as a group; and transmitting same information to the communication terminals belonging to the group set by said step of setting one or a plurality of recognized communication-enabled communication terminals as a group.

21. A recording medium comprising a program for executing the steps of:

receiving existence confirmation information from other terminals, said existence confirmation information having information except terminal ID information of the other terminals;

determining whether received existence confirmation information and ID information of the own terminal stored in a table coincide with each other;

transmitting existence confirmation response to the other terminals in a case where coincidence has been determined;

receiving existence confirmation response from the other terminals; and registering in said table the communication terminal indicated by existence confirmation information received immediately before as a terminal with which communication can be held.

22. A communication control apparatus comprising:
  terminal identifier memory means for memorizing in a table one or a plurality of terminal identifiers of one or a plurality of terminals with which communication is being held and to each of which the terminal identifier is assigned;
  identifier candidate memory means for memorizing in said table one or the plural terminal identifiers, which can be used as terminal identifiers, as terminal identifier candidates;
  non-used identifier selection means for selecting a terminal identifier memorized in said table, except the terminal identifiers memorized in said table as a non-used identifier;
  non-used ID information transmission means for transmitting from said table the nonused identifier selected by said non-used identifier selection means as non-used ID information;
  use petition receive means for receiving use petition information which is a requirement for petition for use from a non-participated terminal, which is a terminal to which the terminal identifier has not been assigned;
  use permission determination means for determining whether use of the non-used identifier is permitted for the non-participated terminal when said use petition receive means has received use petition information; and
  use permission transmission means for transmitting use permission information to the non-participated terminal in the case where said use permission determination means permits use.

23. A communication control method comprising the steps of:
  previously memorizing in a table one or a plurality of terminal identifiers which can be used as terminal identifiers as identifier candidates;
  selecting, as non-used identifier, a terminal identifier memorized in said table as the identifier candidate, except the terminal identifiers of one or plural terminals with which communication is being held and to each of which the terminal identifier has been assigned;
  transmitting the selected non-used identifier as non-used ID information;
  determining whether use of the non-used identifier is permitted to a non-participated terminal when use petition information for requiring permission of use from the non-participated terminal, which is a terminal to which the terminal identifier in the communication has not been assigned has been received; and
  transmitting use permission information to the non-participated terminal when use is permitted.

24. A communication control apparatus comprising:
  non-used ID information receive means for receiving non-used ID information from a terminal which transmits non-used ID information indicating a terminal identifier which is not being used in the present communication;
  use petition information generating means for generating petition for use of the non-used identifier in non-used ID information received by said non-used ID information receive means;
  use petition transmission means for transmitting use petition information generated by said use petition information generating means;
  use permission receive means for receiving use permission information indicating that use of the non-used identifier transmitted from the terminal which has received use petition information and which has determined that the non-used identifier can be used; and
  own terminal identifier memory means for memorizing in a table the non-used identifier, the petition of use of which has been made, as the own terminal identifier in a case where said use permission receive means has received use permission information.

25. A communication control method comprising the steps of:
  receiving non-used ID information from a terminal which transmits non-used ID information indicating a terminal identifier which is not being used in the present communication;
  generating petition for use of the non-used identifier in non-used ID information received by said non-used ID information receive means;
  transmitting use petition information generated by said use petition information generating means;
  receiving use permission information indicating that use of the non-used identifier transmitted from the terminal which has received use petition information and which has determined that the non-used identifier can be used; and
  memorizing in a table the non-used identifier, the petition of use of which has been made, as the own terminal identifier in a case where said use permission receive means has received use permission information.

26. A communication control apparatus comprising:
  own terminal ID information setting means for setting own terminal ID information for discriminating an own terminal from other terminals;
  own terminal ID information memory means for memorizing in a table the own terminal ID information;
  existence confirmation transmission means for transmitting existence confirmation information for recognizing communication-enabled terminals existing around the own terminal from said table;
  existence confirmation information receive means for receiving existence confirmation information from at least one of said other terminals;
  existence confirmation response transmission means for transmitting existence confirmation response which notifies existence of a terminal having existence confirmation information which coincides with the own terminal ID information in said table in a case where received existence confirmation information and the own terminal ID information in said table coincide with each other, said received existence confirmation information including existence confirmation information of some terminals in said other terminals; and
  own terminal ID information changing means for determining whether the own terminal ID information in said table is changed and changing the own terminal ID information in said table if necessary in a case where received existence confirmation information and the own terminal ID information coincide with each other and the existence confirmation responses with respect to the same existence confirmation information have been received from said some terminals in said other terminals,
  wherein each terminal prevents overlap of terminal ID information in a case where the own terminal ID information and terminal ID information of said some terminals overlap.

27. A communication control apparatus comprising:
  own terminal ID information setting means for setting own terminal ID information for discriminating an own terminal from other terminals;

own terminal ID information memory means for memorizing in a table the own terminal ID information;

existence confirmation transmission means for transmitting existence confirmation information for recognizing communication-enabled terminals existing around the own terminal from said table;

existence confirmation information receive means for receiving existence confirmation information from at least one of said other terminals;

existence confirmation response transmission means for transmitting existence confirmation response which notifies existence of a terminal having existence confirmation information which coincides with the own terminal ID information in said table in a case where received existence confirmation information and the own terminal ID information in said table coincide with each other, said received existence confirmation information including existence confirmation information of some terminals in said other terminals;

means for transmitting terminal ID information overlap notification in a case where existence confirmation responses with respect to the same existence confirmation information have been received from a plurality of said other terminals;

overlap information receive means for receiving terminal ID information overlap notification from the other terminals; and own terminal ID information changing means for determining whether the own terminal ID information in said table is changed in accordance with the received terminal ID information overlap notification to change the own terminal ID information in said table if necessary, wherein notification of overlap of terminal ID information of the other terminals detected by the own terminal is performed and each terminal which has received the overlap notification prevents overlap of terminal ID information.

28. A communication control apparatus comprising:

ID imparting means for imparting from a table ID information of a packet to a destination packet;

packet transmission means for broadcasting packet imparted with the ID;

packet receive means for receiving the broadcasted packet;

confirmation packet receive number setting means for setting in said table the number of receive confirmation packets which must be received with respect to the transmitted packet;

confirmation packet receive number counting means for counting the number of the receive confirmation packets with respect to the transmitted packet;

re-transmission means for again transmitting the same packet in a case where the receive confirmation packets cannot be received by the number which must be received in a predetermined time; and receive confirmation packet generating means for generating a packet having ID information of a received packet and information indicating that the received packet is a receive confirmation packet in a case where a packet except a receive confirmed packet has been received, wherein the packet imparted with the ID is transmitted, the number of received receive confirmation packets with respect to the packet having the ID is counted and the same packet is again transmitted in a case where the number is smaller than the previously instructed number.

29. A communication control apparatus according to claim 28, further comprising:

packet ID memory means for memorizing in a table the ID of packets which have been received and transmitted; and ID determination means for determining ID in accordance with information memorized in said table, wherein the transmitted and received packets can be identified.

30. A communication control apparatus comprising:

address information receive means for receiving address information indicating existence of a certain address and the attribute of the address and for storing said address information in a table;

address selection means for selecting one or a plurality of addresses from received address information in said table;

information receive means for receiving information transmitted to the selected address;

information transmission means for transmitting information to the selected address;

address generating means for generating novel address; and address transmission means for transmitting address information, wherein transmitted address information is received, one or the plural addresses are selected, information transmitted to the selected addresses is received, novel address is generated, if necessary, and existence of the address and the attribute of the address are transmitted.

31. A communication control apparatus comprising:

address information receive means for receiving address information indicating existence of a certain address and the attribute of the address and for storing said address information in a table;

address selection means for selecting one or a plurality of addresses from received address information in said table;

information receive means for receiving information transmitted to the selected address;

information transmission means for transmitting information to the selected address;

address generating means for generating novel address;

address information transmission determination means for determining whether address information is transmitted in a case where the novel address has been generated or address information of the selected address or information to the selected address cannot be received for a predetermined time; and means for transmitting address information in accordance with the determination, wherein transmitted address information is received, one or plural addresses are selected, and information transmitted to the selected address is received, novel address is generated if necessary, and whether address information is transmitted is determined, and existence of the address and the attribute of the address are transmitted in accordance with a result of the determination.

* * * * *